US012699732B2

(12) United States Patent
Ramamurti et al.

(10) Patent No.: US 12,699,732 B2
(45) Date of Patent: Aug. 4, 2026

(54) SYSTEMS AND METHODS FOR MAPPING A BUILDING SCHEMA INTO A GRAPH DATA SCHEMA

(71) Applicant: Tyco Fire & Security GmbH, Schaffhausen (CH)

(72) Inventors: Vish Ramamurti, San Leandro, CA (US); Zhongyi Jin, Santa Clara, CA (US); Young M. Lee, Old Westbury, NY (US); Youngchoon Park, Brookfield, WI (US); Sudhi R. Sinha, Milwaukee, WI (US); Jason B. Koh, Milwaukee, WI (US); Simin Zhou, Santa Clara, CA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 704 days.

(21) Appl. No.: 16/663,623

(22) Filed: Oct. 25, 2019

(65) Prior Publication Data

US 2020/0133978 A1     Apr. 30, 2020

Related U.S. Application Data

(60) Provisional application No. 62/751,378, filed on Oct. 26, 2018.

(51) Int. Cl.
| | |
|---|---|
| *G06F 16/901* | (2019.01) |
| *G06F 9/451* | (2018.01) |
| *G06F 16/21* | (2019.01) |

(52) U.S. Cl.
CPC .......... *G06F 16/9024* (2019.01); *G06F 9/451* (2018.02); *G06F 16/212* (2019.01)

(58) Field of Classification Search
CPC .... G06F 16/9024; G06F 9/451; G06F 16/212; G06F 8/38
See application file for complete search history.

(56) References Cited

U.S. PATENT DOCUMENTS

| | | |
|---|---|---|
| 5,301,109 A | 4/1994 | Landauer et al. |
| 5,446,677 A | 8/1995 | Jensen et al. |
| | (Continued) | |

FOREIGN PATENT DOCUMENTS

| | | |
|---|---|---|
| AU | 2019226217 A1 | 11/2020 |
| AU | 2019226264 A1 | 11/2020 |
| | (Continued) | |

OTHER PUBLICATIONS

Balaji, et al., Brick: Towards a Unified Metadata Schema for Buildings, 10 pages, ACM, Nov. 16-17, 2016.

(Continued)

*Primary Examiner* — Ann J Lo
*Assistant Examiner* — Fatima P Mina
(74) *Attorney, Agent, or Firm* — Foley & Lardner LLP

(57) ABSTRACT

A building schema mapping system, the system including one or more memory devices configured to store instructions, that, when executed by one or more processors, cause the one or more processors to receive strings in a first schema, each string representing at least one of a point, building equipment, or a building space, extract relationships from the strings, each relationship of the relationships indicating a particular relationship between a first string of the strings and a second string of the strings, label each of the strings based on characters of each of the strings, and generate a graph data structure of a second schema based on the relationships and the label of each of the strings.

22 Claims, 33 Drawing Sheets

(56) References Cited

U.S. PATENT DOCUMENTS

| | | | |
|---|---|---|---|
| 5,581,478 A | 12/1996 | Cruse et al. | |
| 5,812,962 A | 9/1998 | Kovac | |
| 5,960,381 A | 9/1999 | Singers et al. | |
| 5,973,662 A | 10/1999 | Singers et al. | |
| 6,014,612 A | 1/2000 | Larson et al. | |
| 6,031,547 A | 2/2000 | Kennedy | |
| 6,134,511 A | 10/2000 | Subbarao | |
| 6,157,943 A | 12/2000 | Meyer | |
| 6,240,326 B1 | 5/2001 | Gloudeman et al. | |
| 6,285,966 B1 | 9/2001 | Brown et al. | |
| 6,363,422 B1 | 3/2002 | Hunter et al. | |
| 6,385,510 B1 | 5/2002 | Hoog et al. | |
| 6,389,331 B1 | 5/2002 | Jensen et al. | |
| 6,401,027 B1 | 6/2002 | Xu et al. | |
| 6,437,691 B1 | 8/2002 | Sandelman et al. | |
| 6,477,518 B1 | 11/2002 | Li et al. | |
| 6,487,457 B1 | 11/2002 | Hull et al. | |
| 6,493,755 B1 | 12/2002 | Hansen et al. | |
| 6,577,323 B1 | 6/2003 | Jamieson et al. | |
| 6,626,366 B2 | 9/2003 | Kayahara et al. | |
| 6,646,660 B1 | 11/2003 | Patty | |
| 6,704,016 B1 | 3/2004 | Oliver et al. | |
| 6,732,540 B2 | 5/2004 | Sugihara et al. | |
| 6,764,019 B1 | 7/2004 | Kayahara et al. | |
| 6,782,385 B2 | 8/2004 | Natsumeda et al. | |
| 6,813,532 B2 | 11/2004 | Eryurek et al. | |
| 6,816,811 B2 | 11/2004 | Seem | |
| 6,823,680 B2 | 11/2004 | Jayanth | |
| 6,826,454 B2 | 11/2004 | Sulfstede | |
| 6,865,511 B2 | 3/2005 | Frerichs et al. | |
| 6,925,338 B2 | 8/2005 | Eryurek et al. | |
| 6,986,138 B1 | 1/2006 | Sakaguchi et al. | |
| 7,031,880 B1 | 4/2006 | Seem et al. | |
| 7,401,057 B2 | 7/2008 | Eder | |
| 7,552,467 B2 | 6/2009 | Lindsay | |
| 7,627,544 B2 | 12/2009 | Chkodrov et al. | |
| 7,818,249 B2 | 10/2010 | Lovejoy et al. | |
| 7,889,051 B1 | 2/2011 | Billig et al. | |
| 7,996,488 B1 | 8/2011 | Casabella et al. | |
| 8,078,330 B2 | 12/2011 | Brickfield et al. | |
| 8,104,044 B1 | 1/2012 | Scofield et al. | |
| 8,229,470 B1 | 7/2012 | Ranjan et al. | |
| 8,280,723 B1 * | 10/2012 | Laaser | G06F 40/205 704/10 |
| 8,401,991 B2 | 3/2013 | Wu et al. | |
| 8,495,745 B1 | 7/2013 | Schrecker et al. | |
| 8,516,016 B2 | 8/2013 | Park et al. | |
| 8,532,808 B2 | 9/2013 | Drees et al. | |
| 8,532,839 B2 | 9/2013 | Drees et al. | |
| 8,600,556 B2 | 12/2013 | Nesler et al. | |
| 8,635,182 B2 | 1/2014 | Mackay | |
| 8,682,921 B2 | 3/2014 | Park et al. | |
| 8,731,724 B2 | 5/2014 | Drees et al. | |
| 8,737,334 B2 | 5/2014 | Ahn et al. | |
| 8,738,334 B2 | 5/2014 | Jiang et al. | |
| 8,751,487 B2 | 6/2014 | Byrne et al. | |
| 8,788,097 B2 | 7/2014 | Drees et al. | |
| 8,805,995 B1 | 8/2014 | Oliver | |
| 8,843,238 B2 | 9/2014 | Wenzel et al. | |
| 8,874,071 B2 | 10/2014 | Sherman et al. | |
| 8,941,465 B2 | 1/2015 | Pineau et al. | |
| 8,990,127 B2 | 3/2015 | Taylor | |
| 9,070,113 B2 | 6/2015 | Shafiee et al. | |
| 9,116,978 B2 | 8/2015 | Park et al. | |
| 9,185,095 B1 | 11/2015 | Moritz et al. | |
| 9,189,527 B2 | 11/2015 | Park et al. | |
| 9,196,009 B2 | 11/2015 | Drees et al. | |
| 9,229,966 B2 | 1/2016 | Aymeloglu et al. | |
| 9,286,582 B2 | 3/2016 | Drees et al. | |
| 9,311,807 B2 | 4/2016 | Schultz et al. | |
| 9,344,751 B1 | 5/2016 | Ream et al. | |
| 9,354,968 B2 | 5/2016 | Wenzel et al. | |
| 9,411,327 B2 | 8/2016 | Park | |
| 9,507,686 B2 | 11/2016 | Horn et al. | |
| 9,524,594 B2 | 12/2016 | Ouyang et al. | |
| 9,558,196 B2 | 1/2017 | Johnston et al. | |
| 9,652,813 B2 | 5/2017 | Gifford et al. | |
| 9,753,455 B2 | 9/2017 | Drees | |
| 9,767,409 B1 * | 9/2017 | Makhijani | G06F 16/7867 |
| 9,811,249 B2 | 11/2017 | Chen et al. | |
| 9,838,844 B2 | 12/2017 | Emeis et al. | |
| 9,886,478 B2 | 2/2018 | Mukherjee | |
| 9,948,359 B2 | 4/2018 | Horton | |
| 10,055,114 B2 | 8/2018 | Shah et al. | |
| 10,055,206 B2 | 8/2018 | Park et al. | |
| 10,116,461 B2 | 10/2018 | Fairweather et al. | |
| 10,169,454 B2 | 1/2019 | Ait-Mokhtar et al. | |
| 10,171,297 B2 | 1/2019 | Stewart et al. | |
| 10,171,586 B2 | 1/2019 | Shaashua et al. | |
| 10,187,258 B2 | 1/2019 | Nagesh et al. | |
| 10,417,451 B2 | 9/2019 | Park et al. | |
| 10,514,963 B2 | 12/2019 | Shrivastava et al. | |
| 10,515,098 B2 | 12/2019 | Park et al. | |
| 10,534,326 B2 | 1/2020 | Sridharan et al. | |
| 10,536,295 B2 | 1/2020 | Fairweather et al. | |
| 10,564,993 B2 | 2/2020 | Deutsch et al. | |
| 10,705,492 B2 | 7/2020 | Harvey | |
| 10,708,078 B2 | 7/2020 | Harvey | |
| 10,760,815 B2 | 9/2020 | Janakiraman et al. | |
| 10,762,475 B2 | 9/2020 | Song et al. | |
| 10,824,120 B2 | 11/2020 | Ahmed | |
| 10,845,771 B2 | 11/2020 | Harvey | |
| 10,854,194 B2 | 12/2020 | Park et al. | |
| 10,862,928 B1 | 12/2020 | Badawy et al. | |
| 10,921,760 B2 | 2/2021 | Harvey | |
| 10,921,972 B2 | 2/2021 | Park et al. | |
| 10,969,133 B2 | 4/2021 | Harvey | |
| 10,976,068 B2 | 4/2021 | Hallendy et al. | |
| 10,986,121 B2 | 4/2021 | Stockdale et al. | |
| 11,016,998 B2 | 5/2021 | Park et al. | |
| 11,024,292 B2 | 6/2021 | Park et al. | |
| 11,038,709 B2 | 6/2021 | Park et al. | |
| 11,041,650 B2 | 6/2021 | Li et al. | |
| 11,054,796 B2 | 7/2021 | Holaso | |
| 11,070,390 B2 | 7/2021 | Park et al. | |
| 11,073,976 B2 | 7/2021 | Park et al. | |
| 11,108,587 B2 | 8/2021 | Park et al. | |
| 11,113,295 B2 | 9/2021 | Park et al. | |
| 11,229,138 B1 | 1/2022 | Harvey et al. | |
| 11,314,726 B2 | 4/2022 | Park et al. | |
| 11,314,788 B2 | 4/2022 | Park et al. | |
| 11,556,105 B2 | 1/2023 | Cooley et al. | |
| 11,561,522 B2 | 1/2023 | Cooley et al. | |
| 11,561,523 B2 | 1/2023 | Cooley et al. | |
| 11,573,551 B2 | 2/2023 | Cooley et al. | |
| 11,586,167 B2 | 2/2023 | Cooley et al. | |
| 2002/0010562 A1 | 1/2002 | Schleiss et al. | |
| 2002/0016639 A1 | 2/2002 | Smith et al. | |
| 2002/0059229 A1 | 5/2002 | Natsumeda et al. | |
| 2002/0123864 A1 | 9/2002 | Eryurek et al. | |
| 2002/0147506 A1 | 10/2002 | Eryurek et al. | |
| 2002/0177909 A1 | 11/2002 | Fu et al. | |
| 2003/0005486 A1 | 1/2003 | Ridolfo et al. | |
| 2003/0014130 A1 | 1/2003 | Grumelart | |
| 2003/0073432 A1 | 4/2003 | Meade, II | |
| 2003/0074640 A1 | 4/2003 | Mandell et al. | |
| 2003/0158704 A1 | 8/2003 | Triginai et al. | |
| 2003/0171851 A1 | 9/2003 | Brickfield et al. | |
| 2003/0200059 A1 | 10/2003 | Ignatowski et al. | |
| 2004/0021679 A1 | 2/2004 | Chapman et al. | |
| 2004/0068390 A1 | 4/2004 | Saunders | |
| 2004/0128314 A1 | 7/2004 | Katibah et al. | |
| 2004/0133314 A1 | 7/2004 | Ehlers et al. | |
| 2004/0199360 A1 | 10/2004 | Friman et al. | |
| 2005/0055308 A1 | 3/2005 | Meyer et al. | |
| 2005/0108262 A1 | 5/2005 | Fawcett et al. | |
| 2005/0154494 A1 | 7/2005 | Ahmed | |
| 2005/0278703 A1 | 12/2005 | Lo et al. | |
| 2005/0283337 A1 | 12/2005 | Sayal | |
| 2006/0062468 A1 | 3/2006 | Xu et al. | |
| 2006/0095521 A1 | 5/2006 | Patinkin | |
| 2006/0140207 A1 | 6/2006 | Eschbach et al. | |
| 2006/0167667 A1 | 7/2006 | Maturana et al. | |
| 2006/0184479 A1 | 8/2006 | Levine | |

(56) References Cited

U.S. PATENT DOCUMENTS

| | | | |
|---|---|---|---|
| 2006/0200476 A1 | 9/2006 | Gottumukkala et al. | |
| 2006/0248523 A1* | 11/2006 | Berg | G06F 8/73 |
| | | | 717/174 |
| 2006/0253205 A1 | 11/2006 | Gardiner | |
| 2006/0265751 A1 | 11/2006 | Cosquer et al. | |
| 2006/0271589 A1 | 11/2006 | Horowitz et al. | |
| 2007/0028179 A1 | 2/2007 | Levin et al. | |
| 2007/0067062 A1 | 3/2007 | Mairs et al. | |
| 2007/0203693 A1 | 8/2007 | Estes | |
| 2007/0261062 A1 | 11/2007 | Bansal et al. | |
| 2007/0273497 A1 | 11/2007 | Kuroda et al. | |
| 2007/0273610 A1 | 11/2007 | Baillot | |
| 2008/0034425 A1 | 2/2008 | Overcash et al. | |
| 2008/0094230 A1 | 4/2008 | Mock et al. | |
| 2008/0097816 A1 | 4/2008 | Freire et al. | |
| 2008/0186160 A1 | 8/2008 | Kim et al. | |
| 2008/0249756 A1 | 10/2008 | Chaisuparasmikul | |
| 2008/0252723 A1 | 10/2008 | Park | |
| 2008/0281472 A1 | 11/2008 | Podgorny et al. | |
| 2008/0282198 A1* | 11/2008 | Brooks | G06F 3/0482 |
| | | | 715/854 |
| 2009/0195349 A1 | 8/2009 | Frader-Thompson et al. | |
| 2010/0045439 A1 | 2/2010 | Tak et al. | |
| 2010/0058248 A1 | 3/2010 | Park | |
| 2010/0131533 A1 | 5/2010 | Ortiz | |
| 2010/0274366 A1 | 10/2010 | Fata et al. | |
| 2010/0281387 A1 | 11/2010 | Holland et al. | |
| 2010/0286937 A1 | 11/2010 | Hedley et al. | |
| 2010/0287130 A1 | 11/2010 | Guralnik et al. | |
| 2010/0324962 A1 | 12/2010 | Nesler et al. | |
| 2011/0015802 A1 | 1/2011 | Imes | |
| 2011/0047418 A1 | 2/2011 | Drees et al. | |
| 2011/0061015 A1 | 3/2011 | Drees et al. | |
| 2011/0071685 A1 | 3/2011 | Huneycutt et al. | |
| 2011/0077950 A1 | 3/2011 | Hughston | |
| 2011/0087650 A1 | 4/2011 | Mackay et al. | |
| 2011/0087988 A1 | 4/2011 | Ray et al. | |
| 2011/0088000 A1 | 4/2011 | Mackay | |
| 2011/0125737 A1 | 5/2011 | Pothering et al. | |
| 2011/0137853 A1 | 6/2011 | Mackay | |
| 2011/0153603 A1 | 6/2011 | Adiba et al. | |
| 2011/0154363 A1 | 6/2011 | Karmarkar | |
| 2011/0157357 A1 | 6/2011 | Weisensale et al. | |
| 2011/0178977 A1 | 7/2011 | Drees | |
| 2011/0191343 A1 | 8/2011 | Heaton et al. | |
| 2011/0205022 A1 | 8/2011 | Cavallaro et al. | |
| 2011/0218777 A1 | 9/2011 | Chen et al. | |
| 2012/0011126 A1 | 1/2012 | Park et al. | |
| 2012/0011141 A1 | 1/2012 | Park et al. | |
| 2012/0022698 A1* | 1/2012 | Mackay | G06Q 10/06 |
| | | | 700/275 |
| 2012/0062577 A1 | 3/2012 | Nixon | |
| 2012/0064923 A1 | 3/2012 | Imes et al. | |
| 2012/0083930 A1 | 4/2012 | Ilic et al. | |
| 2012/0100825 A1 | 4/2012 | Sherman et al. | |
| 2012/0101637 A1 | 4/2012 | Imes et al. | |
| 2012/0135759 A1 | 5/2012 | Imes et al. | |
| 2012/0136485 A1 | 5/2012 | Weber et al. | |
| 2012/0158633 A1 | 6/2012 | Eder | |
| 2012/0259583 A1 | 10/2012 | Noboa et al. | |
| 2012/0272228 A1 | 10/2012 | Marndi et al. | |
| 2012/0278051 A1 | 11/2012 | Jiang et al. | |
| 2012/0284377 A1 | 11/2012 | Von Stein et al. | |
| 2012/0296451 A1 | 11/2012 | Kaps et al. | |
| 2013/0007063 A1 | 1/2013 | Kalra et al. | |
| 2013/0038430 A1 | 2/2013 | Blower et al. | |
| 2013/0038707 A1 | 2/2013 | Cunningham et al. | |
| 2013/0060820 A1 | 3/2013 | Bulusu et al. | |
| 2013/0086497 A1 | 4/2013 | Ambuhl et al. | |
| 2013/0097706 A1 | 4/2013 | Titonis et al. | |
| 2013/0103221 A1 | 4/2013 | Raman et al. | |
| 2013/0167035 A1 | 6/2013 | Imes et al. | |
| 2013/0170710 A1 | 7/2013 | Kuoch et al. | |
| 2013/0173062 A1 | 7/2013 | Koenig-Richardson | |
| 2013/0204836 A1 | 8/2013 | Choi et al. | |
| 2013/0246916 A1 | 9/2013 | Reimann et al. | |
| 2013/0247205 A1 | 9/2013 | Schrecker et al. | |
| 2013/0262035 A1 | 10/2013 | Mills | |
| 2013/0275174 A1 | 10/2013 | Bennett et al. | |
| 2013/0275908 A1 | 10/2013 | Reichard | |
| 2013/0297050 A1 | 11/2013 | Reichard et al. | |
| 2013/0298244 A1 | 11/2013 | Kumar et al. | |
| 2013/0331995 A1 | 12/2013 | Rosen | |
| 2013/0338970 A1 | 12/2013 | Reghetti | |
| 2014/0032506 A1 | 1/2014 | Hoey et al. | |
| 2014/0059483 A1 | 2/2014 | Mairs et al. | |
| 2014/0081652 A1 | 3/2014 | Klindworth | |
| 2014/0135952 A1 | 5/2014 | Maehara | |
| 2014/0152651 A1 | 6/2014 | Chen et al. | |
| 2014/0172184 A1 | 6/2014 | Schmidt et al. | |
| 2014/0189861 A1 | 7/2014 | Gupta et al. | |
| 2014/0207282 A1 | 7/2014 | Angle et al. | |
| 2014/0249797 A1 | 9/2014 | Liu et al. | |
| 2014/0258052 A1 | 9/2014 | Khuti et al. | |
| 2014/0269614 A1 | 9/2014 | Maguire et al. | |
| 2014/0277765 A1 | 9/2014 | Karimi et al. | |
| 2014/0278461 A1 | 9/2014 | Artz | |
| 2014/0327555 A1 | 11/2014 | Sager et al. | |
| 2015/0019174 A1 | 1/2015 | Kiff et al. | |
| 2015/0042240 A1 | 2/2015 | Aggarwal et al. | |
| 2015/0105917 A1 | 4/2015 | Sasaki et al. | |
| 2015/0145468 A1 | 5/2015 | Ma et al. | |
| 2015/0156031 A1 | 6/2015 | Fadell et al. | |
| 2015/0168931 A1 | 6/2015 | Jin | |
| 2015/0172300 A1 | 6/2015 | Cochenour | |
| 2015/0178421 A1 | 6/2015 | Borrelli et al. | |
| 2015/0185261 A1 | 7/2015 | Frader-Thompson et al. | |
| 2015/0186777 A1 | 7/2015 | Lecue et al. | |
| 2015/0202962 A1 | 7/2015 | Habashima et al. | |
| 2015/0204563 A1 | 7/2015 | Imes et al. | |
| 2015/0235267 A1 | 8/2015 | Steube et al. | |
| 2015/0241895 A1 | 8/2015 | Lu et al. | |
| 2015/0244730 A1 | 8/2015 | Vu et al. | |
| 2015/0244732 A1 | 8/2015 | Golshan et al. | |
| 2015/0261863 A1 | 9/2015 | Dey et al. | |
| 2015/0263900 A1 | 9/2015 | Polyakov et al. | |
| 2015/0286969 A1 | 10/2015 | Warner et al. | |
| 2015/0295796 A1 | 10/2015 | Hsiao et al. | |
| 2015/0304193 A1 | 10/2015 | Ishii et al. | |
| 2015/0316918 A1 | 11/2015 | Schleiss et al. | |
| 2015/0324422 A1 | 11/2015 | Elder | |
| 2015/0341212 A1 | 11/2015 | Hsiao et al. | |
| 2015/0348417 A1 | 12/2015 | Ignaczak et al. | |
| 2015/0379080 A1 | 12/2015 | Jochimski | |
| 2016/0011753 A1 | 1/2016 | Mcfarland et al. | |
| 2016/0033946 A1 | 2/2016 | Zhu et al. | |
| 2016/0035246 A1 | 2/2016 | Curtis | |
| 2016/0065601 A1 | 3/2016 | Gong et al. | |
| 2016/0070736 A1 | 3/2016 | Swan et al. | |
| 2016/0078229 A1 | 3/2016 | Gong et al. | |
| 2016/0090839 A1 | 3/2016 | Stolarczyk | |
| 2016/0119434 A1 | 4/2016 | Dong et al. | |
| 2016/0127712 A1 | 5/2016 | Alfredsson et al. | |
| 2016/0139752 A1 | 5/2016 | Shim et al. | |
| 2016/0163186 A1 | 6/2016 | Davidson et al. | |
| 2016/0170390 A1 | 6/2016 | Xie et al. | |
| 2016/0171862 A1 | 6/2016 | Das et al. | |
| 2016/0173816 A1 | 6/2016 | Huenerfauth et al. | |
| 2016/0179315 A1 | 6/2016 | Sarao et al. | |
| 2016/0179342 A1 | 6/2016 | Sarao et al. | |
| 2016/0179990 A1 | 6/2016 | Sarao et al. | |
| 2016/0195856 A1 | 7/2016 | Spero | |
| 2016/0212165 A1 | 7/2016 | Singla et al. | |
| 2016/0239660 A1 | 8/2016 | Azvine et al. | |
| 2016/0239756 A1 | 8/2016 | Aggour et al. | |
| 2016/0247129 A1 | 8/2016 | Song et al. | |
| 2016/0260063 A1 | 9/2016 | Harris et al. | |
| 2016/0313751 A1 | 10/2016 | Risbeck et al. | |
| 2016/0313752 A1 | 10/2016 | Przybylski | |
| 2016/0313902 A1 | 10/2016 | Hill et al. | |
| 2016/0320758 A1* | 11/2016 | Park | G05B 13/0265 |
| 2016/0330082 A1 | 11/2016 | Bliss et al. | |
| 2016/0350364 A1 | 12/2016 | Anicic et al. | |
| 2016/0357521 A1 | 12/2016 | Zhang et al. | |

(56) References Cited

U.S. PATENT DOCUMENTS

| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0249327 A1* | 8/2017 | Gowdappa .......... G06F 16/1774 |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0129714 A1* | 5/2018 | Saxena ............ G05B 19/41845 |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0197113 A1* | 6/2019 | Iyengar ................. G06F 40/205 |
| 2019/0268178 A1 | 8/2019 | Fairweather et al. |
| 2019/0310979 A1 | 10/2019 | Masuzaki et al. |
| 2019/0377306 A1 | 12/2019 | Harvey |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| AU | 2019351573 A1 | 5/2021 |
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| CN | 104793567 B | 1/2019 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H749788 A | 2/1995 |
| JP | H10-049552 A | 2/1998 |
| JP | 2003-162573 A | 6/2003 |

(56) References Cited

FOREIGN PATENT DOCUMENTS

| | | | |
|---|---|---|---|
| JP | 2007-018322 | A | 1/2007 |
| JP | 4073946 | B1 | 4/2008 |
| JP | 2008-107930 | A | 5/2008 |
| JP | 2013-152618 | A | 8/2013 |
| JP | 2014-044457 | A | 3/2014 |
| KR | 2016/0102923 | A | 8/2016 |
| WO | WO-2009/020158 | A1 | 2/2009 |
| WO | WO-2011/100255 | A2 | 8/2011 |
| WO | WO-2012/110089 | A1 | 8/2012 |
| WO | WO-2013/050333 | A1 | 4/2013 |
| WO | WO-2015/106702 | A1 | 7/2015 |
| WO | WO-2015/145648 | A1 | 10/2015 |
| WO | WO-2017/035536 | A1 | 3/2017 |
| WO | WO-2017/192422 | A1 | 11/2017 |
| WO | WO-2017/194244 | A1 | 11/2017 |
| WO | WO-2017/205330 | A1 | 11/2017 |
| WO | WO-2017/213918 | A1 | 12/2017 |
| WO | WO-2018/132112 | A1 | 7/2018 |
| WO | WO-2020/061621 | A1 | 4/2020 |
| WO | WO-2022/042925 | A1 | 3/2022 |
| WO | WO-2022/103812 | A1 | 5/2022 |
| WO | WO-2022/103813 | A1 | 5/2022 |
| WO | WO-2022/103820 | A1 | 5/2022 |
| WO | WO-2022/103822 | A1 | 5/2022 |
| WO | WO-2022/103824 | A1 | 5/2022 |
| WO | WO-2022/103829 | A1 | 5/2022 |
| WO | WO-2022/103831 | A1 | 5/2022 |

OTHER PUBLICATIONS

Balaji, et al., Demo Abstract: Portable Queries Using the Brick Schema for Building Applications, 2 pages, ACM, Nov. 16-17, 2016.
Bhattacharya, et al., Short Paper: Analyzing Metadata Schemas for Buildings—The Good, the Bad and the Ugly, 4 pages, ACM, Nov. 4-5, 2015.
Brick A uniform metadata schema for buildings, 7 pages, dated Oct. 22, 2019, Brickschema.org.
Brick Schema: Building Blocks for Smart Buildings, 17 pages, dated Mar. 2019, www.memoori.com.
Brick: Towards a Unified Metadata Schema for Buildings, 46 page, Nov. 16, 2016, Brickschema.org.
Fierro, et al., Beyond a House of Sticks: Formalizing Metadata Tags with Brick, 10 pages, dated Nov. 10, 2019, Association for Computing Machinery.
Fierro, et al., Dataset: An Open Dataset and Collection Tool for BMS Point Labels, 3 pages, dated Nov. 13-14, 2019, Association for Computing Machinery.
Fierro, et al., Design and Analysis of a Query Processor for Brick, 10 pages, Nov. 8-9, 2017, Association for Computing Machinery.
Fierro, et al., Design and Analysis of a Query Processor for Brick, 25 pages, Jan. 2018, ACM Transactions on Sensor Networks, vol. 1, No. 1, Article 1.
Fierro, et al., Mortar: An Open Testbed for Portable Building Analytics, 10 pages, Systems for Built Environments, Nov. 7-8, 2018, Shenzhen, China.
Fierro, Writing Portable Building Analytics with the Brick Metadata Schema, 39 pages, ACM E-Energy 2019.
Gao, Jingkun et al., A large-scale evaluation of automated metadata inference approaches on sensors from air handling units, Advanced Engineering Informatics, 2018, pp. 14-30 pages, vol. 37, Elsevier.
Koh, et al., Who can Access What, and When? Understanding Minimal Access Requirements of Building Applications, dated Nov. 10, 2019, 4 pages, University of California, San Diego, Carnegie Mellon University, Association for Computing Machinery.
Koh, et al., Plaster: An Integration, Benchmark, and Development Framework for Metadata Normalization Methods, 10 pages, The 5th ACM International Conference on Systems for Built Environments, Nov. 7-8, 2018, Shenzhen, China.
Koh, et al., Poster: Scrabble: Converting Unstructured Metadata into Brick for Many Buildings, 2 pages, Dated Nov. 8-9, 2017.
Koh, et al., Scrabble: Transferrable Semi-Automated Semantic Metadata Normalization using Intermediate Representation, 10 pages, The 5th ACM International Conference on Systems for Built Environments, Nov. 7-8, 2019, Shenzen, China.
Balaji et al., "Brick: Metadata schema for portable smart building applications," Applied Energy, 2018 20 pages.
Fierro et al., Why Brick is a Game Changer for Smart Buildings, URL: https://brickschema.org/papers/Brick_Memoori_Webinar_Presentation.pdf, Memoori Webinar, 2019, 67 pages.
Koh, et al., Scrabble: Converting Unstructured Metadata into Brick for Many Buildings, UCSanDiego, 2017, 1 page.
Metadata Schema for Buildings, URL: https://brickschema.org/docs/Brick-Leaflet.pdf, Retrieved from Internet Dec. 24, 2019, 3 pages.
Balaji et al., "Brick: Metadata schema for portable smart building applications," Applied Energy, Sep. 15, 2018, 3 pages, (Abstract).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023—Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Jan. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro, G., "Design of an Effective Ontology and Query Processor Enabling Portable Building Applications," Electrical Engineering

(56) References Cited

OTHER PUBLICATIONS and Computer Sciences, University of California at Berkeley, Technical Report No. UCB/EECS-2019-106, Jue 27, 2019 (118 pages).

File History for U.S. Appl. No. 12/776,159, filed May 7, 2010 (722 pages).

Final Conference Program, ACM BuildSys 2016, Stanford, CA, USA, Nov. 15-17, 2016 (7 pages).

Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).

Harvey, T., "Quantum: The Digital Twin Standard for Buildings," URL: https://www.automatedbuildings.com/news/feb21/articles/passivelogic/210127124501passivelogic.ht ml, Feb. 2021 (6 pages).

Hu, S et al., "Building performance optimisation: A hybrid architecture for the integration of contextual information and time-series data," Automation in Construction, 2016, 70 (pp. 51-61).

International Search Report and Written Opinion for PCT Appl. Ser. No. PCT/US2017/013831 dated Mar. 31, 2017 (14 pages).

International Search Report and Written Opinion for PCT Appl. Ser. No. PCT/US2017/035524 dated Jul. 24, 2017 (14 pages).

International Search Report and Written Opinion on PCT/US2017/052060, mailed Oct. 5, 2017, 11 pages.

International Search Report and Written Opinion on PCT/US2017/052633, mailed Oct. 23, 2017, 9 pages.

International Search Report and Written Opinion on PCT/US2017/052829, mailed Nov. 27, 2017, 24 pages.

International Search Report and Written Opinion on PCT/US2018/024068, mailed Jun. 15, 2018, 22 pages.

International Search Report and Written Opinion on PCT/US2018/052971, dated Mar. 1, 2019, 19 pages.

International Search Report and Written Opinion on PCT/US2018/052974, mailed Dec. 19, 2018, 13 pages.

International Search Report and Written Opinion on PCT/US2018/052975, mailed Jan. 2, 2019, 13 pages.

International Search Report and Written Opinion on PCT/US2018/052994, mailed Jan. 7, 2019, 15 pages.

International Search Report and Written Opinion on PCT/US2019/015481, dated May 17, 2019, 78 pages.

International Search Report and Written Opinion on PCT/US2020/058381, dated Jan. 27, 2021, 30 pages.

Japanese Office Action on JP Appl. No. 2018-534963 dated May 11, 2021 (16 pages with English language translation).

Li et al., "Event Stream Processing with Out-of-Order Data Arrival," International Conferences on Distributed Computing Systems, 2007, (8 pages).

Nissin Electric Co., Ltd., "Smart power supply system (SPSS)," Outline of the scale verification plan, Nissin Electric Technical Report, Japan, Apr. 23, 2014, vol. 59, No. 1 (23 pages).

Passivelogic, "Explorer: Digital Twin Standard for Autonomous Systems. Made interactive." URL: https://passivelogic.com/software/quantum-explorer/, retrieved from internet Jan. 4, 2023 (13 pages).

Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).

Quantum Alliance, "Quantum Explorer Walkthrough," 2022, (7 pages) (screenshots from video).

Results of the Partial International Search for PCT/US2018/052971, dated Jan. 3, 2019, 3 pages.

Sinha, Sudhi and Al Huraimel, Khaled, "Reimagining Businesses with AI" John Wiley & Sons, Inc., Hoboken, NJ, USA, 2021 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work for Your Business: A guide to effective Big Data analytics," Impackt Publishing LTD., Birmingham, UK, Oct. 2014 (170 pages).

The Virtual Nuclear Tourist, "Calvert Cliffs Nuclear Power Plant," URL: http://www.nucleartourist.com/us/calvert.htm, Jan. 11, 2006 (2 pages).

University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

W3C, "SPARQL: Query Language for RDF," located on the Wayback Machine, URL: https://web.archive.org/web/20161230061728/http://www.w3.org/TR/rdf-sparql-query/), retrieved from internet Nov. 15, 2022 (89 pages).

Wei et al., "Development and Implementation of Software Gateways of Fire Fighting Subsystem Running on EBI," Control, Automation and Systems Engineering, IITA International Conference on, IEEE, Jul. 2009 (pp. 9-12).

White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).

Zhou, Q. et al., "Knowledge-infused and Consistent Complex Event Processing over Real-time and Persistent Streams," Further Generation Computer Systems, 2017, 76 (pp. 391-406).

U.S. Appl. No. 17/566,029, Passivelogic, Inc.

U.S. Appl. No. 17/567,275, Passivelogic, Inc.

U.S. Appl. No. 17/722,115, Passivelogic, Inc.

\* cited by examiner

700

| PointID | BrickRelationship | EquipID |
|---|---|---|
| ADS-01:DHL-NAE-CO-004/FCB.FEC-005.M-AHU-CO-00-06_AH-ENA | brickframe:isPointOf | equipment.DHL-NAE-CO-004.FCB.FEC-005 |
| ADS-01:DHL-NAE-CO-004/FCB.FEC-005.M-AHU-CO-00-06_C-CALL | brickframe:isPointOf | equipment.DHL-NAE-CO-004.FCB.FEC-005 |
| ADS-01:DHL-NAE-CO-004/FCB.FEC-005.M-AHU-CO-00-06_CDB | brickframe:isPointOf | equipment.DHL-NAE-CO-004.FCB.FEC-005 |
| ADS-01:DHL-NAE-CO-004/FCB.FEC-005.M-AHU-CO-00-06_CLG-ENA | brickframe:isPointOf | equipment.DHL-NAE-CO-004.FCB.FEC-005 |

| SpaceID | BrickRelationship | ParentSpace |
|---|---|---|
| Darling_Harbour_Live.Convention_Center_Floor | brickframe:isPartOf | Darling_Harbour_Live |
| Darling_Harbour_Live.Convention_Center_Floor.Darling_Harbour_Theatre | brickframe:isPartOf | Darling_Harbour_Live.Convention_Center_Floor |
| Darling_Harbour_Live.Convention_Center_Floor.Level_0 | brickframe:isPartOf | Darling_Harbour_Live.Convention_Center_Floor |
| Darling_Harbour_Live.Convention_Center_Floor.Level_0.Zone_1 | brickframe:isPartOf | Darling_Harbour_Live.Convention_Center_Floor.Level_0 |
| Darling_Harbour_Live.Convention_Center_Floor.Level_0.Zone_1.Locker_Rm_Staff_C00-W23 | brickframe:isPartOf | Darling_Harbour_Live.Convention_Center_Floor.Level_0.Zone_1 |

| PointID | Point_Space_Relationship | SpaceID |
|---|---|---|
| ADS-01:DHL-NAE-CO-004/FCB.FEC-005.M-AHU-CO-00-06_AH-ENA | brickframe:isLocatedIn | Darling_Harbour_Live.Convention_Center_Floor.Level_1.Zone_2.Hot_Kitchen_C01-K59 |
| ADS-01:DHL-NAE-CO-004/FCB.FEC-005.M-AHU-CO-00-06_C-CALL | brickframe:isLocatedIn | Darling_Harbour_Live.Convention_Center_Floor.Level_1.Zone_2.Hot_Kitchen_C01-K59 |
| ADS-01:DHL-NAE-CO-004/FCB.FEC-005.M-AHU-CO-00-06_CDB | brickframe:isLocatedIn | Darling_Harbour_Live.Convention_Center_Floor.Level_1.Zone_2.Hot_Kitchen_C01-K59 |
| ADS-01:DHL-NAE-CO-004/FCB.FEC-005.M-AHU-CO-00-06_CLG-ENA | brickframe:isLocatedIn | Darling_Harbour_Live.Convention_Center_Floor.Level_1.Zone_2.Hot_Kitchen_C01-K59 |

| EquipID | Equip_Equip_Relationship | L2_EquipID |
|---|---|---|
| equipment.DHL-NAE-CO-004.FCB.FEC-005 | brickframe:isFedBy | equipment.DHL-NAE-CO-004.FCB.FEC-021 |
| equipment.DHL-NAE-CO-004.FCB.FEC-005 | brickframe:isFedBy | equipment.NCE-CO-005.FCB.Chiller_Set_2_Controller |
| equipment.DHL-NAE-CO-004.FCB.FEC-006 | brickframe:isFedBy | equipment.DHL-NAE-CO-004.FCB.FEC-021 |
| equipment.DHL-NAE-CO-004.FCB.FEC-006 | brickframe:isFedBy | equipment.NCE-CO-005.FCB.Chiller_Set_2_Controller |

| SpaceID | Space_Equip_Relationship | EquipID |
|---|---|---|
| Darling_Harbour_Live | brickframe:isFedBy | equipment.DHL-NCE-EX-003.FCB.FEC-006 |
| Darling_Harbour_Live | brickframe:isFedBy | equipment.NCE-CO-005.FCB.Chiller_Set_2_Controller |
| Darling_Harbour_Live | brickframe:isFedBy | equipment.NCE-CO-005.FCB.Chiller_Set_3_Controller |
| Darling_Harbour_Live | brickframe:isFedBy | equipment.NCE-CO-005.FCB.Local_Application |

FIG. 7

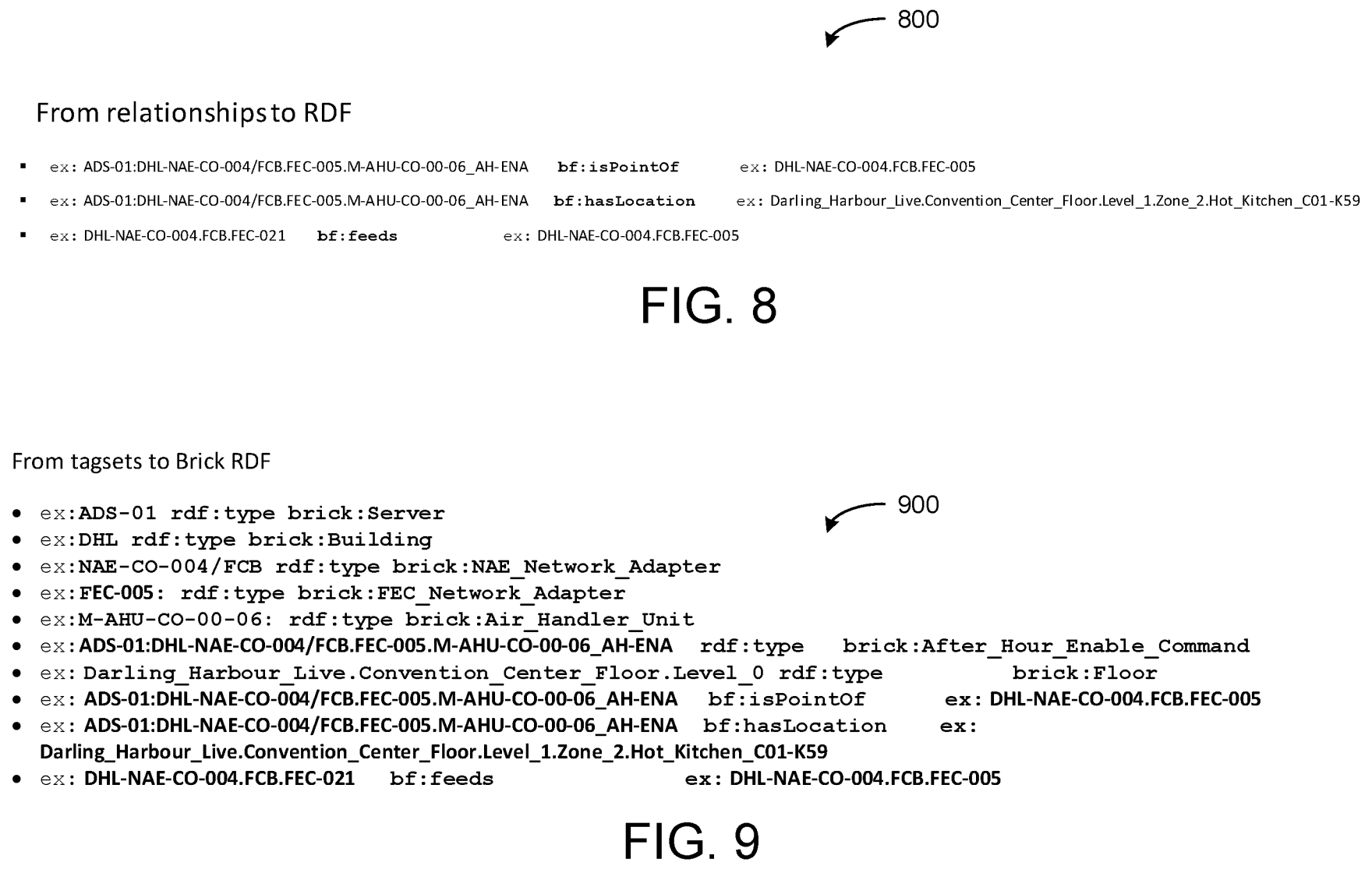

From relationships to RDF

800

- ex:ADS-01:DHL-NAE-CO-004/FCB.FEC-005.M-AHU-CO-00-06_AH-ENA    bf:isPointOf    ex: DHL-NAE-CO-004.FCB.FEC-005

- ex:ADS-01:DHL-NAE-CO-004/FCB.FEC-005.M-AHU-CO-00-06_AH-ENA    bf:hasLocation    ex: Darling_Harbour_Live.Convention_Center_Floor.Level_1.Zone_2.Hot_Kitchen_C01-K59

- ex: DHL-NAE-CO-004.FCB.FEC-021    bf:feeds    ex: DHL-NAE-CO-004.FCB.FEC-005

FIG. 8

From tagsets to Brick RDF

900

- ex:ADS-01 rdf:type brick:Server
- ex:DHL rdf:type brick:Building
- ex:NAE-CO-004/FCB rdf:type brick:NAE_Network_Adapter
- ex:FEC-005: rdf:type brick:FEC_Network_Adapter
- ex:M-AHU-CO-00-06: rdf:type brick:Air_Handler_Unit
- ex:ADS-01:DHL-NAE-CO-004/FCB.FEC-005.M-AHU-CO-00-06_AH-ENA    rdf:type    brick:After_Hour_Enable_Command
- ex: Darling_Harbour_Live.Convention_Center_Floor.Level_0 rdf:type    brick:Floor
- ex: ADS-01:DHL-NAE-CO-004/FCB.FEC-005.M-AHU-CO-00-06_AH-ENA    bf:isPointOf    ex: DHL-NAE-CO-004.FCB.FEC-005
- ex: ADS-01:DHL-NAE-CO-004/FCB.FEC-005.M-AHU-CO-00-06_AH-ENA    bf:hasLocation    ex:
Darling_Harbour_Live.Convention_Center_Floor.Level_1.Zone_2.Hot_Kitchen_C01-K59
- ex: DHL-NAE-CO-004.FCB.FEC-021    bf:feeds    ex: DHL-NAE-CO-004.FCB.FEC-005

| Unknown string | Point Name | What does the string mean? | What does the point name indicate? |
|---|---|---|---|
| | _1402 | _1404 | _1406 |
| ADS | ADS-01:DHL-NAE-CO-004/FCB.FEC-068.M-FCU-CO-01-05A_ZN-TSP | Application and Data Server | Zone Temperature Set Point |
| M | ADS-01:DHL-NAE-CO-3M02/FC-1.FEC-054.M-KEF-CO-5M-01_TIME-REM | | |
| C | ADS-01:DHL-NAE-CO-3M02/FC-1.FEC-053.M-FCU-CO-03-01B_C-CALL | | |
| CALL | ADS-01:DHL-NAE-CO-3M02/FC-1.FEC-053.M-FCU-CO-03-01B_C-CALL | | |
| H | ADS-01:DHL-NAE-CO-3M02/FC-1.FEC-018.M-AHU-CO-3M-14_H-CALL | | |

| Vendor Given Information | Human Interpretation | | |
| --- | --- | --- | --- |
| Raw Metadata | Point Type | Location | Equipment |
| ENG.CRAC-1.TEMPSETF | Temperature Setpoint | N/A | CRAC-1 |
| SC-CRAC-1-MIG-008.Tmp | Temperature Sensor | N/A | CRAC-1 |
| SC.3FLW-HALLZN-T | Zone Temperature Sensor | 3rd Floor, West-Hall | N/A |

```
{ "id": "ZNT-101",
  "zone": true,
  "temp": true,
  "equipRef": "vav-101"}
```

1700                                                                1702

Metadata                          Graph Metadata

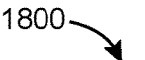
• http://example.com#ZNT-101 == ex:ZNT-101 (with prefix)
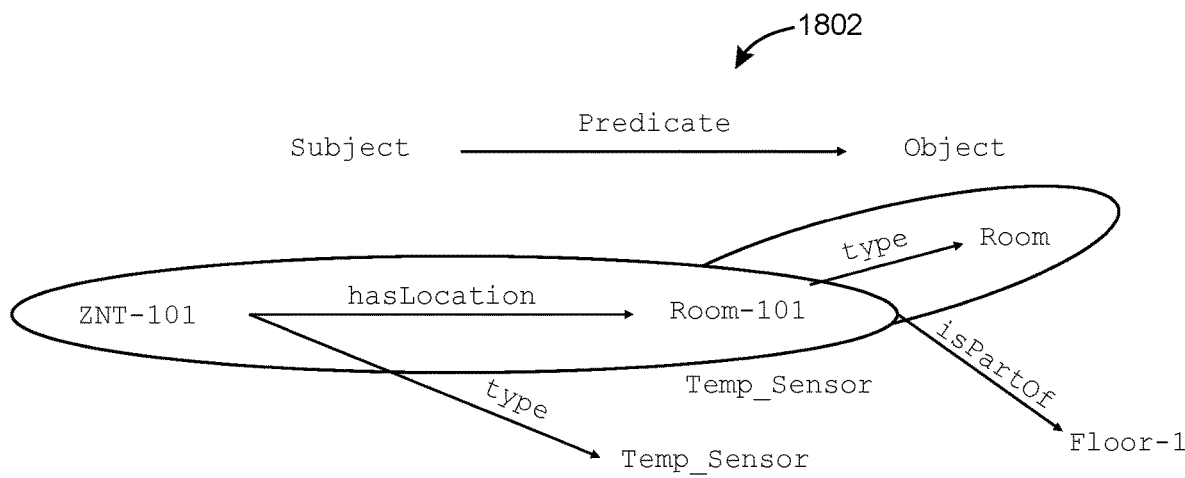
FIG. 18
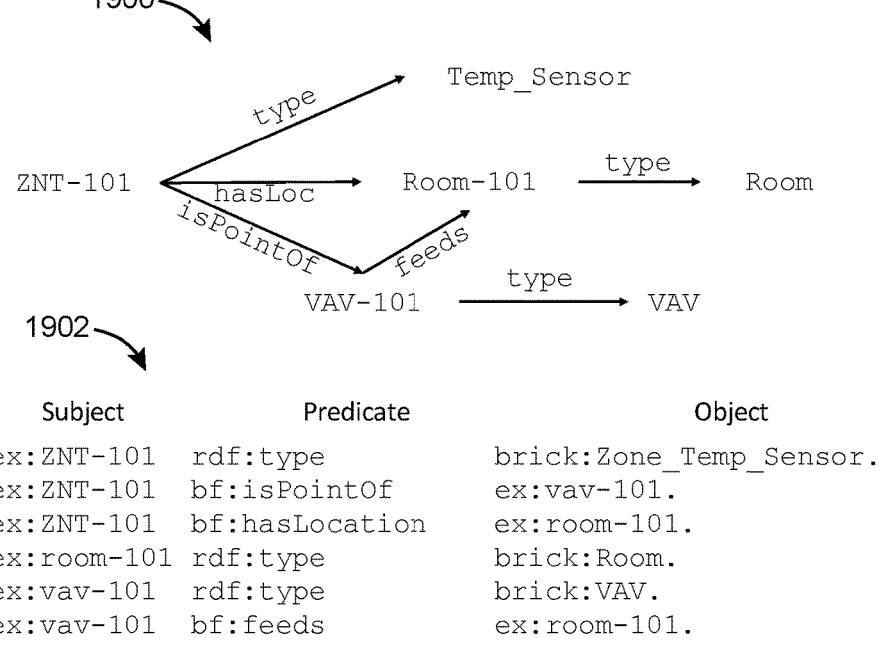
FIG. 19

2000

```
select ?znt where {
   ?znt rdf:type brick:Zone_Temp_sensor .
}
```

2002

2100

```
select ?z where {
   ex:AH1 bf:feeds+ ?z .
   ?z rdf:type brick:HVAC_Zone .
}
```

2002

2800

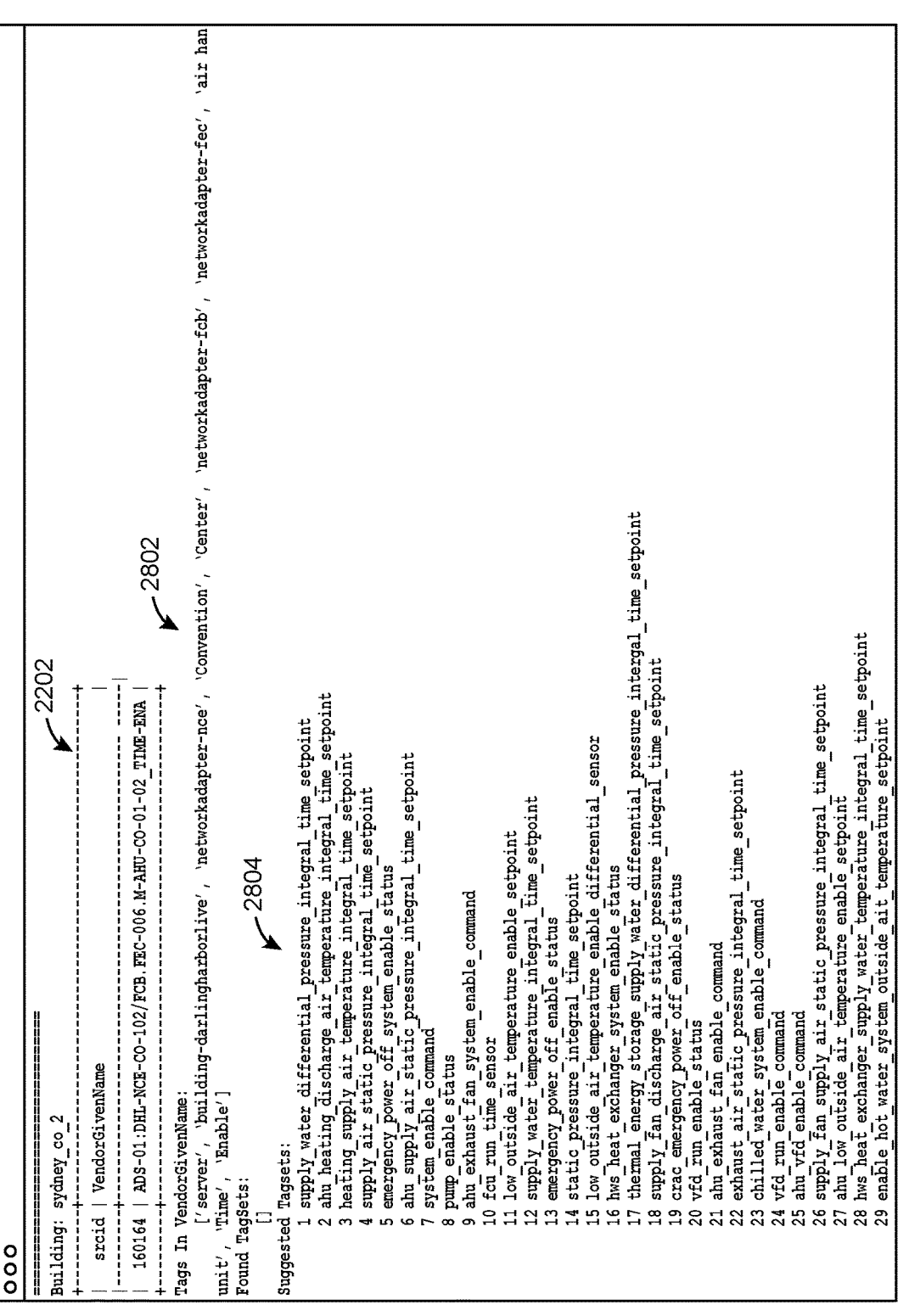

```
=====================================
Building: sydney_co_2
+---------+-------------
| srcid   | VendorGivenName
+---------+-------------
| 160164  | ADS-01:DHL-NCE-CO-102/FCB.FEC-006.M-AHU-CO-01-02_TIME-ENA |          2802
+---------+-------------+
```

```
Tags In VendorGivenName:
  ['server', 'building-darlingharborlive', 'networkadapter-nce', 'Convention', 'Center', 'networkadapter-fcb', 'networkadapter-fec', 'air han
unit', 'Time', 'Enable']              2804
Found TagSets:
  []
```

```
Suggested Tagsets:
 1 supply_water_differential_pressure_integral_time_setpoint
 2 ahu_heating_discharge_air_temperature_integral_time_setpoint
 3 heating_supply_air_temperature_integral_time_setpoint
 4 supply_air_static_pressure_integral_time_setpoint
 5 emergency_power_off_system_enable_status
 6 ahu_supply_air_static_pressure_integral_time_setpoint
 7 system_enable_command
 8 pump_enable_status
 9 ahu_exhaust_fan_system_enable_command
10 fcu_run_time_sensor
11 low_outside_air_temperature_enable_setpoint
12 supply_water_temperature_integral_time_setpoint
13 emergency_power_off_enable_status
14 static_pressure_integral_time_setpoint
15 low_outside_air_temperature_enable_differential_sensor
16 hws_heat_exchanger_system_enable_status
17 thermal_energy_storage_supply_water_differential_pressure_intergal_time_setpoint
18 supply_fan_discharge_air_static_pressure_integral_time_setpoint
19 crac_emergency_power_off_enable_status
20 vfd_run_enable_status
21 ahu_exhaust_fan_enable_command
22 exhaust_air_static_pressure_integral_time_setpoint
23 chilled_water_system_enable_command
24 vfd_run_enable_command
25 ahu_vfd_enable_command
26 supply_fan_supply_air_static_pressure_integral_time_setpoint
27 ahu_low_outside_air_temperature_enable_setpoint
28 hws_heat_exchanger_supply_water_temperature_integral_time_setpoint
29 enable_hot_water_system_outside_ait_temperature_setpoint
```

Figure 29:
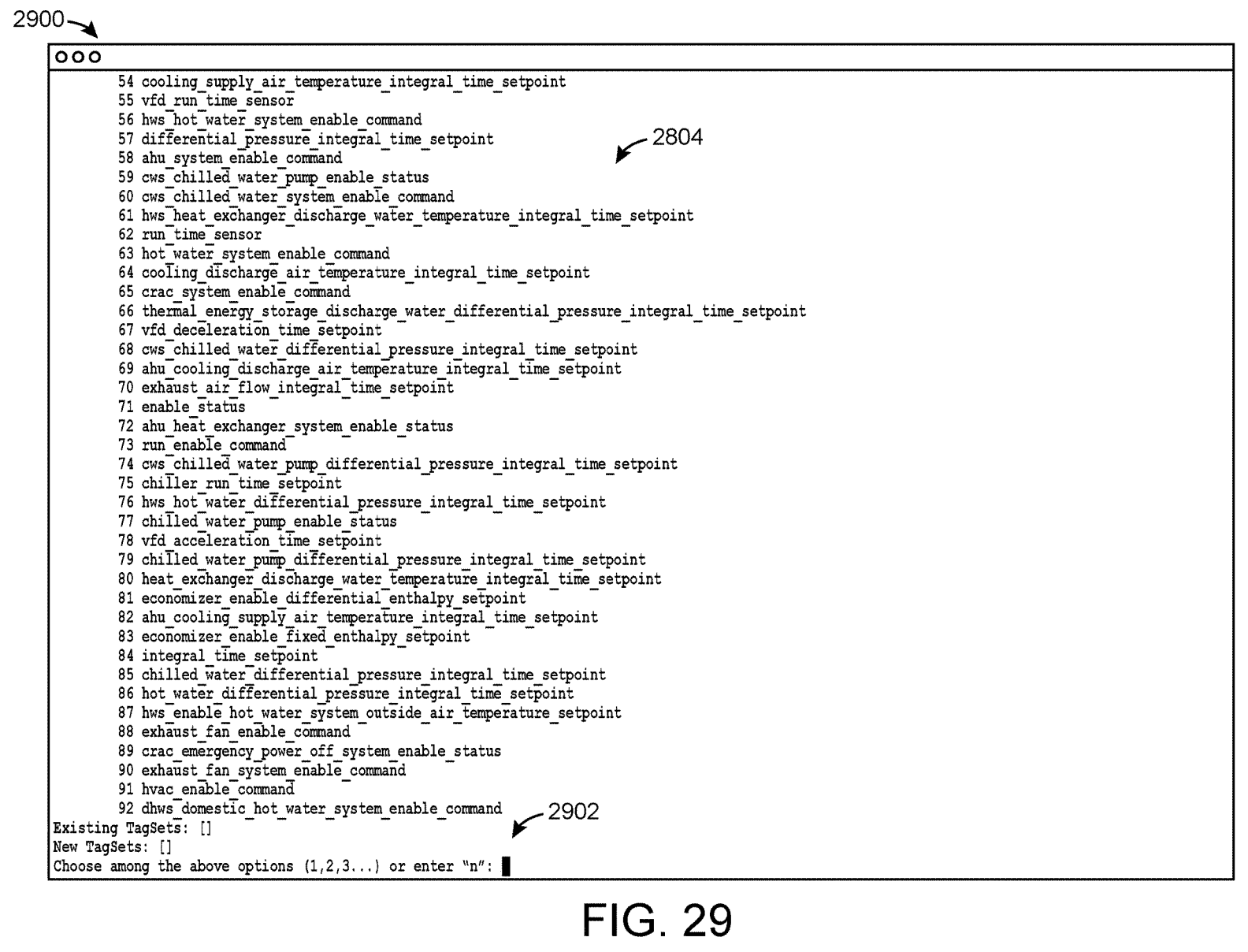

```
ooo
    54 cooling_supply_air_temperature_integral_time_setpoint
    55 vfd_run_time_sensor
    56 hws_hot_water_system_enable_command
    57 differential_pressure_integral_time_setpoint
    58 ahu_system_enable_command
    59 cws_chilled_water_pump_enable_status
    60 cws_chilled_water_system_enable_command
    61 hws_heat_exchanger_discharge_water_temperature_integral_time_setpoint
    62 run_time_sensor
    63 hot_water_system_enable_command
    64 cooling_discharge_air_temperature_integral_time_setpoint
    65 crac_system_enable_command
    66 thermal_energy_storage_discharge_water_differential_pressure_integral_time_setpoint
    67 vfd_deceleration_time_setpoint
    68 cws_chilled_water_differential_pressure_integral_time_setpoint
    69 ahu_cooling_discharge_air_temperature_integral_time_setpoint
    70 exhaust_air_flow_integral_time_setpoint
    71 enable_status
    72 ahu_heat_exchanger_system_enable_status
    73 run_enable_command
    74 cws_chilled_water_pump_differential_pressure_integral_time_setpoint
    75 chiller_run_time_setpoint
    76 hws_hot_water_differential_pressure_integral_time_setpoint
    77 chilled_water_pump_enable_status
    78 vfd_acceleration_time_setpoint
    79 chilled_water_pump_differential_pressure_integral_time_setpoint
    80 heat_exchanger_discharge_water_temperature_integral_time_setpoint
    81 economizer_enable_differential_enthalpy_setpoint
    82 ahu_cooling_supply_air_temperature_integral_time_setpoint
    83 economizer_enable_fixed_enthalpy_setpoint
    84 integral_time_setpoint
    85 chilled_water_differential_pressure_integral_time_setpoint
    86 hot_water_differential_pressure_integral_time_setpoint
    87 hws_enable_hot_water_system_outside_air_temperature_setpoint
    88 exhaust_fan_enable_command
    89 crac_emergency_power_off_system_enable_status
    90 exhaust_fan_system_enable_command
    91 hvac_enable_command
    92 dhws_domestic_hot_water_system_enable_command
Existing TagSets: []
New TagSets: []
Choose among the above options (1,2,3...) or enter "n":  ■
```

SYSTEMS AND METHODS FOR MAPPING A BUILDING SCHEMA INTO A GRAPH DATA SCHEMA

CROSS-REFERENCE TO RELATED PATENT APPLICATION

This application claims the benefit of and priority to U.S. Provisional Patent Application No. 62/751,378 filed Oct. 26, 2018, the entirety of which is incorporated by reference herein.

BACKGROUND

The present disclosure relates generally to building management systems of a building. The present disclosure relates more particular to schema translation for building management systems.

In a building management system, a building and equipment of the building can be represented as text strings, strings of characters representing the building, points, and equipment. The building management system can represent the building, points, and equipment with the text strings according to a first schema. For example, character strings such as BACnet points or METASYS metadata can be, or include, textual descriptions. Building management systems that operate according to the first schema may require expert knowledge to understand what each string represents in the first schema. If the building management system is updated to operate on data according to a second schema, there may be no direct mapping between the first schema and the second schema making it difficult, or requiring excessive user intervention, to map between the first and second schemas. The difficulty can, in some cases, prevent building operators from updating the building management system from operating on data of the first schema to the second schema.

SUMMARY

One implementation of the present disclosure is a building schema mapping system, the system including one or more memory devices configured to store instructions, that, when executed by one or more processors, cause the one or more processors to receive strings in a first schema, each string representing at least one of a point, building equipment, or a building space, extract relationships from the strings, each relationship of the relationships indicating a particular relationship between a first string of the plurality of strings and a second string of the plurality of strings, label each of the strings based on characters of each of the strings, and generate a graph data structure of a second schema based on the relationships and a label of each of the strings.

In some embodiments, the instructions cause the one or more processors to receive a naming convention from an external system, the naming convention indicating a mapping between a particular character or a particular character group and a tag of a predefined set of tags, generate or update a dictionary, the dictionary comprising the mapping between the particular character or the particular character group and the tag of the predefined set of tags, and label each of the plurality of strings based on the characters of each of the plurality of strings with the dictionary by matching the characters of each of the plurality of strings to dictionary characters of the predefined set of tags.

In some embodiments, the instructions cause the one or more processors to assign an index value to each character of each of the plurality of strings, determine a beginning index values, one or more middle index values, and an ending index value for one or more groups of characters of each of the plurality of strings, the one or more groups of characters associated with a tag of a set of predefined tags, and assign a particular beginning index value and one or more particular middle index values the tag.

In some embodiments, the strings are at least one of sub-string sections of a single string or are each a separate string.

In some embodiments, the instructions cause the one or more processors to label each of the strings based on the characters of each of the strings by assigning groups of characters of each of the plurality of strings a tag of a predefined set of tags and assigning each of the strings a tag-set of a predefined set of tag-sets based on particular tags assigned to each of the plurality of strings.

In some embodiments, the instructions cause the one or more processors to generate a type relationship for each of the plurality of strings, the type relationship relating each of the plurality of strings to the tag-set assigned to each of the plurality of strings and generate the graph data structure further based on the type relationship of each of the plurality of strings and the tag-set assigned to each of the plurality of strings.

In some embodiments, the instructions cause the one or more processors to identify a root sub-string common across all of the strings and one or more first leaf sub-strings common across two or more of the strings, and one or more second leaf sub-strings unique to each of the strings, generate a tree data structure with the root sub-string, the one or more first leaf sub-strings, and the one or more second leaf sub-strings, wherein the tree data structure includes branches across the root sub-string, the one or more first leaf sub-strings, and the one or more second leaf sub-strings, wherein each branch of the plurality of branches represents one string of the strings, and label each of the strings based on the tree data structure.

In some embodiments, the instructions cause the one or more processors to label each of the strings based on the tree data structure by labeling leaf characters of the root sub-string, the one or more first leaf sub-strings, and the one or more second leaf sub-strings by labeling from the root sub-string to the one or more second leaf sub-strings according to a hierarchy of the tree data structure.

In some embodiments, the instructions cause the one or more processors to assign, for one string of the strings, each of character groups a tag, identify one or more unknown character groups of the one string, generate a user interface and cause the user interface to include an indication of the one or more unknown character groups, and receive an input from a user via the user interface, the input indicating a manually assigned tag to each of the one or more unknown character groups.

In some embodiments, the instructions cause the user interface to include one or more suggested tags, wherein the input received from the user is a selection of one of the one or more suggested tags or is a manually defined tag.

In some embodiments, the instructions cause the one or more processors to assign, for one string of the plurality of strings, a plurality of tags, wherein each of a plurality of character groups is assigned one tag, generate a user interface and cause the user interface to include an indication of the plurality of tags, and receive an input from a user via the user interface, the input indicating an assigned tag-set to the one string.

In some embodiments, the instructions cause the user interface to include one or more suggested tag-sets, wherein the input received from the user is a selection of one of the one or more suggested tag-sets or is a manually defined tag-set.

Another implementation of the present disclosure is a method of building schema mapping. The method including receiving, by a processing circuit, a plurality of strings in a first schema, each string representing at least one of a point, building equipment, or a building space, extracting, by the processing circuit, a plurality of relationships from the plurality of strings, each relationship of the plurality of relationships indicating a particular relationship between a first string of the plurality of strings and a second string of the plurality of strings, labeling, by the processing circuit, each of the plurality of strings based on characters of each of the plurality of strings, and generating, by the processing circuit, a graph data structure of a second schema based on the plurality of relationships and a label of each of the plurality of strings.

In some embodiments, the method includes receiving, by the processing circuit, a naming convention from an external system, the naming convention indicating a mapping between a particular character or a particular character group and a tag of a predefined set of tags, generating or updating, by the processing circuit, a dictionary, the dictionary including the mapping between the particular character or the particular character group and the tag of the predefined set of tags, and labeling, by the processing circuit, each of the plurality of strings based on the characters of each of the strings with the dictionary by matching the characters of each of the strings to dictionary characters of the predefined set of tags.

In some embodiments, the method further includes assigning, by the processing circuit, an index value to each character of each of the strings, determining, by the processing circuit, a beginning index values, one or more middle index values, and an ending index value for one or more groups of characters of each of the strings, the one or more groups of characters associated with a tag of a set of predefined tags, and assigning, by the processing circuit, a particular beginning index value and one or more particular middle index values the tag.

In some embodiments, the strings are at least one of sub-string sections of a single string or are each a separate string.

In some embodiments, labeling, by the processing circuit, each of the strings based on the characters of each of the strings include assigning groups of characters of each of the plurality of strings a tag of a predefined set of tags and assigning each of the plurality of strings a tag-set of a predefined set of tag-sets based on particular tags assigned to each of the plurality of strings.

In some embodiments, the method further includes generating, by the processing circuit, a type relationship for each of the plurality of strings, the type relationship relating each of the strings to the tag-set assigned to each of the strings and generating, by the processing circuit, the graph data structure further based on the type relationship of each of the plurality of strings and the tag-set assigned to each of the plurality of strings.

Another implementation of the present disclosure is a building system, the building system including a building management system configured to operate one or more pieces of building equipment based on a plurality of strings of a first schema and a building schema mapping system configured to receive the strings from the building management system, each string representing at least one of a point, building equipment, or a building space, extract relationships from the strings, each relationship of the relationships indicating a particular relationship between a first string of the plurality of strings and a second string of the strings, label each of the strings based on characters of each of the plurality of strings, and generate a graph data structure of a second schema based on the relationships and a label of each of the strings.

In some embodiments, the building schema mapping system is configured to label each of the strings based on the characters of each of the strings by assigning groups of characters of each of the strings a tag of a predefined set of tags and assigning each of the strings a tag-set of a predefined set of tag-sets based on particular tags assigned to each of the strings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7 is a text description of relationships extracted from the first building schema by the mapping system of FIG. 3, according to an exemplary embodiment.

FIG. 8 is a text description of the relationships of FIG. 7 converted into a resource description framework (RDF) format, according to an exemplary embodiment.

FIG. 9 is a text description of strings in the first building schema translated into tag-sets of the second graph data schema in RDF format, according to an exemplary embodiment.

FIG. 14 is a table generated by the mapping system of FIG. 3 prompting a user to identify unknown strings, according to an exemplary embodiment.

FIG. 15 is a table of building metadata illustrating the differences between schemas of various vendors, according to an exemplary embodiment.

FIG. 18 is a block diagram of a graph for a BRICK RDF data model, according to an exemplary embodiment.

FIG. 19 is a block diagram of the BRICK RDF data model serialized, according to an exemplary embodiment.

FIG. 28 is another user interface generated by the mapping system of FIG. 3 where the user interface prompts the user to select a tag-set from a set of tag-sets for the string, according to an exemplary embodiment.

FIG. 29 is another user interface generated by the mapping system of FIG. 3 where the user interface prompts the user to select a tag-set from a set of additional tag-sets for the string, according to an exemplary embodiment.

DETAILED DESCRIPTION

Overview

Referring generally to the FIGURES, systems and methods for mapping building metadata in a particular schema into a graph data schema are shown, according to an exemplary embodiment. In some embodiments, the systems and methods can be configured to map metadata in a first building schema into a BRICK schema, the BRICK schema identifying both entities and relationships between entities. In some embodiments, the systems and methods can be applied to legacy building entity data so that the legacy data can be translated into the BRICK schema. Furthermore, based on the BRICK schema, a visual BRICK data graph can be generated by the systems and methods.

The systems and methods of the present disclosure can implement automated translation from known or unknown schemas into a graph data schema. Conventional data transition techniques are often laborious and are done in an exhaustive manner by a user. The systems and methods as discussed herein can select data to label in a particular order that improves processing times for speeding up translation. Furthermore, the systems and methods can utilize dictionary matching and/or machine learning to speed up translation time and capture not only the identifies of entities, but also relationships between the entities allowing graph data structures to be generated.

The systems and methods can be configured to map metadata of buildings into a common schema which solves the problem of standardization building entity names and captures relationships between entities. Since multiple different building data schemas can be mapped into a single graph data structure schema (e.g., BRICK), many applications for building control and/or monitoring can be built to operate based on a single schema. The systems and methods described herein can be configured to utilize RDF queries via SPARQL to extract relationship information between entities from building metadata to create a BRICK graph.

The systems and methods as described herein can be configured to map legacy building entity data into BRICK tag-sets and provide an end to end process that extracts building entity relations from multiple data sources (e.g., METASYS). The systems and methods can be configured to extract building data in RDF format for efficient labeling of substrings and can extract relationship information between entities to create a BRICK graph. The extraction can be performed with SPARQL. Furthermore, the systems and methods as discussed herein can provide an interactive software tool to speed up labeling (by dictionary lookup and/or machine learning based prediction and make the labeling process more structured). In some embodiments, the interactive software tool can automatically suggest BRICK tag-sets from labels assigned to a string by dictionary lookup or/or machine learning based prediction to a user for confirmation.

Building with Building Systems

Figure 1:
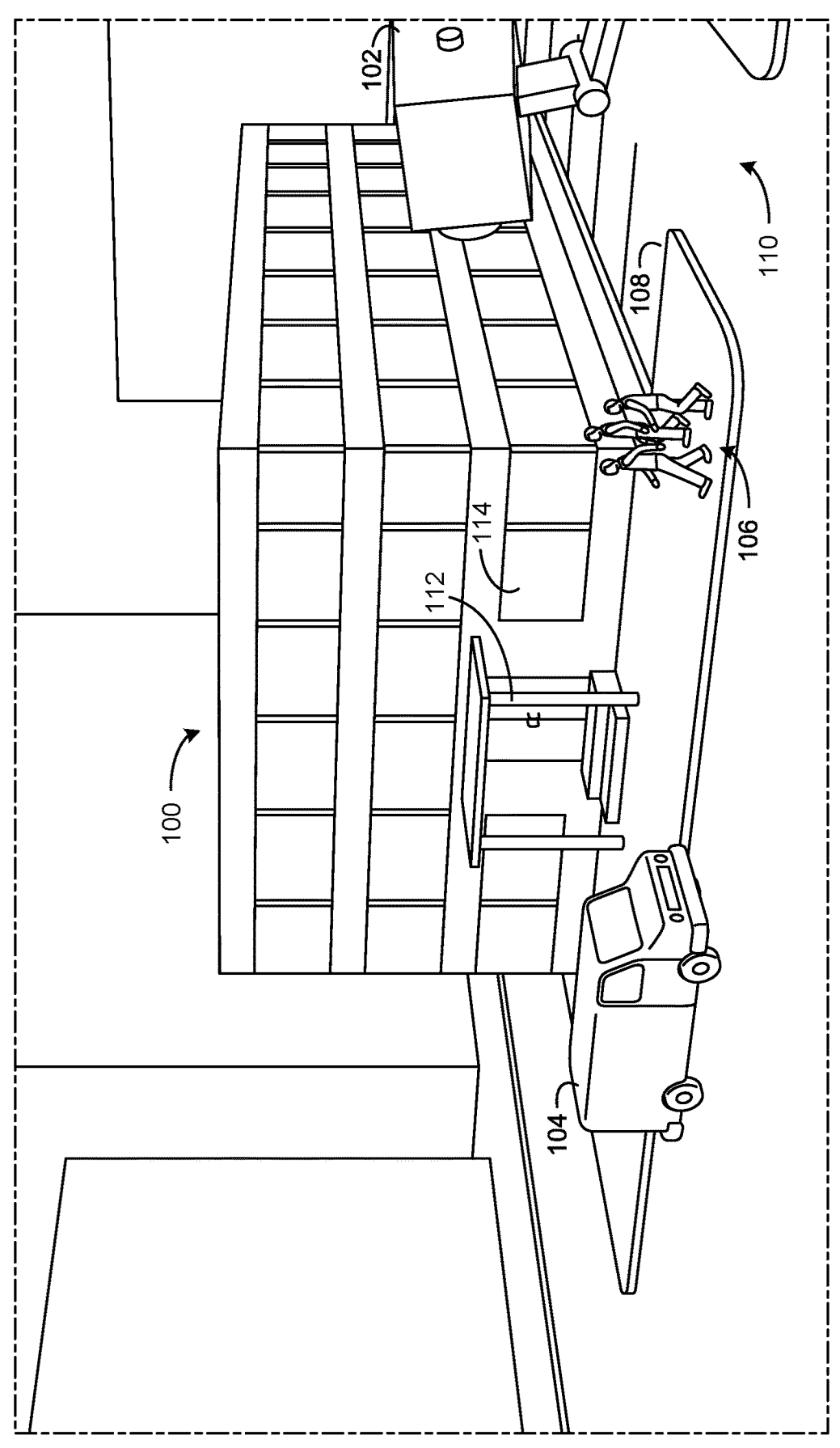
FIG. 1 is a perspective view schematic drawing of a building with building systems, according to an exemplary embodiment.

Referring now to FIG. 1, a building 100 with a security camera 102 and a parking lot 110 is shown, according to an exemplary embodiment. The building 100 is a multi-story commercial building surrounded by or near the parking lot 110 but can be any type of building in some embodiments. The building 100 can be a school, a hospital, a store, a place of business, a residence, an apartment complex, a hotel, an office building, etc. The building 100 may be associated with the parking lot 110.

Both the building 100 and the parking lot 110 are at least partially in the field of view of the security camera 102. In some embodiments, multiple security cameras 102 may be used to capture the entire building 100 and parking lot 110 not in (or in to create multiple angles of overlapping or the same field of view) the field of view of a single security camera 102. The parking lot 110 can be used by one or more vehicles 104 where the vehicles 104 can be either stationary or moving (e.g. delivery vehicles). The building 100 and parking lot 110 can be further used by one or more pedestrians 106 who can traverse the parking lot 110 and/or enter and/or exit the building 100. The building 100 may be further surrounded or partially surrounded by a sidewalk 108 to facilitate the foot traffic of one or more pedestrians 106, facilitate deliveries, etc. In other embodiments, the building 100 may be one of many buildings belonging to a single industrial park, shopping mall, or commercial park having a common parking lot and security camera 102. In another embodiment, the building 100 may be a residential building or multiple residential buildings that share a common roadway or parking lot.

The building 100 is shown to include a door 112 and multiple windows 114. An access control system can be implemented within the building 100 to secure these potential entrance ways of the building 100. For example, badge readers can be positioned outside the door 112 to restrict access to the building 100. The pedestrians 106 can each be associated with access badges that they can utilize with the access control system to gain access to the building 100 through the door 112. Furthermore, other interior doors within the building 100 can include access readers. In some embodiments, the doors are secured through biometric information, e.g., facial recognition, fingerprint scanners, etc. The access control system can generate events, e.g., an indication that a particular user or particular badge has interacted with the door. Furthermore, if the door 112 is forced open, the access control system, via door sensor, can detect the door forced open (DFO) event.

The windows 114 can be secured by the access control system via burglar alarm sensors. These sensors can be configured to measure vibrations associated with the window 114. If vibration patterns or levels of vibrations are sensed by the sensors of the window 114, a burglar alarm can be generated by the access control system for the window 114.

The building 100 can further include HVAC systems. For example, waterside systems, airside systems, building management systems, and/or various other HVAC systems can be included within the building 100. For example, equipment such as chillers, boilers, rooftop units, air handler units, thermostats, sensors, actuators, dampers, valves, and other equipment can be implemented within the building 100 to control the environmental conditions of the building 100. Examples of building equipment that can be implemented within the building 100 can be found in U.S. patent application Ser. No. 16/048,052 filed Jul. 27, 2018, the entirety of which is incorporated by reference herein.

Schema Mapping

Figure 2:
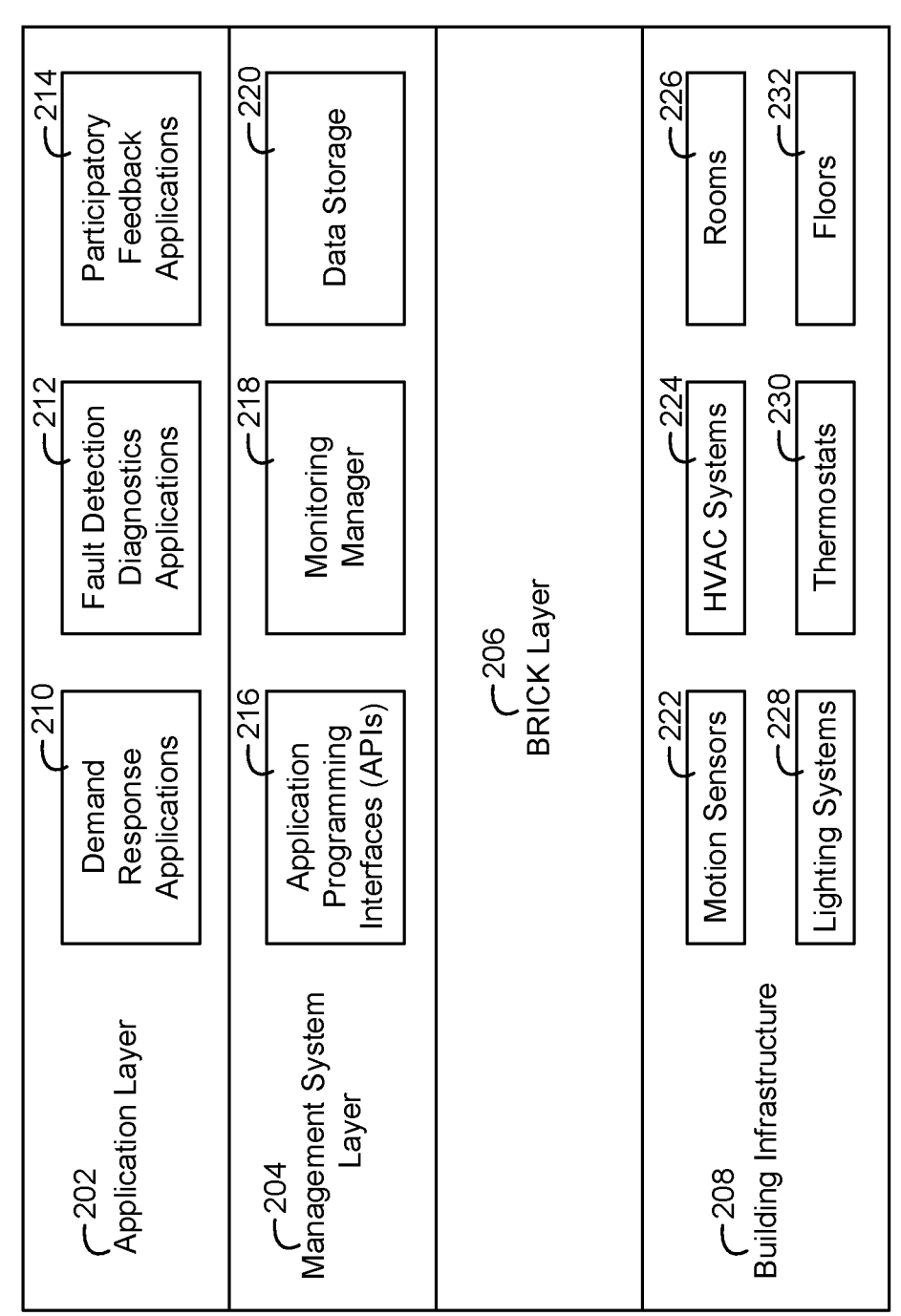
FIG. 2 is a block diagram of a system with software layers including a software layer implementing a graph data structure schema, BRICK, for operation of the building systems illustrated in FIG. 1, according to an exemplary embodiment.

Referring now to FIG. 2 a system 200 implementing a graph data structure for operation of the building systems is shown, according to an exemplary embodiment. The system 200 is shown to include an application layer 202, a management system layer 204, a BRICK layer 206, and building infrastructure 208. The system 200 is implemented for the building 100 of FIG. 1, in some embodiments. The building infrastructure 208 can include motion sensors 222, HVAC systems 224, rooms 226, floors 232, lighting systems 228, thermostats 230, and/or any other equipment or space (e.g., campuses, buildings, etc.). In some embodiments the building infrastructure 208 includes the building systems as described with reference to FIG. 1. The building infrastructure 208 may be building entities (sensors, actuators, locations, etc.) within buildings that the system 200 can discover and build and/or run applications on top of.

The BRICK layer 206 may be an implementation of the BRICK specification which defines how entities in a building are be named, defines relationships between entities, and defines how the entities and relationships can be visualized as a graph. Details of BRICK can be found in *Brick: Towards a Unified Metadata Schema For Buildings* by Balaji, Bharathan, et al. published Nov. 16, 2016, *Scrabble: Transferrable Semi-Automated Semantic Metadata Normalization Using Intermediate Representation* by Jason Koh, et. al. published in November of 2018, and Poster: *Scrabble: Converting Unstructured Metadata into Brick for Many Buildings* by Jason Koh, et. al. published in November of 2017, the entirety of each of which is incorporated by reference herein. A building that is to be newly commissioned can follow the BRICK specifications. However, there may be difficulty allowing an existing building to use BRICK, i.e., translating entities in an existing legacy building into the BRICK format. The systems and methods as discussed herein can be configured to implement a mapping from legacy building entity definitions in a legacy schema into the BRICK schema.

Many buildings are not smart buildings but can be implemented as smart building though mapping of building metadata into the BRICK schema. Buildings may be important for technological improvement since buildings result in 30% of energy consumption and people spend 87% of their time indoors. Buildings have numerous subsystems and/or sensors and offer an Internet of Things (IoT) platform. Smart buildings that implement schemas like BRICK may realize benefits with fault diagnostics, model-predictive control, energy dashboard visualization, etc. These applications, in many cases, are not deployed in legacy buildings since there is a disparity between system integrators and application developers. Implementing high level controls e.g., the application layer 202 in a large deployment cost may realize short of Return of Investment (ROI) ratio due to the large amount of implementation time required to configure the application layer 202 to integrate with the existing metadata schema of the building. However, this can be solved with translation of the existing metadata into BRICK since all of the applications in the application layer 202 can be configured to utilize BRICK and therefore do not require reconfiguration. The systems of building soften lack interoperability which BRICK can solve.

Metadata can be crucial in implementing high level control, e.g., the application layer 202 and/or the management system layer 204. For example, in a building system, control could be set up to activate air conditioning (AC) when a particular room, e.g., room-2150, is occupied. Metadata information such as what occupancy sensors are in room-2150, what the HVAC on/off command is, where room-2150 is located, what sensors are located within the room-2150 need to be resolved to perform the control. Unstructured metadata in a building may not allow for easy control decision, however, BRICK can implement such identification of metadata information and allow control applications to be agnostic to underlying building resources the control applications operate on.

The application layer 202 can be a layer of applications that operate based on data in the BRICK schema. For example, the demand response applications 210 can be an application configured to control energy consumption of a building, i.e., curtail power use of an energy grid at various times in a day to reduce utility costs and/or generate revenue. The fault detection diagnostics applications 212 can be rule based or model based applications configured to monitor the performs of building equipment and detect or predict faults, schedule maintenance, etc. The participatory feedback applications 214 can be systems that collect feedback from users to modify the operation of building equipment. For example, users can provide feedback on lighting levels, temperature comfort, etc. which the participatory feedback applications 214 can be used to modify operation of the building equipment.

The management system layer 204 can be a layer of components connecting the application layer 202 to the building infrastructure 208. The management system layer 204 can be based on the BRICK schema. To allow integration between the application layer 202 and the building infrastructure 208, the management system layer 204 can include application programming interfaces (APIs) 216. Furthermore, the management system layer 204 can include a monitoring manager 218 for monitoring and receiving data from the building infrastructure 208. The monitoring manager 218 can provide the received data to the data storage 220, the data storage 220 can be configured to store data for the building infrastructure 208. The data storage 220 can be one or more databases, e.g., Oracle, MySQL, relational database management system (RDBMS), etc. BRICK can allow for smart buildings with automatic FDD applications, energy forecasting applications, user dashboard applications, and/or any other smart application that operates agnostically of underlying data through the BRICK schema. Consistently mapping points from physical devices to the virtual world via BRICK provides discoverability, interoperability, and portability. BRICK provides semantic and contextual information of building entities.

Figure 3:
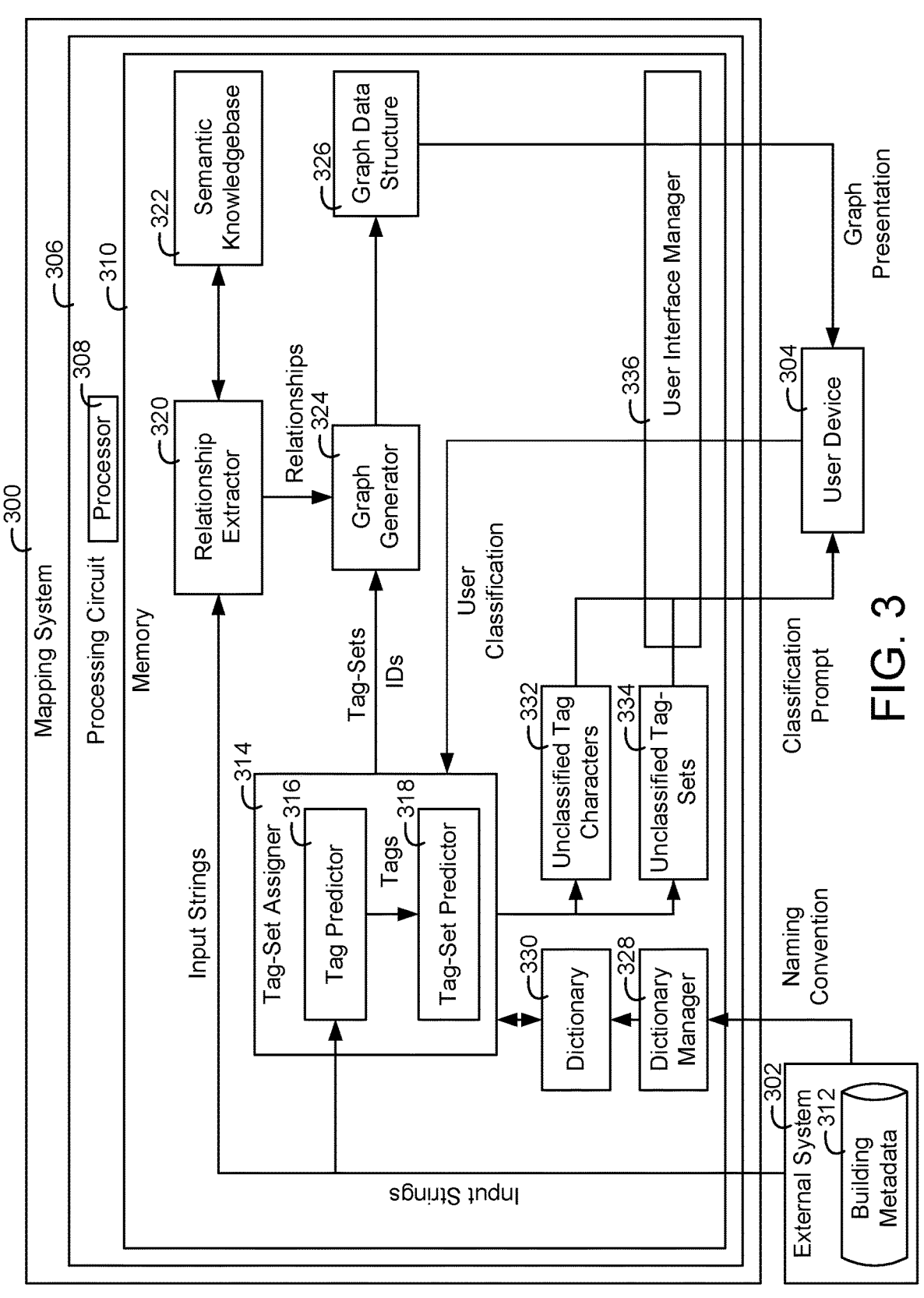
FIG. 3 is a block diagram of a translation system a first building schema into a graph data schema, according to an exemplary embodiment.

Referring now to FIG. 3, a mapping system 300 is shown for mapping building metadata from a first schema into a graph data schema, according to an exemplary embodiment. The mapping system 300 is shown to communicate with an external system 302 and a user device 304. The mapping system 300 can be configured to receive string data in the first schema from the external system 302 and map the string data by classifying characters and groups of characters in the string data. The result of the classification and mapping may be a graph data structure in a graph data schema, e.g., in a BRICK schema.

The mapping system 300 can be implemented in a server, multiple servers, a cloud computing platform (e.g., MICROSOFT AZURE, AMAZON WEB SERVICES, etc.), a controller, via microservices located across multiple computing devices, and/or on (or distributed across) any other computing device or system. In some embodiments, the mapping system is implemented via the processing circuit 306 (e.g., a memory and/or a processor) and/or implemented across multiple processing circuits 306 (e.g., multiple memories and/or processors).

The processor 308 can be a general purpose processor, an application specific integrated circuit (ASIC), one or more field programmable gate arrays (FPGAs), a group of processing components, or other suitable electronic processing components. Processor 308 can be communicatively coupled to the memory 310. The memory 310 can include one or more devices (e.g., memory units, memory devices, storage devices, etc.) for storing data and/or computer code for completing and/or facilitating the various processes described in the present disclosure.

The memory 310 can include random access memory (RAM), read-only memory (ROM), hard drive storage, temporary storage, non-volatile memory, flash memory, optical memory, or any other suitable memory for storing software objects and/or computer instructions. The memory 310 can include database components, object code components, script components, or any other type of information structure for supporting the various activities and information structures described in the present disclosure. The memory 310 can be communicably connected to the processor 308 via the processing circuit 306 and can include computer code for executing (e.g., by the processor 308) one or more processes described herein.

Memory 310 is shown to include a tag-set assigner 314 which can assign labels to string metadata, i.e., determine tags for a string and generate a tag-set, i.e., a particular element represented by the determined tags. The tag-set assigner 314 includes a tag predictor 316 and a tag-set predictor 318. Based on an input string receive, the tag predictor 316 can assign groups of characters tags, the tags may be zone, equipment, building, point, temperature, humidity, server, controller, etc. The tags, when analyzed together by the tag-set predictor 318, can represent a tag-set, for example, "Zone Temperature Sensor," "Controller Air-flow Setpoint," etc. In this regard, the tag predictor 316 can determine tags and the tag-set predictor 318 can determine a tag-set for the tags. The tags and the tag-sets identified by the tag-set assigner 314 may be predefined tags and tag-sets. For example, the tags and tag-sets can be predefined tag-sets of a particular schema, e.g., BRICK. In this regard, the tag-set assigner 314 can store a list of available tags and/or tag-sets for user in prediction by the tag-set assigner 314.

In the BRICK schema, every entity in a building is represented by a tag-set, which is decomposed to multiple Tags. BRICK can model points, equipment, locations, measurement properties, etc. as entities via a tag-set. Tag-sets can be ordered as a hierarchy, for example, a tag-set Equipment can have be a high level class for an HVAC tag-set which in turn can be a high level class for an AHU tag-set.

As an example, "Room Temperature Sensor" may be a particular tag-set made up of multiple tags, e.g., Room, Temperature, and Sensor. The Room Temperature Sensor tag-set can be a subclass of a Temperature Sensor tag-set, which itself may be a subclass of a Sensor tag-set. With such a hierarchy, a system can find a collection of temperature sensors easily using SPARQL or tag searching. In some embodiments, in the BRICK schema, new custom tag-sets with tags can be added to make the schema comprehensive.

In BRICK, tags can represent a unit concept in buildings and are decomposed from tag-sets. Tags can be used to infer a tag-sets meaning and allow a system to search a BRICK model without using a query language. For example, a system can easily identify that the tag-set "Room Temperature Sensor" is related to the tags "Room," "Temperature," and "Sensor" programmatically. This moderates tag-based representation mechanisms to have more coverage.

The tag-set assigner 314 can receive an input string from the external system 302, the input strings may be data representative of building entities of a building in a particular schema. For example, the external system 302 (or in some embodiments the mapping system 300 itself) can include a database of building metadata 312. The building metadata 312 can be a set of strings representing particular points of a building. These sets of strings can be in a comma separated value (CSV) file or any other type of file. In some embodiments, the tag-set assigner 314 generates one or multiple queries for the external system 302 and receives input strings in response to the queries. For example, the external system 302 can be a METASYS system and the queries can cause the external system 302 to respond with strings representing the various points of the external system 302.

The mapping system 300 can further receive a naming convention from the external system 302, the naming convention may define particular entities e.g., the names or acronyms for entities and/or relational elements (e.g., delimiters such as "." "-" "FF" "→"). For example, the naming convention can provide mappings between various characters or character groups and tags. For example, SP and SET-P may both be character groupings that correspond to the tag "setpoint." Furthermore, relational elements, e.g., delimiters or characters which indicate the beginning or ending of strings or represent a break between two tags. The naming convention can be used by a dictionary manager 328 of the memory 310 to generate a dictionary 330. The dictionary 330 may store one or multiple mappings between characters and tags for one or multiple different schemas. The dictionary manager 328 can update the dictionary 330 in response to receiving the naming convention from the external system 302 or can continuously update the dictionary 330 with new naming convention information received from the external system 302.

The tag predictor 316 can be configured to parse the input string to identify particular sets of characters which pertain to a particular tag based on the dictionary 330. The tag predictor 316 can perform matching between characters of the input strings and character sets of the dictionary 330 formed based on the naming convention. In some embodiments, the tag predictor 316 implements various statistical methods (e.g., hidden Markov models), neural networks, Bayesian networks, latent semantic analysis, or other machine learning algorithms to implement the classification of characters of the input strings into tags.

The tag-set predictor 318 can be configured to generate tag-sets based on the tags predicted by the tag predictor 316. For example, a particular set of tags, e.g., as indicated by the dictionary 330, may correspond to a particular tag-set. Furthermore, one or more logical rule-sets can define which groups of tags, or which order tags are identified in the string, correspond to particular tag-sets. The tag-set predictor 318 can be configured to implement various statistical methods (e.g., hidden Markov models) or other machine learning algorithms to perform determinations of tag-sets from tags. In some embodiments, the tag-set predictor 318 implements various statistical methods (e.g., hidden Markov models), neural networks, Bayesian networks, latent semantic analysis, or other machine learning algorithms to implement the classification of tags into tag-sets.

The result of the entity labeling of the tag-set assigner 314 may be tag-sets and identifiers (IDs). The IDs can be identifying information that the tag-set assigner 314 identifies does not correspond to a tag but rather identifies a particular tag. For example, "FEC-31" may correspond to a "controller" tag where the particular controller represented by the tag is the number 31 controller. The tag-set assigner 314 can provide the tag-sets and IDs to the graph generator 324 for generation of a graph data structure 326.

The relationship extractor 320 can receive the input strings from the external system 302. In some embodiments, the relationship extractor 320 queries the external system 302 similar to, or the same as, the tag-set assigner 314. The relationship extractor 320 can analyze strings representing various elements to identify relationships between the elements. The relationship extractor 320 can provide the relationships to the graph generator 324.

In some embodiments, the relationship extractor 320 receives relational rules from a semantic knowledgebase 322. For example, a rule may indicate that a string representing a control point subsequently following a string representing a controller may indicate a "isAPointOf" relationship should be assigned between the string representing the controller and the string representing the control point. Similar other rules can be implemented to identify the relationships. In some embodiments, the relationship extractor 320 implements various statistical methods (e.g., hidden Markov models), neural networks, Bayesian networks, latent semantic analysis, or other machine learning algorithms to implement the identification of relationships between the strings. Furthermore, in some embodiments, the relationship extractor 320 operates on the tag-sets generated by the tag-set assigner 314 to determine the relationships.

The semantic knowledgebase 322 can include relationships between various tag-sets. The relationships may be common relationships that are provided to the mapping system 300 and/or can be relationships learned by the mapping system 300. Examples of the relationships can be a "VAV" tag-set "feeds" (the relationship) air into a room or space (a tag-set of a space type). Furthermore, an example of a relationship can be that a temperature sensor is located in a room or space.

Based on the tag-sets generated by the tag-set assigner 314 and relational information extracted by the relationship extractor 320 via a semantic knowledgebase 322 the graph generator 324 can generate the graph data structure 326. The resulting graph data structure 326 can be presented to the user device 304 for a user to review. In some embodiments, constructing the graph data structure 326 includes assigning the relationships determined by the relationship extractor 320 between strings to the tag-sets corresponding to the strings.

If one or more characters or groups of characters of the input strings are not assigned tags or tag-sets by the tag-set assigner 314, or are not assigned tags or tag-sets at a confidence level above a predefined amount, the tag-set assigner 314 can add the undefined tags or tag-sets to a confusion buckets, i.e., unclassified tag characters 332 and/ or unclassified tag-sets 334. A user can review the unclassified tag characters 332 and provide definitions for the undefined characters via the user device 304. The user defined tags can then be applied by the tag-set assigner 314 to the input string. For example, user input for characters in the unclassified tag characters 332 can be added to the dictionary 330 and/or utilized by the tag predictor 316 to classify characters of the input strings.

Similarly, a group of tags determined by the tag predictor 316 that the tag-set predictor 318 cannot assign a particular tag-set (or cannot assign the particular tag-set with a predefined confidence level) can be provided to the user device 304 for review and classification by a user. The user can provide an indication of the proper tag-set for a group of tags. The tag-set and the corresponding group of tags can be added to the dictionary 330 by the dictionary manager 328 and/or used by the tag-set assigner 314 in generating tag-sets for the graph generator 324.

The memory 310 includes a user interface manager 336. The user interface manager 336 can facilitate user information presentation to a user via the user device 304 and can further receive user input via the user device 304. The user interface manager 336 can be a web-based application and/or an local application configured to generate user interface for display on the user device 304. In some embodiments, the user interface manager 336 is configured to generator, or otherwise manage, the user interfaces shown in FIGS. 19-30.

The user device 304 can be any device including, or connected to, a display for displaying information to a user and including, or connected to, an input device configured to receive input from a user. In some embodiments, the user device 304 is a lap-top computer, a desktop computer, a cellphone, a terminal system, etc.

Figure 4:
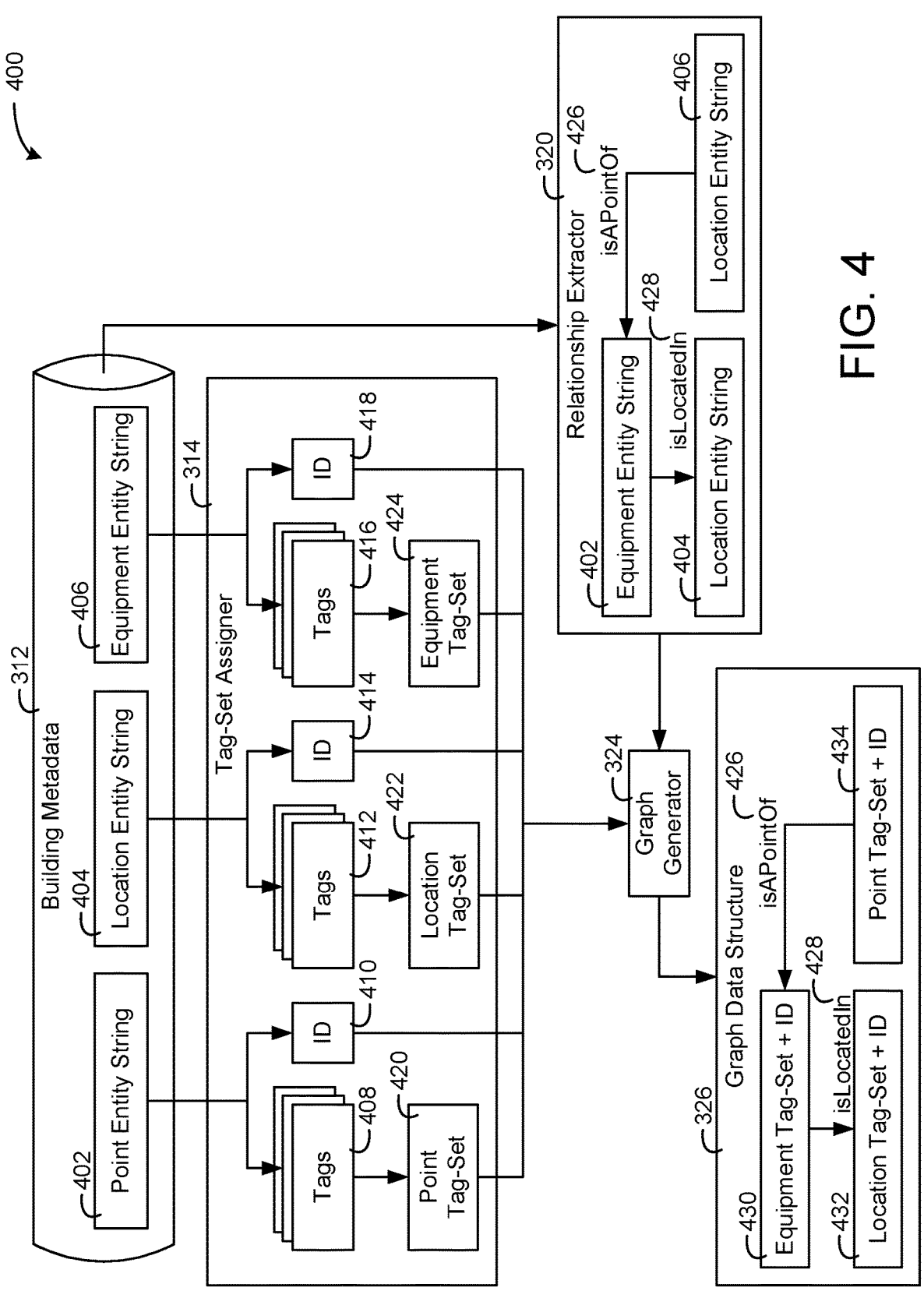
FIG. 4 is a block diagram of components of the mapping system of FIG. 3 determining tags, tag-sets, and relationships from string data representing entities of a building for translation from the first schema into the graph data schema, according to an exemplary embodiment.

Referring now to FIG. 4, a system 400 illustrating components of the mapping system of FIG. 3 is shown, according to an exemplary embodiment. The system 400 includes the building metadata 312, the tag-set assigner 314, the graph generator 324, the relationship extractor 320, and the graph data structure 326. The building metadata 312 is shown to include multiple strings, i.e., a point entity string 402, a location entity string 404, and an equipment entity string 406. The point entity string 402 may be a string representing a particular endpoint of a piece of equipment, e.g., a setpoint, a temperature, a humidity, a compressor speed, a duct pressure setpoint, etc. The location entity string 404 can be a string representing a particular location, e.g., a zone within a building, a floor of a sky rise, a room on a particular floor, etc. Furthermore, the equipment entity string 406 can be a string representing a particular piece of equipment, e.g., a controller, a server, a compressor, a chiller, an AHU, an RTU, a temperature sensor, etc.

The tag-set assigner 314 (e.g., the tag predictor 316) can determine tags for each of the strings 402-406. In some embodiments, one or multiple tags are determined by the tag-set assigner 314 for each of the strings 402-406. The tags can be individual elements of the strings. For example, if the point entity string 402 is "TempSP" tags "Temperature" and "Setpoint" can be identified. In some embodiments, the tag-set assigner 314 can determine a tag-set based on the tags determined from the strings 402-406. For example, based on the tags 408, the point tag-set 420 can be determined. Similarly, based on the tags 412, the location tag-set 422 can be determined and based on the tags 416, the tag-set 424 can be determined.

The tag-set assigner 314, in addition to assigning the point tag-set 420, the location tag-set 422, and the equipment tag-set 424, can determine identifiers (IDs), i.e., ID 410, ID 414, and/or ID 418. The IDs 410-418 can be characters or groups of characters which distinctly identify tags 408-416. For example, if the equipment tag-set 424 is "Zone Humidity Controller," the string 406 may include tags "Zone," "Humidity," and "Controller." For example, the string 406 could be, "Controller-45.Zone1.Humidity." Two IDs may be in the string "45" and "1" identifying the tag for the controller and the tag for the zone. The ID 418 may be the string "45" to identify the equipment tag-set 424 from other equipment tag-sets of the same or a similar type.

The relationship extractor 320 can be configured to extract one or more relationships from the building metadata 312. In some embodiments, the relationships are BRICK relationships between the strings 402-406, e.g., "isAPointOf," "isLocatedIn," "controls," "feeds," etc. The relationships can indicate which strings 402-406 are related, and how the strings 402-406 are related. The relationships extracted by the relationship extractor 320 are shown to be "isAPointOf" 426 relating the location entity string 406 to the equipment entity string 402 and "isLocatedIn" 428, relating the equipment entity string 402 to the location entity string 404.

The graph generator 324 can generate the graph data structure 326 from the tag-sets 420-424, the IDs 410-418, and/or the relationships 426 and 428. The graph data structure 326 includes nodes and edges, each node of nodes 430-434 defined in terms of the tag-sets determined by the tag-set assigner 314 and the edges being the relationships determined by the relationship extractor 320.

Figure 5A:
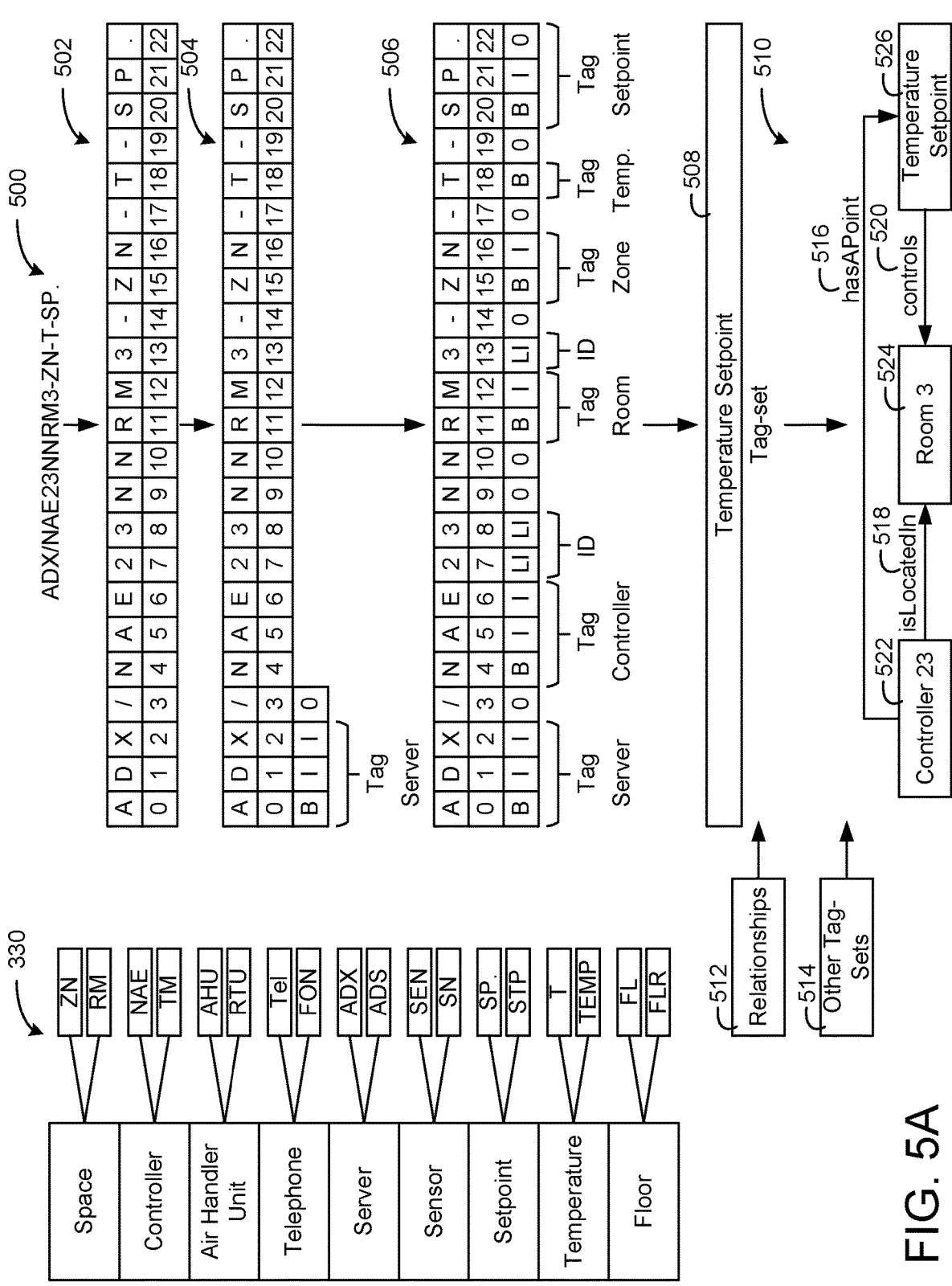
FIG. 5A is a block diagram of a dictionary of the mapping system of FIG. 3 and a string in a first schema being mapped into the graph data schema, according to an exemplary embodiment.

Referring now to FIG. 5A, a mapping of an input string into a graph data structure 510 with the dictionary 330 is shown in greater detail, according to an exemplary embodiment. The dictionary 330 can include a predefined list of tags. The tags may be space, controller, air handler unit, telephone, sensor, setpoint, temperature, floor, etc. Any number or type of tags may exist in the dictionary 330. Each of the tags in the dictionary 330 can be mapped to one or multiple different character sets representing the tag.

For example, for the space tag, characters ZN and/or RM can be mapped to the space tag. For the controller tag, characters NAE and/or TM can be mapped to the controller tag. For the air handler unit tag, the characters AHU or RTU can be mapped to the air handler unit tag. For the telephone tag, the characters Tel or FON can be mapped to the telephone tag. For the server tag, the characters ADX or ADS can be mapped to the server tag. For the sensor tag, the characters SEN or SN can be mapped to the sensor tag. For the setpoint tag, the characters SP. or STP can be mapped to the setpoint tag. For the temperature tag, the characters T or TEMP may represent the temperature tag. For the floor tag, the characters FL or FLR can represent the floor tag.

Any number of character representations can be included within the dictionary 330 and, in some cases, the number of tags and/or character representations can increase overtime as a user provides feedback to the mapping system 300 and the mapping system 300 learns from the user input. For example, the dictionary 330 can be learned over time from known entity definitions (e.g., by receiving a naming convention) or can be inferred from machine learning.

The input string 500 is shown to be parsed into tags. The string 500 can be indexed by the tag predictor 316. For example, the indexed input string 504 can include indexes 0-22 for each character of the input string 500, the indexes can be assigned by the tag-set assigner 314. The tag predictor 316 can parse the indexed input string 504 character by character and identify a group of characters associate with a tag. For example, the tag predictor 316 can parse the indexed input string 504 from left to right or right to left. The indexed input string 504 is shown to be associated with an identified server tag. The server tag can be identified by the tag predictor 316 based on the dictionary 330. The characters 0, 1, 2, and 3 can each be assigned places, i.e., a beginning of a word place, "B," and inside of the word place, "I," and an ending of the word place, "0." The indexed string 504 can be parsed by the tag predictor 316 until tags are assigned for string, i.e., the resulting tagged string 506.

In some embodiments, the tag predictor 316 parses the indexed string 504 from left to right. In some embodiments, the tag predictor 316 can select a first character of the indexed input string 504, e.g., "S" And compare the "S" against the dictionary 330. If the match of the character "S" to an tag of the dictionary 330 is lower than a predefined amount, the tag predictor 316 can compare the first and the second characters, "SP" against the dictionary 330. If again the match is lower than a predefined amount, the tag predictor 316 can select the first three characters, "SP." The characters "SP." may match a tag for setpoint. The match between "SP." and the tag of the dictionary 330 may be higher than a predefined amount and/or an exact match. The result of this comparison may be one of the labeled sets of characters of the indexed input string 502. In this regard, the characters can be labeled as n-grams where "n" changes as the string is parsed.

In some embodiments, starting from a particular index, the tag predictor 316 selects varying amounts of characters e.g., the first character, the first and second characters, the first, second, and third characters, etc. The tag predictor 316 can compare each group of characters to the dictionary 330 and determine a matching level to various tags of the dictionary 330 of each comparison. A tag associated with a comparison of a highest match level can be assigned as the tag for the particular group of characters matched to the tag by the tag predictor 316 resulting in the highest match level.

The tag predictor 316 can be configured to identify relational elements from the indexed input string 504. The relational elements can be characters "/," "-," "." "NN," etc. In some embodiments, an indication of the relational elements can be included within the dictionary 330 and/or can be learned overtime. In some embodiments, relational elements can be identified as unknown characters between characters of identified tags. For example, "ADX/NAE" can be parsed into a server tag and a controller tag. The tag predictor 316 can identify, i.e., learn, that the character separating the characters of the distinct tags is a relational character and can add the relational character to the dictionary 330 for future use.

The tag predictor 316 can determine IDs. The IDs may be one or multiple characters distinctly identifying a particular set of characters of the string classified as a particular tag. For example, a set of characters representing a controller, "NAE" can be classified as a controller tag. The tag predictor 316 can be configured to identify one or more characters immediately following the characters "NAE" as distinctly identifying the NAE and distinguishing the "NAE" from other NAEs, for example, the characters may be "23." In this regard, the tag predictor 316 can assign the characters "2" and "3" as "left identifiers (LI)" indicating that the characters to the left of the characters "23," i.e., the characters "NAE" are identified by the characters labeled as LI. Similar right identifiers "RI" can be assigned by the tag predictor 316 where first characters preceding second characters represent a particular instance of a tag, the tag indicated by the second characters, e.g., "5th-Controller" where "5th" is the ID and "controller" is the tag.

The tags of the tagged string 506 can be used to generate a tag-set 508. The tag-set 508 may indicate the entire meaning of the input string 502 and can be determined by the tag-set predictor 318 from the tags determined by the tag predictor 316. The tag-set predictor 318 can identify, based on what tags are generated by the tag predictor 316 and/or in what order the tags are determined in the input string 500, a corresponding tag-set. The tag-set predictor 318 can include multiple different tag-sets and identify which tag-set most closely matches the tags determined by the tag predictor 316.

Based on the tag-set 508, multiple other tag-sets 514 determined by the tag-set predictor 318, and relationships 512 extracted by the relationship extractor 320, the graph generator 324 can generate the graph data structure 326. In some embodiments, the other tag-sets 514 are determined based on other strings, or, in some embodiments, parsing different sections of the same string, e.g., the string 500. The resulting graph data structure can include multiple nodes 522-526 each representing a particular tag-set. For example, the tag-set 508 is representative of a temperature setpoint of a controller located within a space, this is represented by the node temperature setpoint 526. Similar nodes "Controller 23" 522 and "Room 3" 524 are shown in the graph data structure 510. Furthermore, the relationships 516, 518, and 520 can each link the nodes together.

Figure 5B:
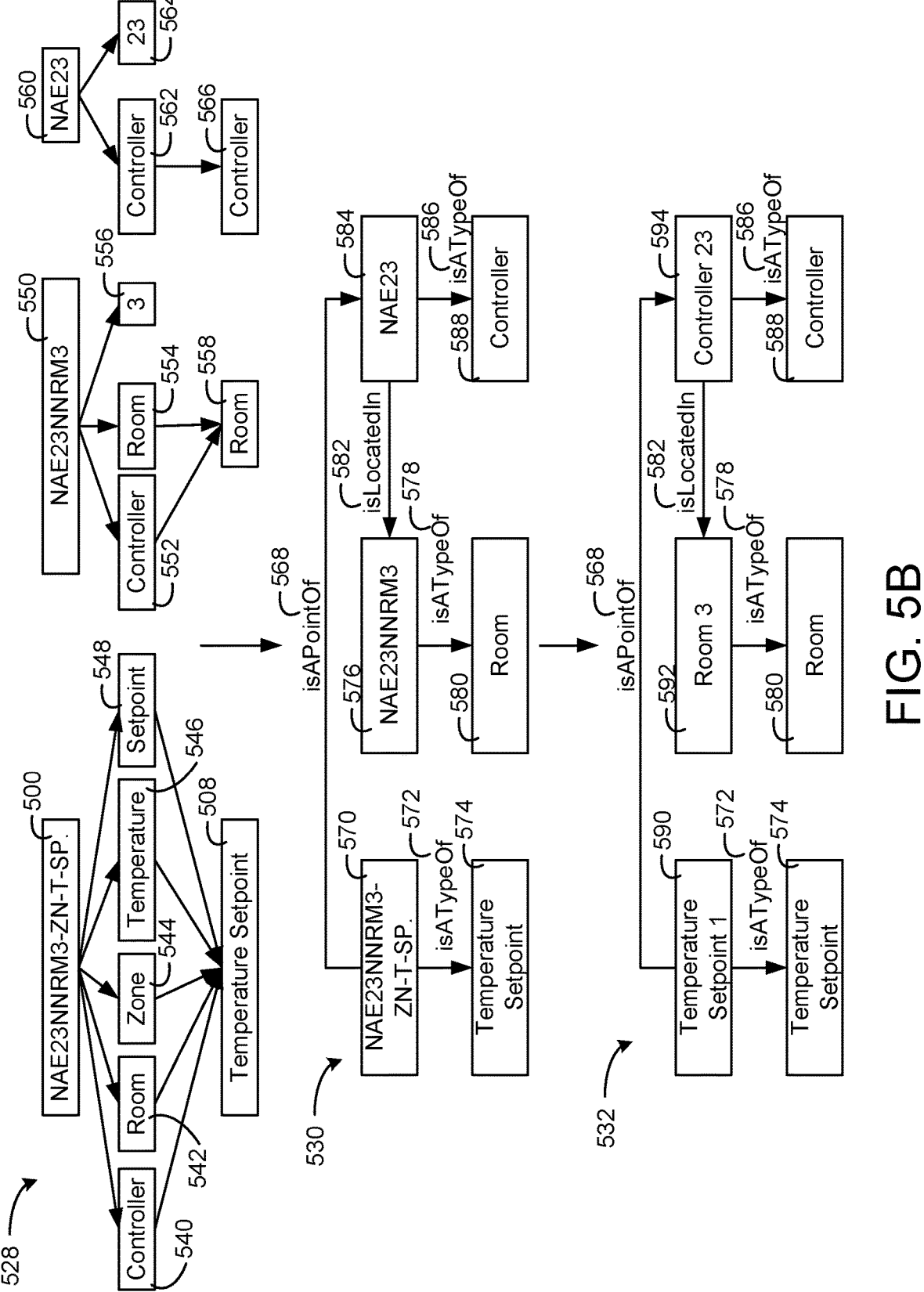
FIG. 5B is a block diagram multiple strings assigned tag-sets for generating the graph data schema that can be performed by the mapping system of FIG. 3, according to an exemplary embodiment.

Referring now to FIG. 5B, a diagram 528 illustrating mapping of the string 500, a string 550, and a string 560 from a first building schema into a graph data schema that can be performed by the mapping system 300 is shown, according to an exemplary embodiment. The string 500 is shown to be assigned various tags, i.e., the tags 540-548 by the tag predictor 316. Each of the tags 540-548 can be assigned based on a character or character group of the string 500. For example, the characters "NAE" of the string 500 can be assigned the tag 540, "Controller." Similarly, the characters "RM" of the string 500 can be assigned the tag 542, "Room." Similarly, the characters "ZN" of the string 500 can be assigned the tag 544, "Zone." Similarly, the character "T" of the string 500 can be assigned the tag 546, "Temperature." Finally, the characters "SP." of the string 500 can be assigned the tag 548, "Setpoint." The tag-set predictor 318 can be configured to assign the string 500 the tag-set 508 based on the tags 540-548.

In some embodiments, the string 550 is a separate string from the string 500. In some embodiments, the string 550 is a sub-string of the string 500. The string 550 is shown to be assigned various tags, i.e., the tags 552-554 by the tag predictor 316. Each of the tags 552-554 can be assigned based on a character or character group of the string 550. For example, the characters "NAE" of the string 552 can be assigned the tag 552, "Controller." Similarly, the characters "RM" of the string 552 can be assigned the tag 552, "Room." The tag-set predictor 318 can be configured to assign the string 550 the tag-set 558 based on the tags 552-554. An ID of the string 550 can further be identified by the tag predictor 316, i.e., the ID 556. The ID 556 can distinctly identify the tag-set 558, i.e., the room represented by the string 550 is room number three.

In some embodiments, the string 560 is a separate string from the string 500. In some embodiments, the string 560 is a sub-string of the string 500. The string 560 is shown to be assigned a tag, i.e., the tag 562 by the tag predictor 316. Each of the tag 562 can be assigned based on a character or character group of the string 550. For example, the characters "NAE" of the string 560 can be assigned the tag 562, "Controller." The tag-set predictor 318 can be configured to assign the string 560 the tag-set 566 based on the tag 562. An ID of the string 560 can further be identified by the tag predictor 316, i.e., the ID 564. The ID 564 can distinctly identify the tag-set 566, i.e., the controller represented by string 560 is controller number twenty-three.

Based on the tag-sets 508, 558, and 566, the graph generator 324 can generate a graph data structure 530 according to a graph data schema. The graph data structure 530 can include multiple nodes and edges, e.g., the nodes 570, 576, 584, 574, 580, and 588 and the edges 568, 582, 572, 578, and 586. In some embodiments, the tag-sets 508, 558, and 566 are added to the graph data structure 530 as types of the strings 500, 550, and 560. For example, a node representing the temperature setpoint tag-set 508 can be added to the graph data structure 530 by the graph generator 324 as the node 574. Another node representing the string 500 from which the temperature setpoint tag-set 508 was determined can be added as the node 570. Since the temperature setpoint tag-set 508 is generated from the string 500, a relationship "isATypeOf" can be added as an edge to the graph data structure 530 between the nodes 570 and 574.

In some embodiments, rather than including nodes 570, 576, and 584 which directly reference the strings 500, 550, and 560, the graph generator 324 can generate nodes 590, 592, and 594 with the IDs 556 and 564 and the tag-sets 508, 558, and 566 to form a graph data structure 532. For example, the node 592 can be generated by concatenating the tag-set 558n, "Room," with the ID "3" 556. For a tag-set with no ID, the graph generator 324 can pseudo-randomly (or iteratively) add a unique ID, e.g., the node 590.

Figure 6A:
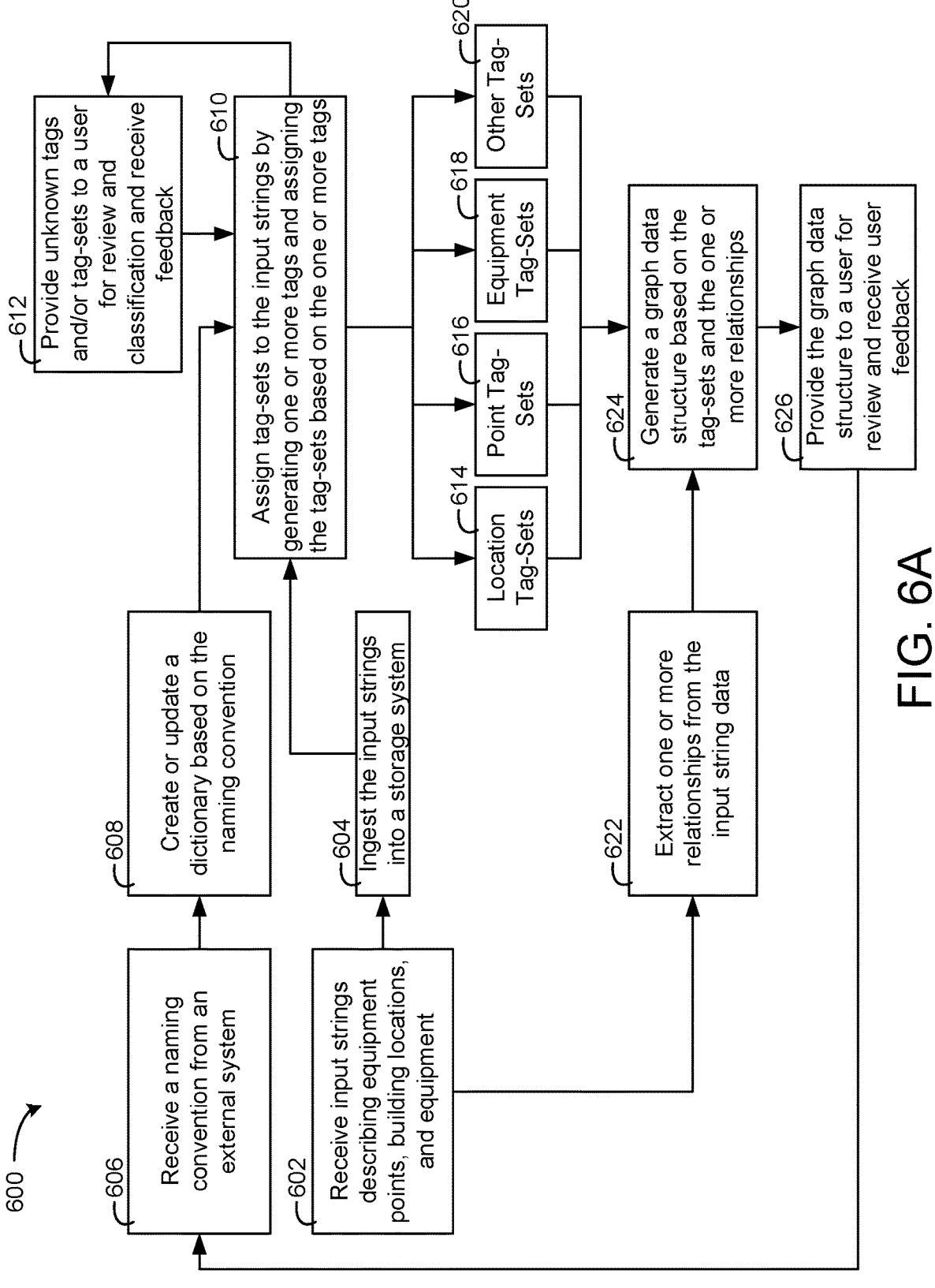
FIG. 6A is a flow diagram of a process that can be performed by the mapping system of FIG. 3 for translating the string data of the first building schema into the graph data schema, according to an exemplary embodiment.

Referring now to FIG. 6A, a process 600 of mapping a building schema into a graph data schema is shown, according to an exemplary embodiment. The mapping system 300 can be configured to perform the process 600. The components of the mapping system 300, e.g., the tag predictor 316, the tag-set predictor 318, the relationship extractor 320, the graph generator 324, and/or the user interface manager 336 can be configured to perform some and/or all of the steps of the process 600. The process 600 can be performed to map points, devices, spaces, and/or any other entity from a first building schema into a graph data structure, the graph data structure including multiple nodes and edges indicating relationships between the multiple nodes.

In step 602, the mapping system 300 can receive building data from a building in the form of input strings, the input strings describing equipment points, building locations, and/ or equipment. The building data may be raw data collected from systems of the buildings (e.g., METASYS data). In some embodiments, the mapping system 300 queries the received data with a query language to extract metadata strings.

In step 604, the mapping system 300 can ingest the data received in the step 604 into a storage system. The building metadata can ingested into a database such as mongodb for labelling. All the point identifiers (IDs), equipment IDs, and/or location IDs (each of which may be a distinct string or a sub-string of a particular string) can be made available in the form of a comma separated (.csv) file.

Figures 10, 11:
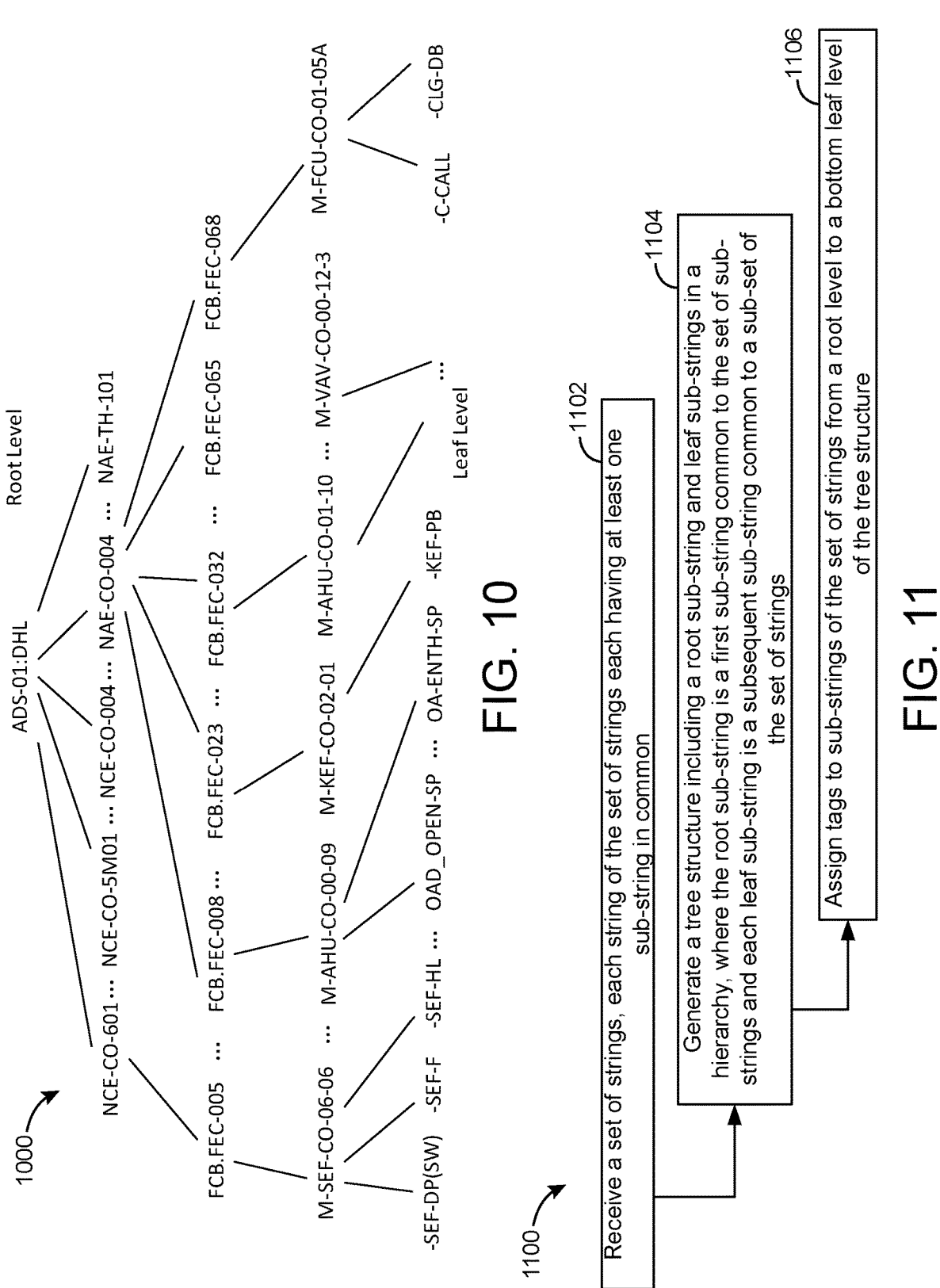
FIG. 10 is a tree diagram of sub-strings labeled from a root level to a leaf level to decrease labeling time of the mapping system of FIG. 3, according to an exemplary embodiment.
FIG. 11 is a flow diagram of a process of labeling sub-strings from a root level to a leaf level that can be performed by the mapping system illustrated in FIG. 3, according to an exemplary embodiment.

In some embodiments, the mapping system 300 can first convert the entities into RDF format. The mapping system 300 can extract the relationship information from the database as shown in FIG. 7 and then convert the extracted relationship information to the RDF format as shown in FIG. 8. The mapping system 300 can then start labeling from the root node as shown in FIG. 10. This way, a reduced number of substrings need to be labeled. In some embodiments, database entries, e.g., strings, can be dumped into a file (e.g., a CSV) file, a a script (e.g., a Python Script) can map the entries of the file into RDF format.

In step 606, the mapping system 300 can receive a naming convention from an external system, e.g., the external system 302. The naming convention can be received in the form of a document that captures naming conventions for a particular schema that the input string data is in. The document can include tags corresponding to specific substrings or character groupings. For example, the information could indicate that "NAE" represents a controller tag while "TEC" or "GLAS" represent a thermostat tag.

In step 608, the mapping system 300 can create or update a dictionary, e.g., the dictionary 330 based on the naming convention received in the step 606. For example, the mapping system 300 can determine whether a dictionary exists (or whether a dictionary exists for a particular schema) and create the dictionary in response to determining that the dictionary does not exist. Furthermore, if the dictionary already exists, the mapping system 300 can determine whether any new character or character groupings are mapped to existing tags of the dictionary. These new character and/or character groupings can be added and appropriately mapped to the existing tags of the dictionary. Furthermore, the mapping system 300 can determine whether a new tag associate with new a character and/or new character grouping is included in the naming convention received in the step 606 and add the new tag and the new characters and/or new character groupings to the dictionary.

The dictionary 330 can be used to look up tag to character grouping maps while the mapping system 300 labels known substrings. In some embodiments, the mapping system 300 adds new labels to the dictionary as labeling continues for unknown substrings. In this regard, the dictionary 330 can be dynamic, i.e., change over time.

In step 610, the mapping system 300 can label the ingested data of the step 604 by determining tags for the input strings and assigning tag-sets based on the determined tags. The mapping system 300 can automatically label strings either using dictionary lookup with the dictionary 330 and/or using machine learning based prediction. The result of the step 610 can be tag-sets representing locations, points, equipment, or other tag-sets. The resulting tag-sets can be the location tag-sets 614, the point tag-sets 616, the equipment tag-sets 618, and the other tag-sets 620. In some embodiments, each of the input strings is assigned a single tag-set. In some embodiments, multiple tag-sets are extracted from a single input string.

In step 612, the mapping system 300 can present characters of an unknown tag or tags of a unknown tag-set to the user for review and classification. The mapping system 300 can generate a user interface for presentation of the information. The user can respond to the mapping system 300 with a new tag for the characters, an existing tag for the characters, a new tag-set for the tags, or an existing tag-set for the tags. The feedback can be utilized by the mapping system 300 in assigning the tag-sets to the input strings and assigning the tags as performed in the step 610.

Unknown substrings, i.e., groups of characters of the input strings, can be labeled by a user as corresponding to a particular tag. Sub strings that are not known even to the tool user can be kept track of and recorded in a separate document (e.g., as shown in FIG. 11) to be filled in by a building expert. Once the expert is done labeling, the new tags received from the user or existing tags are assigned to the right substrings and added to the dictionary 330. These new tags can be used by the mapping system 300 for future labeling and/or tag prediction.

Furthermore, in some embodiments, groups of tags are provided to the user for review. In some embodiments, if the tag-set predictor 318 does not determine a tag-set corresponding to a group of tags determined by the tag predictor 316, the group of tags can be presented to the user for classification. The user may select an existing tag-set for the group of tags and/or provide a new tag-set for the group of tags. The user feedback mapping the group of tags to the existing tag-set or mapping the group of tags to a new tag-set can be added to the dictionary 330.

In step 622, the mapping system 300 can extract different relationships between the input strings, e.g., the ingested from the database as shown in FIGS. 7-8. The extraction can be performed with a SPARQL query or SQL query (e.g., an SQL query to a METASYS database). In some embodiments, the mapping system 300 includes various rules for parsing the input strings, the rules may be stored in a particular format indicating relationships between the strings. The mapping system 300 can assign each relationship a relationship type of a predefined set of relationship types, e.g., BRICK relationship types.

In step 624, the mapping system 300 can generate the graph data structure in the graph data schema by tying all the tag-sets 614-620 together via relationships. The result may be a TTL file. Furthermore, the result may be the serialized BRICK data of FIG. 9. In step 524, the mapping system 300 can present the generated graph data structure (e.g., the BRICK graph) to an end user for review in step 626.

Figure 6B:
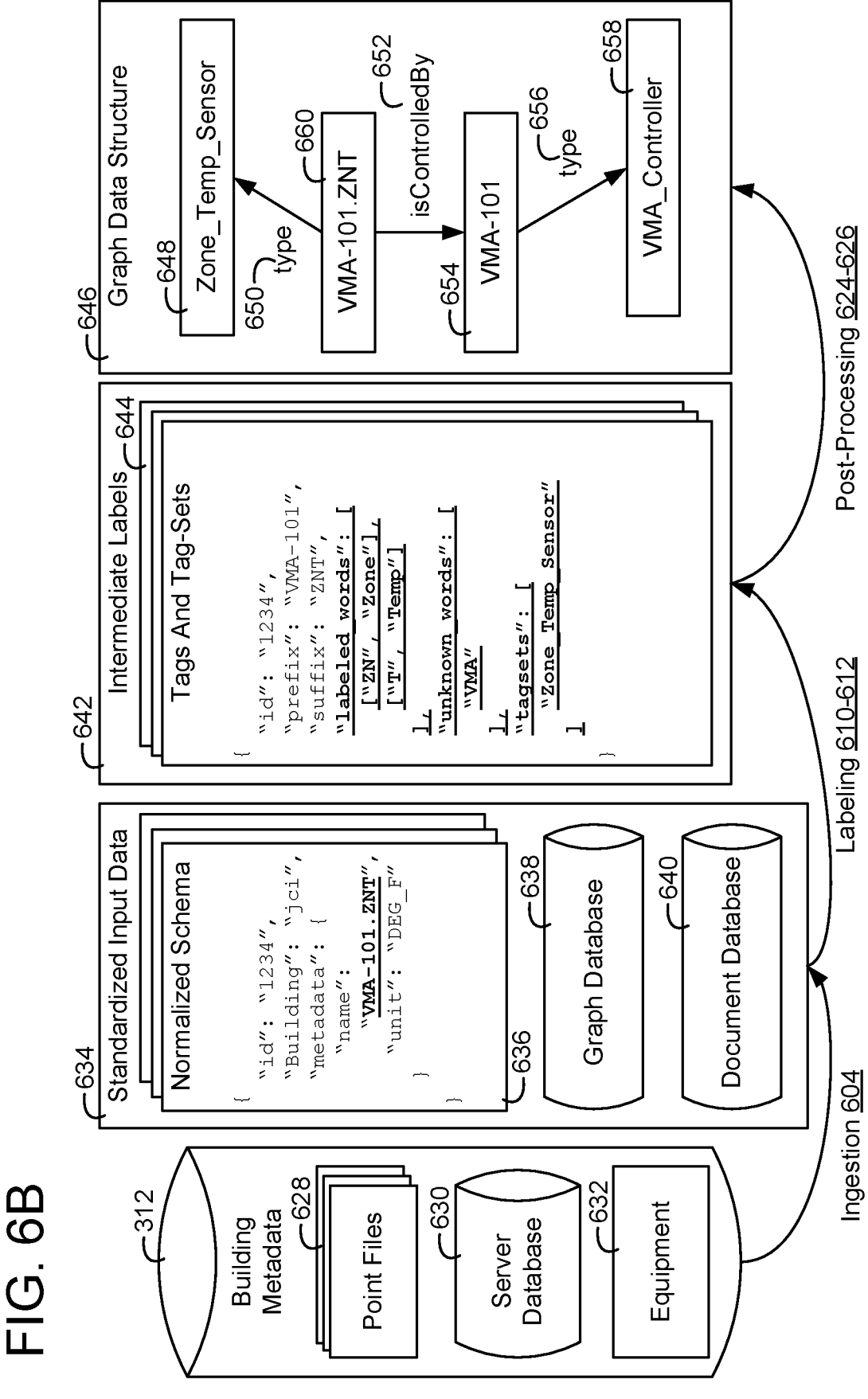
FIG. 6B is a block diagram illustrating strings mapped into a graph data structure by the mapping system of FIG. 3, according to an exemplary embodiment.

Referring now to FIG. 6B, a block diagram illustrating the mapping of building metadata in a building schema into a graph data schema by the mapping system 300 is shown, according to an exemplary embodiment. The mapping system 300 can be configured to perform labeling in a standardized, efficient, and extensible manner. In FIG. 6B, the building metadata 312 can be point files 628, a server database 630, and/or equipment 632. For example, the mapping system 300 can receive the building metadata 312 as the point files 628, e.g., one or multiple CVS files or other document files. Entries of the point files 628 may be strings representing equipment, points, and/or locations. The server database 630 may be a database of a server configured to operate a building.

For example, the server database 630 can be a METASYS server storing building metadata in a particular building schema in the form of multiple strings, e.g., an SQL database. The server database 630 could be a METASYS ADX server. Furthermore, the equipment 632 can be equipment storing points, e.g., strings. For example, the equipment 632 can be BACnet equipment storing BACnet objects defining various points of the equipment. The mapping system 300 can be configured to query or read the point files 628, the server database 630, and/or the equipment 632 and ingest the data into a standardized format, e.g., the standardized input data 634. The ingestion can be the same as, or similar to, the step 604 as described with reference to FIG. 6A.

In some embodiments, the ingested data is received from one or multiple different sources and may be in a variety of different building schema. The mapping system 300 can be configured to normalize the data in a particular schema, e.g., a JavaScript Object Notation (JSON) schema, the normalized schema 636. The ingested data can be ingested into a graph database 638. For example, into an RDF format. In this regard, the RDF format may indicate relationships between strings which can be translated into relationships of a particular relationship set, e.g., BRICK relationships. The data may further be ingested into a document database 640 for storage, e.g., a MongoDB.

The mapping system 300, alone or with input from a user, can assign tags and tag-sets to the string data of the standardized input data 634, e.g., the tags and tag-sets 644, i.e., intermediate labels 642 between the building schema and the graph data schema. For example, the normalized schema 636 illustrates a string "VMA-101.ZNT." This string can be analyzed by the mapping system 300 to assign tags to the string, e.g., assign the characters "ZN" the "Zone" tag, assign the character "T" the "Temp" tag. Furthermore, the mapping system 300 may identify one or more unknown groups of characters, the word "VMA." Such a character group can be provided to a user for review and feedback to allow the user to manually assign a tag. Since the mapping system 300 first determines whether a tag and/or tag-set can be assigned and prompts the user for input in response to not being able to assign a tag or tag-set to a string, the user interaction is precise and efficient. In some embodiments, a summary report with one or multiple strings for labeling is provide to a domain expert or other building manager by the mapping system 300 to facilitate the user interaction efficiently.

Furthermore, the mapping system 300 can assign a tag-set to the string of the normalized schema 636, e.g., the tag-set "Zone_Temp_Sensor." The labeling to generate the tags and tag-sets 644 may be the same as, or similar to, the labeling of the steps 610-612 as described with reference to FIG. 6A.

The mapping system 300 can be configured to perform machine learning to assign the tags and/or tag-sets to strings. The mapping system 300 can use pattern detection, graph ordering, and/or dictionary lookup (e.g., via the dictionary 330) to assign the strings tags and/or tag-sets. Character groups of a string may be understood differently by various individuals and the position of the characters within the string may be important. For example, "ZNT" may be understood as "ZN" and "T" i.e., two separate character sets. However, the characters may also be understood as a single group, e.g., "ZNT." The mapping system 300 can analyze the string to compare various groups of characters to determine a match to a tag. For example, if "ZN" matches a "Zone" tag and "T" matches a "Temperature" tag while "ZNT" does not match any tag, the mapping system 300 may treat the character group "ZNT" as two different character groups, i.e., "ZN" and "T." Furthermore, because the mapping system 300 can present unknown character groups to an end user for manual labeling, if the mapping system 300 cannot determine a tag or tag-set with a pre-defined level of confidence, the mapping system 300 can receive validation from a user of a predicted tag or tag-set.

Furthermore, the tag-sets can represent discrete entities represented by the string analyzed by the mapping system 300. Because the mapping system 300 can first identify tags for the string, the mapping system 300 can predict one or multiple candidate tag-sets, i.e., can determine whether multiple tags form a tag-set. If the mapping system 300 cannot determine the tag-set with a predefined level of confidence, the mapping system 300 can receive validation from a user of a predicted tag-set.

The mapping system 300 can generate a graph data structure 646 based on the tag-sets determined based on the string data of the normalized schema 636. The tag-sets may be classes of a graph data structure, e.g., BRICK. The mapping system 300 can generate nodes of the graph data structure 646 to be the strings labeled and can generate a relationship between each of the strings and a corresponding tag-set. For example, the mapping system 300 can generate the node 660, "VMA-101.ZNT," and a corresponding relationship 650, "type," between the node 660 and a tag-set node, i.e., the node 648, "Zone_Temp_Sensor." For another string, represented by the node 654, another relationship between the node 654 and a corresponding tag-set node 658 can be generated.

In some embodiments, the node 660 and the node 654 can represent sub-strings of a single string, i.e., a suffix and a prefix respectively. For example, the string may be, "VMA-101.ZNT" where the prefix is "VMA-101" and the suffix is "ZNT." Based on the prefix and the suffix and their corresponding tag-sets respectively, i.e., Zone_Temp_Sensor and VMA Controller, a relationship appropriately linking the two tag-sets can be generated between the nodes 660 and 654, i.e., the relationship 652 "isControlledBy." In some embodiments, for every permutation of tag-sets, a corresponding relationship may exist such that the mapping system 300 can identify which relationships to assign between nodes. In some embodiments, the nodes 660 and 654 represent separate strings, i.e., a first string representing node 660 and a second string representing node 654. In this regard, multiple labeled strings can be merged together to generate the graph data structure 646 by the mapping system 300.

In some embodiments, the graph data structure 646 is a BRICK metadata schema. BRICK standardizes entities into a hierarchy of tag-sets, e.g., Temperature_Sensor, Supply_Fan, etc. In this regard, each string analyzed by the mapping system 300 can be classified into one of the tag-sets of BRICK. Furthermore, BRICK may include a predefined set of canonical relationships, e.g., feeds, isPartOf, hasLocation, etc. In this regard, the mapping system 300 can assign one of the relationships between entities mapped into a tag-set where appropriate. BRICK may represent metadata with triples, i.e., subject, predicate, and object triples. For example, for a string "RM3-ZNT," the mapping system 300 may classify the string as a "Zone Temperature Sensor" tag-set. For another string "RM3," the mapping system 300 may classify the string as "Room" tag-set. Finally, because the two strings may be related, i.e., a sensor located in a room, a relationship "isLocated" can be assigned between the two strings.

Figure 6C:
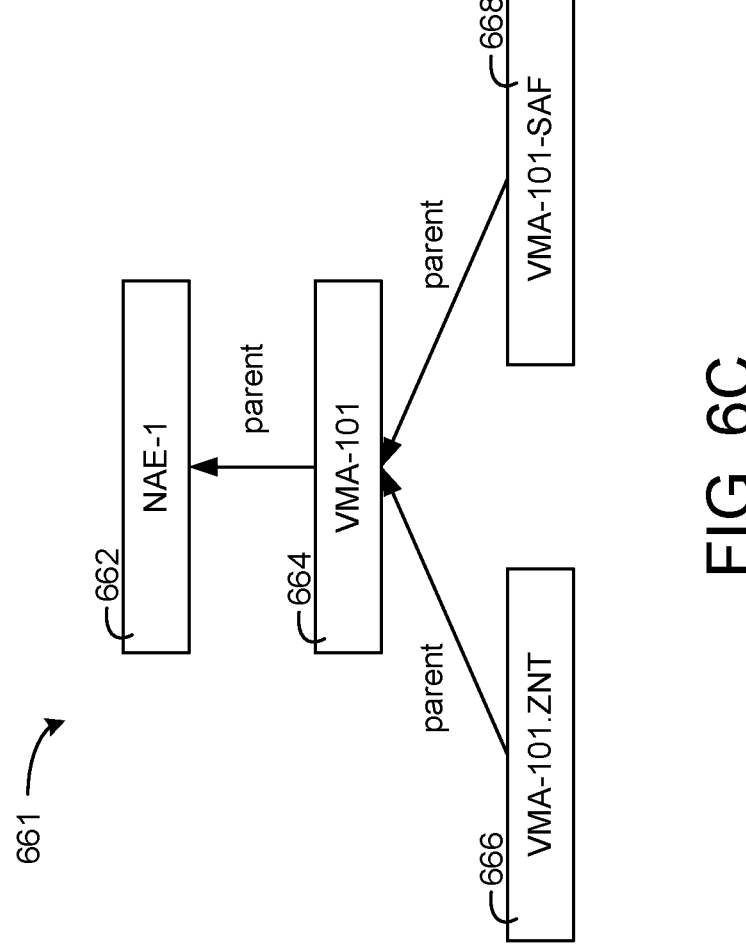
FIG. 6C is a block diagram of a string tree structure hierarchy used by the mapping system of FIG. 3 to map strings into a graph data structure, according to an exemplary embodiment.

Referring now to FIG. 6C, a tree data structure 661 is shown, according to an exemplary embodiment. The tree data structure 661 includes multiple leaf strings and a root string. Each branch of the tree data structure 661 may indicate a particular string and, relationships between the sub-strings. By de-duplicating parts of strings according to the tree data structure 661, the number of sub-strings that need to be labeled is reduced. Furthermore, based on the place in the hierarchy between the sub-strings, relationships can be identified by the mapping system 300.

Not all of the names in a string are different, there may be many similarities, i.e., common sub-strings between strings. For example, for approximately 19,000 point name identifies for a particular building, i.e., 19,000 strings, 2,500 of the strings may be truly unique. Since there is a significant amount of overlap, the mapping system 300 can generate a structure, e.g., the tree data structure 661, to reduce the number of strings to be labeled. As an example, the strings "VMA-101.ZNT" and "VMA-101.SAF" share common sub-strings. The mapping system 300 can define strings in terms of a suffix and a prefix, e.g., identify delimiters or other separating characters, e.g., the character "." The mapping system 300 can identify common suffixes or prefixes or alternatively unique suffixes or prefixes across the strings. Finally, based on the common and unique sub-strings, the mapping system 300 can generate the tree structure 661 and label the strings according to the hierarchy of the tree structure 661 (e.g., from the root 662, through the sub-leaf 664, to the bottom leaves 666 and 668) to avoid labeling the same sub-strings multiple times.

In some embodiments, the data source of the string data from which the mapping system 300 receives strings to be labeled can be in the form of a hierarchy. In this regard, the mapping system 300 can perform graph based labeling. For example, a METASYS ADX server may have a hierarchy across multiple entities, i.e., relationships between multiple strings. The mapping system 300 can retrieve the strings from the hierarchy (e.g., via SQL queries of the METASYS ADX server) and convert them into a graph data structure (e.g., into an RDF format that can be queried via SPARQL). SPARQL allows flexible graph traversal which may normally be difficult with multiple JOINs in SQL. Based on the graph data structure generated by the mapping system 300, which may be similar to the tree data structure 661, the mapping system can label the strings from a root sub-string to a leaf sub-string to avoid relabeling a sub-string multiple times.

Figure 6D:
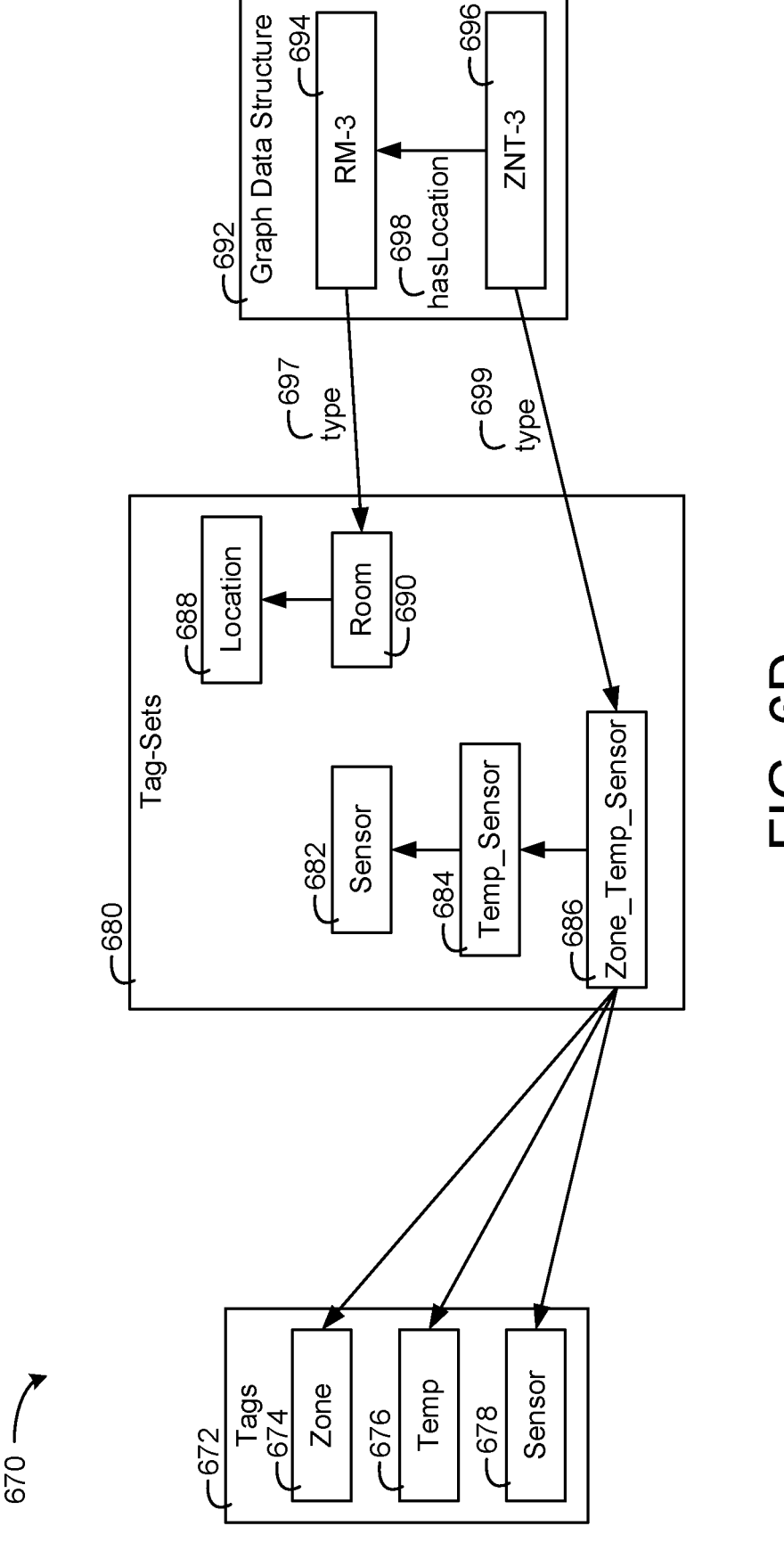
FIG. 6D is a block diagram illustrating tags and tag-sets used by the mapping system of FIG. 3 to map strings into a graph data structure, according to an exemplary embodiment.

Referring now to FIG. 6D, a block diagram 670 is shown illustrating multiple tags assigned a tag-set of a tag-set hierarchy used to generate a graph data structure, according to an exemplary embodiment. A point may be a physical or virtual entity generating a data stream. (e.g., sensor). A string may represent each point via characters. The points may further represent equipment, e.g., collections of entities that perform certain operations, and locations, e.g., physical spaces that represent floors, rooms, and zones. Each point may be represented by a string which is a metadata representation of entities.

The strings can be parsed to identify tags 672, e.g., a zone tag 674, a temp tag 676, and a sensor tag 678. Tags may be a unit information representation in a graph data schema. The tags may be a representation of a certain smallest context. The tags 674-678 can be analyzed by the mapping system 300 to determine a tag-set of the tag-sets 680. For example, the tag-set 686, "Zone_Temp_Sensor" can be composed of the tags 674-678. A tag-set may be an entity class, i.e., a class assigned to a particular string. Tag-sets can be class names and be a predefined collection of one or multiple tags. The tag-sets can be in a hierarchy. For example, a sensor tag-set 682 can have a dependent tag-set, the "Temp_Sensor" tag-set 684. Furthermore, the "Temp_Sensor" tag-set 684 can have a dependent "Zone- _Temp_Sensor" tag-set 686. Similarly, a location tag-set 688 may have a dependent room tag-set 690.

The strings classified into tags 672 and tag-sets 680 can be represented as nodes within a graph data structure 692. For example, a string "RM-3" can be represented as a node 694 while another string "ZNT-3" can be represented as a node 696. Each of the strings can have an assigned tag-set by the mapping system 300. To indicate the assignment for each string, the mapping system 300 can generate a type relationship, e.g., the type 697 and 699 relationships between the nodes representing the strings, the nodes 694 and 696 and the tag-sets, e.g., the tag-sets 686 and 690. The relationships may further interconnect the nodes of the graph data structure 692. For example, the node 696 may be related to the node 694 via the relationship "hasLocation" 698. The relationships of the graph data structure 692 can be any one of a set of canonical relationships.

Referring now to FIG. 7-9, a query result 700 indicating relationships between strings, an RDF file 800 based on the query result 700, and a BRICK RDF file 900 based on the RDF file 800 are shown, according to an exemplary embodiment. The query result 700 can be the result of an SQL query of the data of step 602 and can capture the various relationships between strings. The strings represent points, spaces, and equipment represented as "PointID," "SpaceID," and "EquipID." The strings themselves may be identifiers of the various points, spaces, and equipment.

The relationships "isPointOf" can link various point strings to equipment strings. The relationship "isPartOf" can link various space strings to other space strings, i.e., child space strings to parent space strings (a string representing a zone can be linked to a string representing floor). The relationships "isLocatedIn" can link point strings to space strings. Furthermore, the relationship "isFedBy" can link equipment strings to other equipment strings. Finally, the relationship "isFedBy" can link space strings to equipment strings.

The query result 700 can be used to generate the RDF file 800 as shown in FIG. 8. The query result 700 and the RDF file 800 can be similar, i.e., include the same relationships. In some embodiments, the RDF file 800 includes all of the information of the query result 700 but is in an RDF format. In some embodiments, the tag-set assigner 314 is configured to generate the query result 700 by querying the building metadata 312 and is then configured to translate the query results into an RDF format, i.e., the RDF file 800.

The BRICK RDF file 900 may be the tag-sets 614-620 implemented with the RDF file 800 that the mapping system 300 can be configured to generate. The BRICK RDF file 900 may be similar to the RDF file 800 with the inclusion of the tag-sets 614-620. As shown, strings in the BRICK RDF file 900 are given their tag-set name, e.g., the string "ADS-01" is "type" "Server," where "ADS-01" is the string and "Server" is the tag-set. In some embodiments, rather than including the strings themselves in the BRICK RDF file 900, the mapping system 300 reconstructs replacement names for the strings based on the corresponding tag-set and identifier, e.g., the tag-set Server and the identifier 01 could be used to replace the string "ADS-01" with the replacement "Server 1."

Referring now to FIG. 10, a tree structure 1000 including a root level and leaf levels is shown, according to an exemplary embodiment. The mapping system 300 can be configured to generate the tree structure 1000 based on the extracted building metadata 312 to provide a structure for labeling sub-strings in a processing efficient manner (i.e., reducing memory usage and/or computing time). More specifically, by labeling from the root level to the leaf level, the number of sub-strings to label can be reduced.

Each branch of the tree structure 1000 can represent a particular string that is to be labeled by the mapping system 300. Each leaf can represent a particular sub-string of a larger string. For example, for a set of three strings, "ADS-01:DHL.NCE-CO-601.FCB.FEC-005.M-SEF-CO-06-06-SEF-DP(SW)," "ADS-01:DHL.NCE-CO-601.FCB.FEC-005.M-SEF-CO-06-06-SEF-F," and "ADS-01:DHL.NCE-CO-601.FCB.FEC-005.M-SEF-CO-06-06-SEF-HL," rather than predicting tags and tag-sets for each of the three strings individually, and redundantly relabeling many of the same sub-strings, the mapping system 300 can parse the three strings and compare the strings together to generate a new leaf for every sub-string which one or more of the three sub-strings have in common or are distinct to individual sub-strings of the three sub-strings.

For example, with the three strings provided in the example above, there would be one root level substring "ADS-01:DHL.NCE-CO-601.FCB.FEC-005.M-SEF-CO-06-06-SEF-" and three leaf-level sub-strings "DP(SW)," "F," and "HL." With such a representation, the number of sub-strings to be classified is reduced. Where there are a larger number of strings with similarities to be classified, the resulting tree structure includes multiple levels between the root level and the leaf level, e.g., the tree structure 1000.

Referring now to FIG. 11, a process 1100 of generating a tree structure for a set of strings to efficiently assign tags to set of strings, according to an exemplary embodiment. The mapping system 300 can be configured to perform the process 1100. The components of the mapping system 300, e.g., the tag predictor 316, the tag-set predictor 318, the relationship extractor 320, the graph generator 324, and/or the user interface manager 336 can be configured to perform some and/or all of the steps of the process 1100.

In step 1102, the mapping system 300 can receive a set of strings to be classified. Each string of the set of strings may have at least one sub-string in common. For example, parsing the set of strings from left to right, each of the strings may have at least a root sub-string in common, i.e., a sub-string that each of the set of strings starts with. Furthermore, sub-sets of the set of strings may each share further subsequently occurring sub-strings in common.

In step 1104, the mapping system 300 can generate a tree structure including the root sub-string at a top level and other subsequent sub-strings that a sub-set of the set of strings have in common at varying leaf levels of the tree structure. Each branch of the tree structure from the root level to the bottom leaf level may represent one particular string of the set of strings. The tree structure can be the same as or similar to the tree structure 1000. In some embodiments, leafs of a middle level two or more of the strings share. However, strings of a bottom level may be distinct to each of the strings.

In step 1106, the mapping system 300 can assign tags to the sub-strings of the set of strings from the root level to the bottom leaf level. Since the duplications of sub-strings are removed through the tree structure, the mapping system 300 only needs to classify a sub-string into one or more tags a single time instead of relabeling the same sub-string each time a string is classified.

Figure 12:
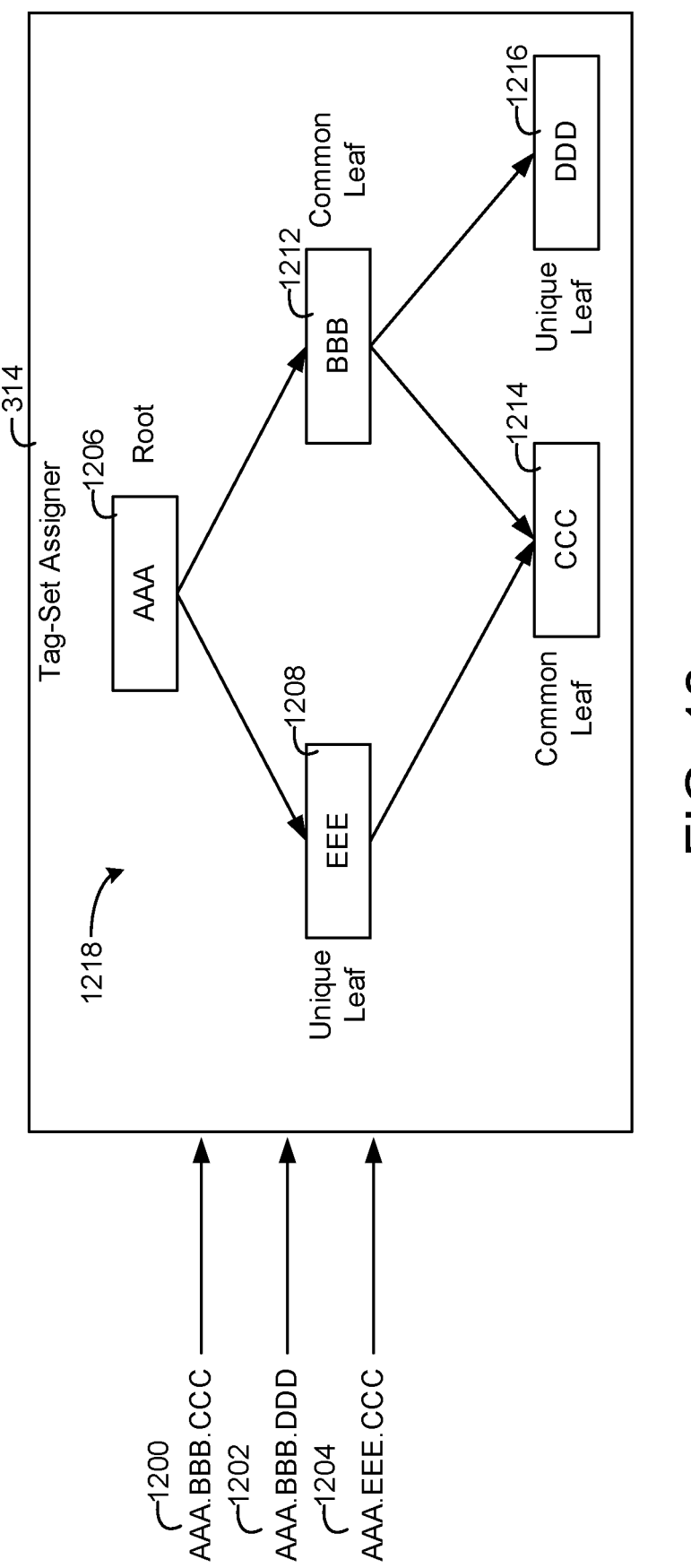
FIG. 12 is a block diagram illustrating multiple strings converted by the mapping system of FIG. 3 into a tree diagram, according to an exemplary embodiment.

Referring now to FIG. 12, strings 1200-1204 are shown to be used to generate a tree data structure 1218, similar to the tree structure illustrated in FIG. 10, according to an exemplary embodiment. The strings 1200-1204 can be translated into the tree data structure 1218 by the tag-set assigner 314 for use in efficiently assigning tags and/or tag-sets of the strings 1200-1204. The string 1200 may include the characters "AAA.BBB.CCC," the string 1202 may include the characters "AAA.BBB.DDD," while the string 1204 may include the characters "AAA.EEE.CCC." The tag-set assigner 314 can parse and compare the strings 1200 against each other in segments to identify sub-strings that are the same across the strings 1200-1204 and identify sub-strings that are different across the strings 1200-1201.

For example, parsing left to right, the tag-set assigner 314 can identify that the first three characters of the strings 1200-1204 are common across all of the strings 1200-1204, i.e., the first three characters form a root of all the strings 1200-1204. This root can be added to the tree data structure 1218 as the root 1206 which may include the characters "AAA."

After the first three characters, the tag-set assigner 314 can identify subsequent characters that are the same across the strings 1200-1202 and characters that are different across the strings 1200-1204. More specifically, the tag-set assigner 314 can identify that the next three characters "BBB" are common across the strings 1200 and 1202. However, the tag-set assigner 314 can identify that the next three characters, "EEE," of the string 1204 are unique to the string 1204. The tag-set assigner 314 can cause the tree data structure 1218 to include a unique leaf 1208 to represent the unique characters of the string 1204, i.e., "EEE." The tag-set assigner 314 can generate a common leaf 1212 to represent the characters common across the strings 1200 and 1202, i.e., "BBB."

Finally, the tag-set assigner 314 can determine that the last three characters of the strings 1200 and 1204 are the same, i.e., each string includes the sub-string "CCC." Furthermore, the tag-set assigner 314 can identify that the string 1202 includes a unique sub-string, i.e., the characters "DDD." The tag-set assigner 314 can generate a common leaf 1214 to represent the characters, "CCC" and generate a unique leaf 1216 to represent the characters "DDD."

Figure 13:
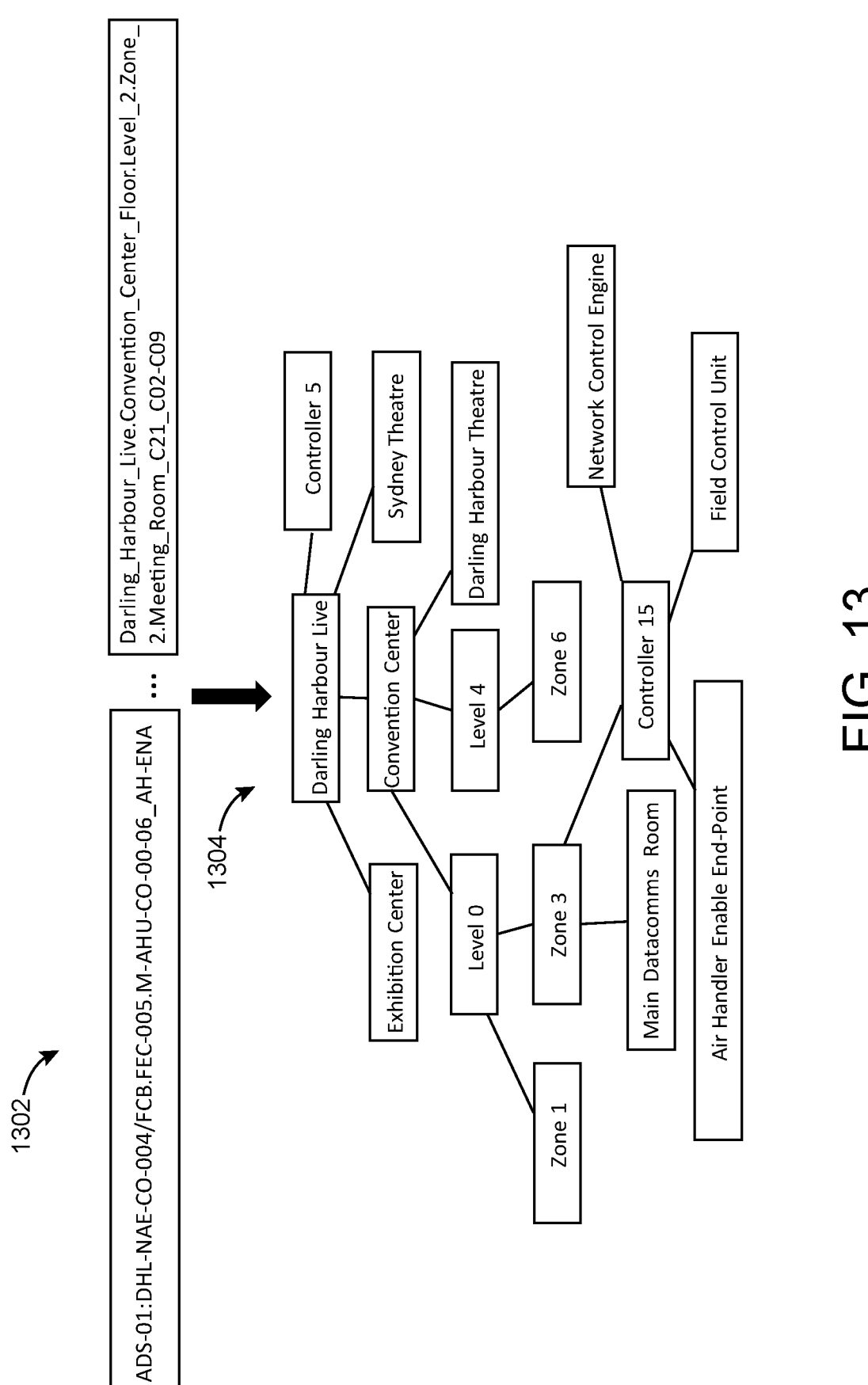
FIG. 13 is a diagram illustrating data in the first building schema translated into the graph data schema that can be performed by the mapping system illustrated in FIG. 3, according to an exemplary embodiment.

Referring now to FIG. 13, metadata 1302 is shown to be mapped into a graph data structure 1304, according to an exemplary embodiment. The metadata 1302 can be real metadata of a building, for example, a building where 18,000 or more string entries exist. Each entry is in the form of a sentence containing sub-strings. Each sub-string of each sentence of the metadata 1302 can be labeled as a tag by the tag predictor 316. The tag-set predictor 318 can then convert the tags into tag-sets. The metadata 1002 can include 18,000 or more point entities, location entities and equipment entities in a METASYS database. The output may be the graph data structure 1304. The graph data structure 1304 can capture relationships between nodes (i.e., BRICK tag-sets). The relationships can be in the form of "is located in", "is part of", "is fed by," etc. The nodes in the graph can be in BRICK tag-set format (zone-temperature-sensor, building-DHL, room-03 etc.).

Referring now to FIG. 14, a table 1400 is shown presenting unknown sub-strings to a user for manual classification, according to an exemplary embodiment. The table 1400 can be part of an interface or expert labeling document provided to a user for review. The expert can review the table 1400 and provide meanings for the unknown sub-strings. Furthermore, the expert can provide an indication of what the string.

The table 1400 includes columns 1402-1408. The columns 1402 and 1404 may present the user reviewing the table 1400 with information that can be provided by the user in columns 1406 and 1408. The column 1402 may be an unknown string, e.g., a sub-string of a longer string that is being mapped. The longer string may be a particular point name for a building and can be included in the point name column 1404. The user can enter a name for the unknown string in the column 1402 and enter a classification of the point name into the column 1408. For example, for example, for an unknown string "ADS" of a point name "ADS-01: DHL-NAE-CO-004/FCB.FEC-068.M-FCU-CO-01-05A ZN-TSP" the expert can identify that the string means "Application and Data Server" and the point name indicates a "Zone Temperature Set Point."

Referring now to FIG. 15, a table 1500 is shown illustrating raw metadata for multiple different vendors, according to an exemplary embodiment. Human written metadata may generally be intended and interpreted by a human. There may not be common parsing rules even in a building and no explicit relational information may exist. Each application that uses the information may manually parses and/or maps necessary information for every building. Furthermore, as shown in table 1500, the schema used by vendors may all be different. However, the mapping system 300 can be configured to provide mapping into a common schema for all of the schemas of table 1500.

Figures 16, 17:
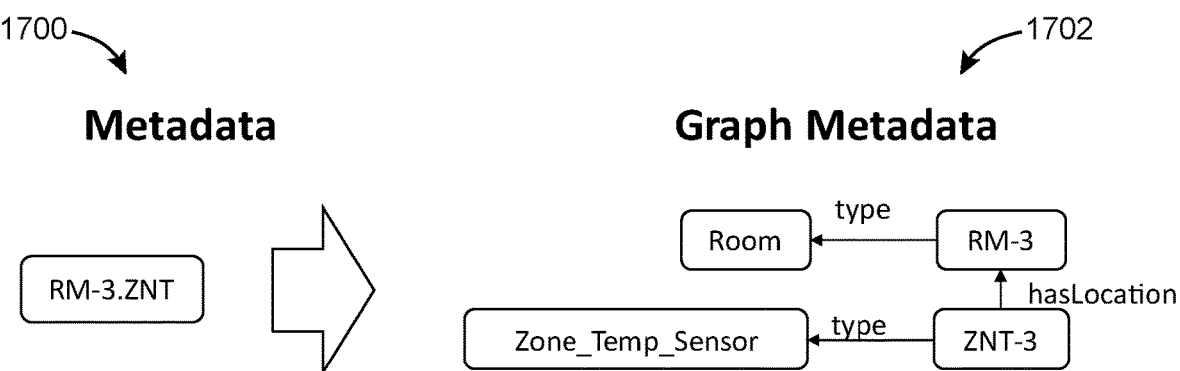
FIG. 16 is building metadata in a project haystack schema, according to an exemplary embodiment.
FIG. 17 is a block diagram of building metadata in a building schema being converted into graph metadata that can be performed by the mapping system as illustrated in FIG. 3, according to an exemplary embodiment.

Referring now to FIG. 16, a data schema 1600 is shown, according to an exemplary embodiment. The data schema 1600 is a project Haystack schema. However, the data schema 1600 is annotations and there is the need to infer entities. Furthermore, there is no categorization of vocabs or ability to implement relational queries. Furthermore, the project Haystack schema does not include relationships other than a "Ref" indication. However, the BRICK schema provides complex relationships between entities, indications of entities, and an ability to perform relational queries. Therefore, the BRICK schema is advantageous over schemas such as Haystack due to its relationships. Another data schema is the Industry Foundation Classes (IFC) data schema. The IFC data schema is designed for building structure. However, the IFC schema does not have a common query mechanism. Furthermore, the IFC data schema has non-composable naming. In some embodiments, the mapping system 300 is configured to map schemas such as Haystack or IFC to BRICK.

Referring now to FIG. 17, a block diagram of metadata 1700 being converted into graph metadata 1702 is shown, according to an exemplary embodiment. The mapping system 300 can be configured to map the metadata 1700 into the graph metadata 1702. The mapping system 300 can be configured to automatically (or with the help of a user) determine what entities exist in the metadata 1700. Furthermore, the mapping system 300 can determine what relationships exist between the entities. The mapping system can process the metadata 1700 to generate tag-sets and generate a BRICK graph based on the generated tag-sets and the relationships.

The graph metadata 1702 can be a BRICK representation including a standardized type hierarchy (e.g., Temperature_Sensor, Supply_Fan, etc.) and canonical relationships (feeds, isPartOf, hasLocation, etc.). Furthermore, BRICK standardizes triples of subject, predicate, and object form. For example, ZNT-3 (subject) is (predicate) a zone temperature sensor (object). RM-3 (subject) is (predicate) a room (object). ZNT-3 (subject) has a location (predicate) of RM3 (object).

Referring now to FIG. 18 a BRICK RDF data model 1802 is shown, according to an exemplary embodiment. BRICK may be an RDF based data model including a subject, a predicate, and an object (a triple which constitutes a graph) for each entity. An entity may be a node associated with a uniform resource indicator (URI) 1800, e.g., example.com#ZNT-101==ex: ZNT-101 (with prefix). The BRICK RDF data model 1802 can be queries with pattern based queries, e.g., SPARQL queries.

Referring now to FIG. 19 is a block diagram of a BRICK RDF data model 1900 serialized is shown, according to an exemplary embodiment. The BRICK RDF model can be serialized into the Turtle Syntax. The graph data model 1900 can be represented as the serialized data 1902 which includes the subjects, predicates, and objects of the graph data 1900 in a textual form. In some embodiments, the mapping system 300 is configured to convert between the visually represented model 1900 and the serialized data 1902 for storage and/or user presentation.

Figures 20, 21:
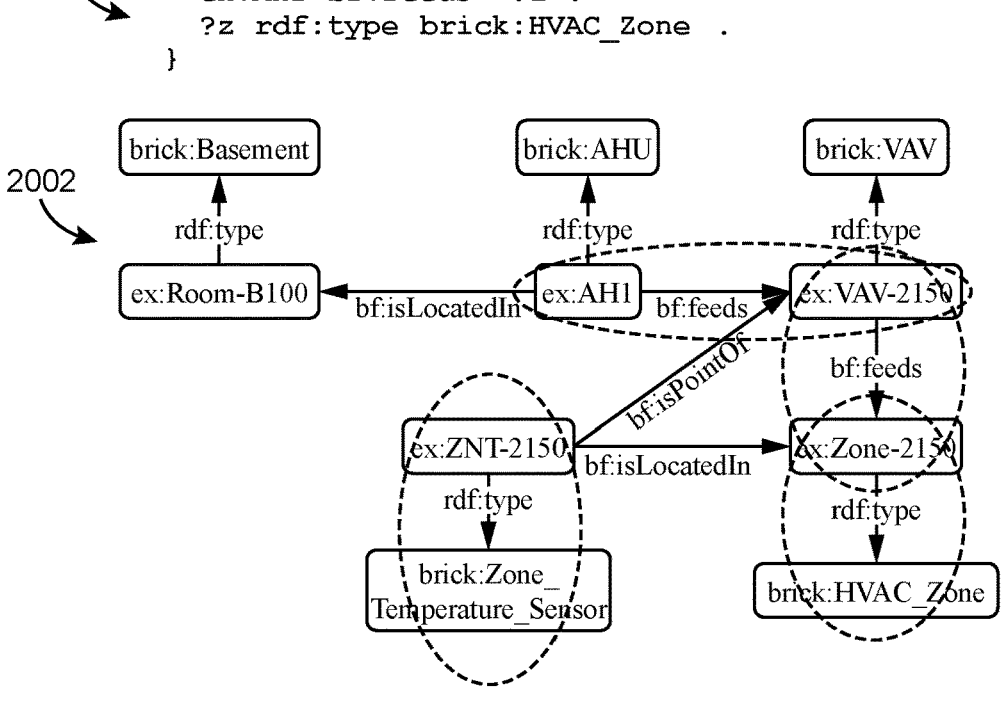
FIG. 20 is a block diagram of a SPARQL query for querying a BRICK data model for a particular entity, according to an exemplary embodiment.
FIG. 21 is another block diagram of a SPARQL query for querying a BRICK data model for a particular entity, according to an exemplary embodiment.

Referring now to FIG. 20, is a block diagram of a SPARQL query 2000 for querying a BRICK data model 2002 for a particular entity is shown, according to an exemplary embodiment. SPARQL is a standard query language over RDF. A system or designer can define variables in the SPARQL query and a query pattern with triples so that the BRICK data can be queried. The variables can be followed by a question mark (?) after a term "select." A desired pattern inside "where" can also be defined. When resolving the query, a system can find "?s" where any "?p" and any "?o" are associated with "?s" as predicate and object individually. The below query would return all the triples in the entire graph data structure.

```
select ?s where {
    ?s ?p ?o . # Triples define a graph pattern.
}
```

The query 2000 includes a variable to query, "?znt." The variable to query is part of a triples pattern, i.e., "?znt" of a particular type "Zone_Temp_sensor." The query 2000 identifies every node of the BRICK data model 2002 that has a relationship, "type," to a node "Zone_Temp_sensor." The subject, predicate, object query defined in the query 2000 is identified once, i.e., ZNT-2150. Executing the query 2000 may return "ex: ZNT-2150."

Referring now to FIG. 21 is another SPARQL query 2100 for querying the BRICK data model 2002 is shown, according to an exemplary embodiment. The query 2100 is the variable "?z" where the subject, AH1, "feeds," the predicate, the variable, the object in this query, where the object is a HVAC_Zone type. The "feeds" predicate of the query is "feeds+" indicating transitive properties, i.e., feeds one or more times. As shown, AH1 feeds VAV2150 and VAV2150 feeds Zone2150, the transitive property of the query. However, the query specifies the variable "?z" is an HVAC_Zone and since only the Zone2150 is an HVAC_Zone, Zone-2150 is returned based on the query 2100.

Referring now generally to FIGS. 22-32, interfaces 2200-3200 are shown illustrating a labeling tool that the user interface manager 336 can generate, according to an exemplary embodiment. The interfaces 2200-3200 may provide a mechanism allowing a user to review the operations of the tag-set assigner 314 and provide classifications for the unclassified tag characters 332 and/or the unclassified tag-sets 334. The user interfaces 2200-3200 can be displayed on a display device of the user device 3204 and feedback provided to via the user interfaces 2200-3200 can be provided through input devices of the user device 304.

Figure 22:
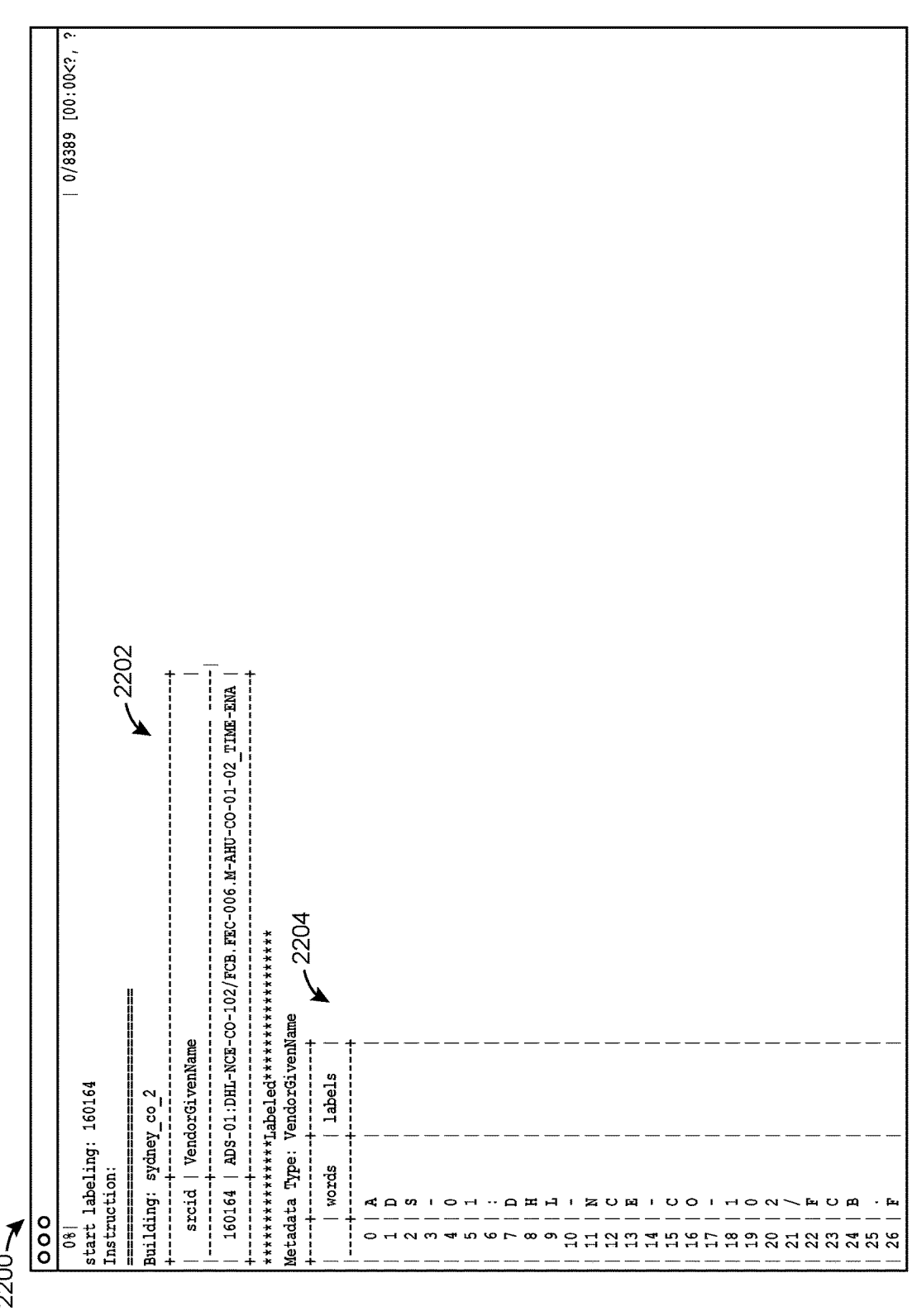
FIG. 22 is a user interface generated by the mapping system of FIG. 3 including a string to be mapped, according to an exemplary embodiment.

Referring more particularly to FIG. 22, the interface 2200 illustrating a particular string representing a point ID that is unclassified. The interface 2200 provides an indication of the particular string that the mapping system 300 is currently mapping. The string is shown in element 2202 along with a corresponding identifier for the string. The interface 2200 further includes a table 2204 illustrating each character of the string enumerated and labels for each character. However, because the mapping system 300 has not yet mapped the string in the interface 2200, the labels for each character are blank.

Figure 23:
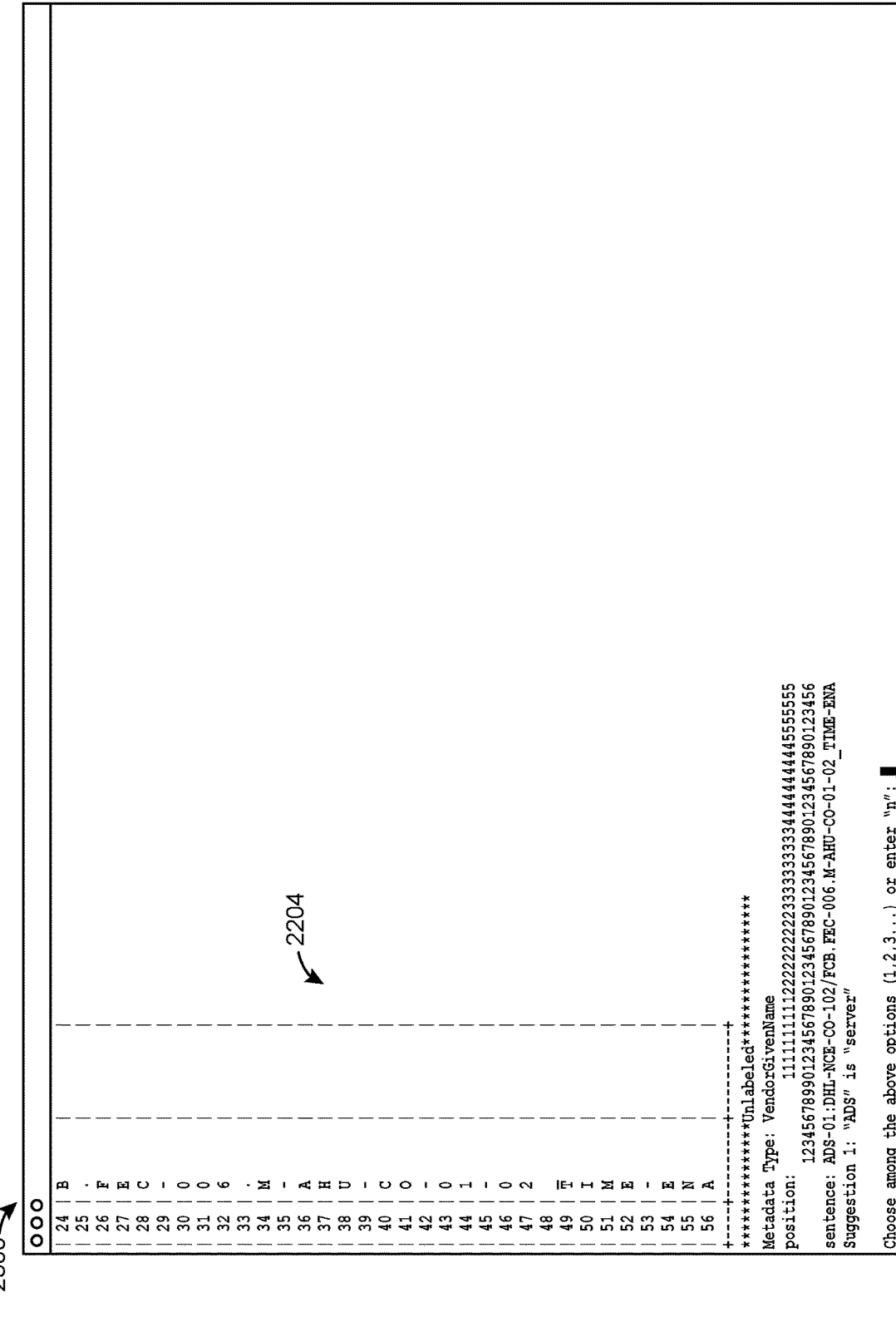
FIG. 23 is another user interface generated by the mapping system of FIG. 3 prompting the user to respond to a suggested tag generated for a group of characters of the string, according to an exemplary embodiment.

Referring more particularly to FIG. 23, the interface 2300 indicates an extended portion of the table 2204. The mapping system 300 can be configured to parse the string from left to right and identify a first set of characters associated with a tag. In the interface 2300, an indication that the characters "ADS" have been analyzed as potentially being associated with a tag, "server." The interface 2300 provides a suggestion to an end user that the characters "ADS" are associated with the tag "server." In some embodiments, the mapping system 300 identifies multiple different likely tags for the characters "ADS." Each suggestion can be provided to a user for review and selection in the interface 2300. The user can either select one suggestion or completely reject the suggestions presented in the interface 2300.

Figure 24:
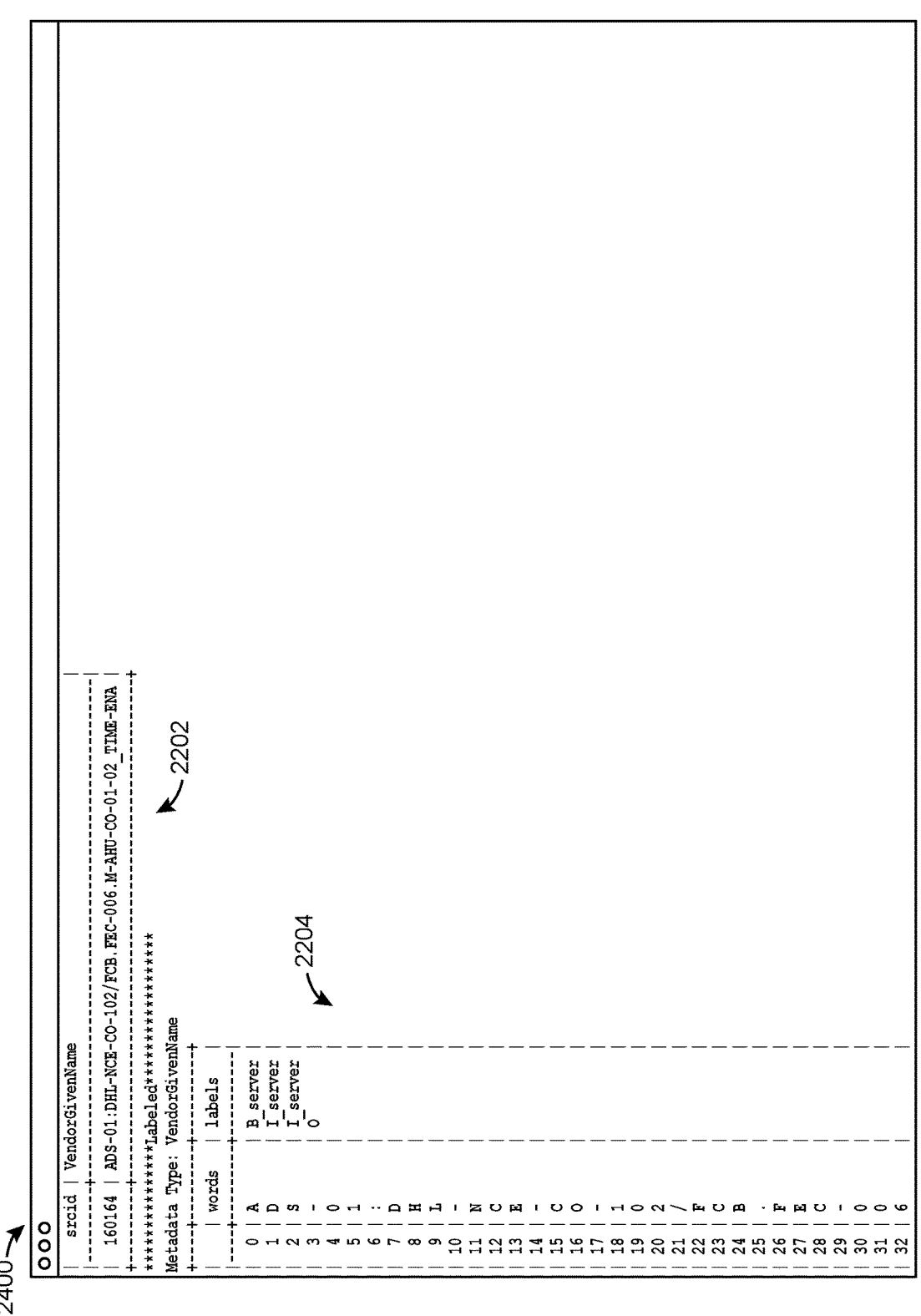
FIG. 24 is another user interface generated by the mapping system of FIG. 3 where characters of the string have been assigned a tag, according to an exemplary embodiment.

Referring more particularly to FIG. 24, a user interface 2400 with the table 2204 updated with a tag is shown to be, according to an exemplary embodiment. If, in the interface 2400, the user accepts the mapping of the characters "ADS" to the tag "server," the user interface 2400 can populate the table 2204 with the classification. Furthermore, the interface 2400 can include an indication of the beginning of the character set associated with the server tag, i.e., the character "A" and the label "B server" representing the beginning the of character set for a server tag, the character "D" and "S" and the label "I server" representing the inside of the character set representing the server tag, and the label "0" representing the end of the character set.

Figure 25:
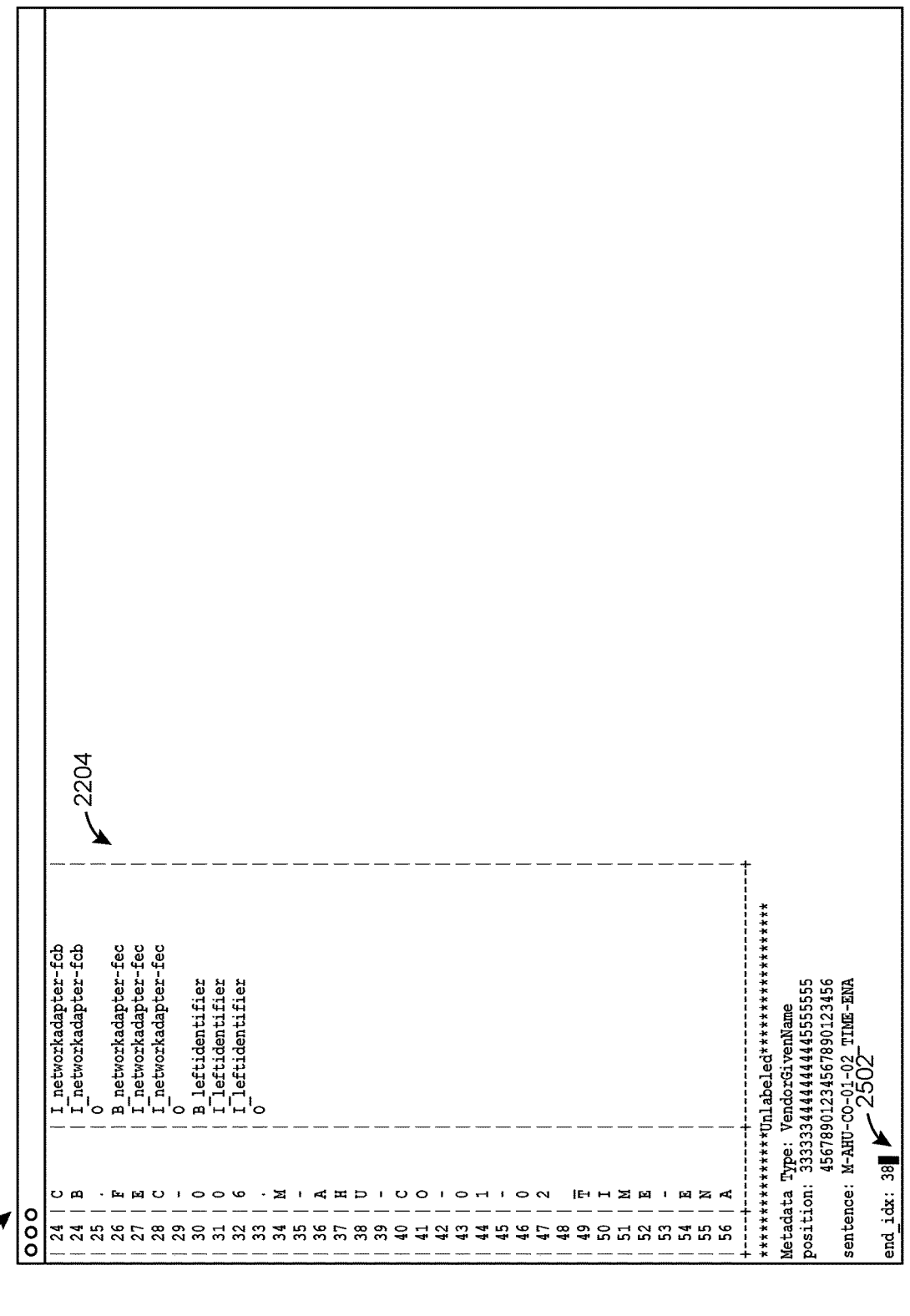
FIG. 25 is another user interface generated by the mapping system of FIG. 3 where the user interface prompts a user for an ending index when the ending index cannot be determined by the mapping system of FIG. 3, according to an exemplary embodiment.

The mapping system 300 can be configured to continue to map characters into tags as illustrated in the FIGS. 22-32. However, if the mapping system 300 cannot identify a character set for mapping to a tag, the mapping system 300 can display the interface 24500. Referring more particularly to FIG. 25, the interface 2500 is shown prompting a user to enter an ending index with the prompt 2502. The table 2204 indicate that characters and character sets of the string have been mapped to tags up through the index 33. After the index 33, the mapping system 300 is unable to identify a subsequent character or character set associated with a tag. In this regard, the interface 2500 presents the remaining characters for mapping to the user and provide the prompt 2502. The user can enter, via the prompt 2502, an ending index of the next string for classification into a tag, in the interface 2500, index 38.

Figure 26:
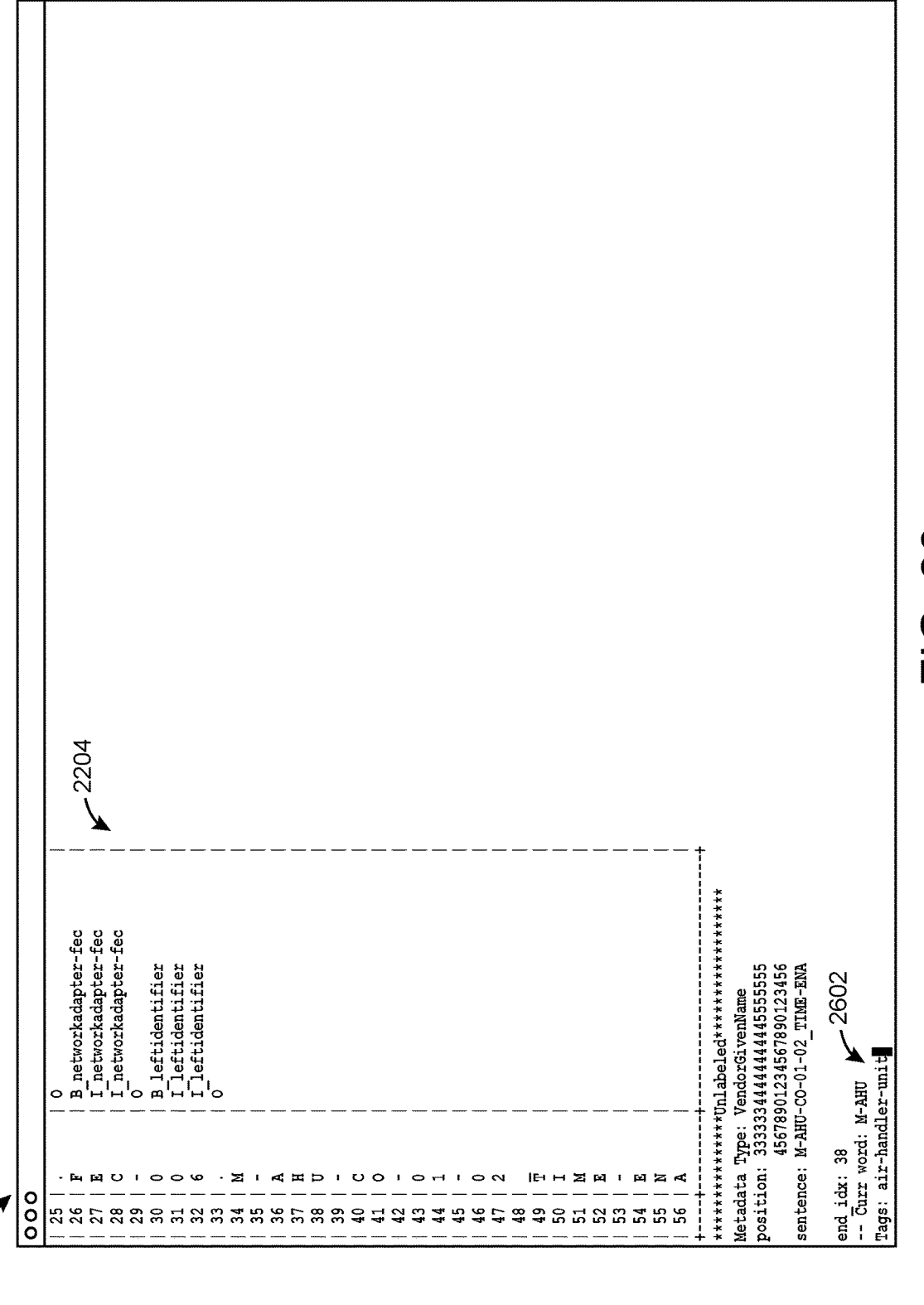
FIG. 26 is another user interface generated by the mapping system of FIG. 3 where the user interface prompts the user to enter a tag for a group of characters, according to an exemplary embodiment.

Even with the ending index provided via the interface 2500, the mapping system 300 may be unable to map the character set to a tag. In this regard, the interface 2600 can prompt the user to enter a tag for the characters set. Referring more particularly to FIG. 26, the interface 2600 is shown with a prompt 2602 to enter a tag for an unknown character set. The user can enter the tag for the current word ending on the indicated index of 38, i.e., the character set "M-AHU." The user can enter the tag, "air-handler-unit" via the prompt 2602, manually mapping the unknown character set. In some embodiments, the interface 2500 can identify identifying characters, e.g., numbers representing particular entities, e.g., the characters "25" in the sub-string "Controller-25." In some embodiments, the interface 2500 can prompt the user to confirm that the character "25" belong to an identifier and identify a preceding character string, e.g., are left identifies, or identify a subsequent character string, e.g., are right identifiers.

Figure 27:
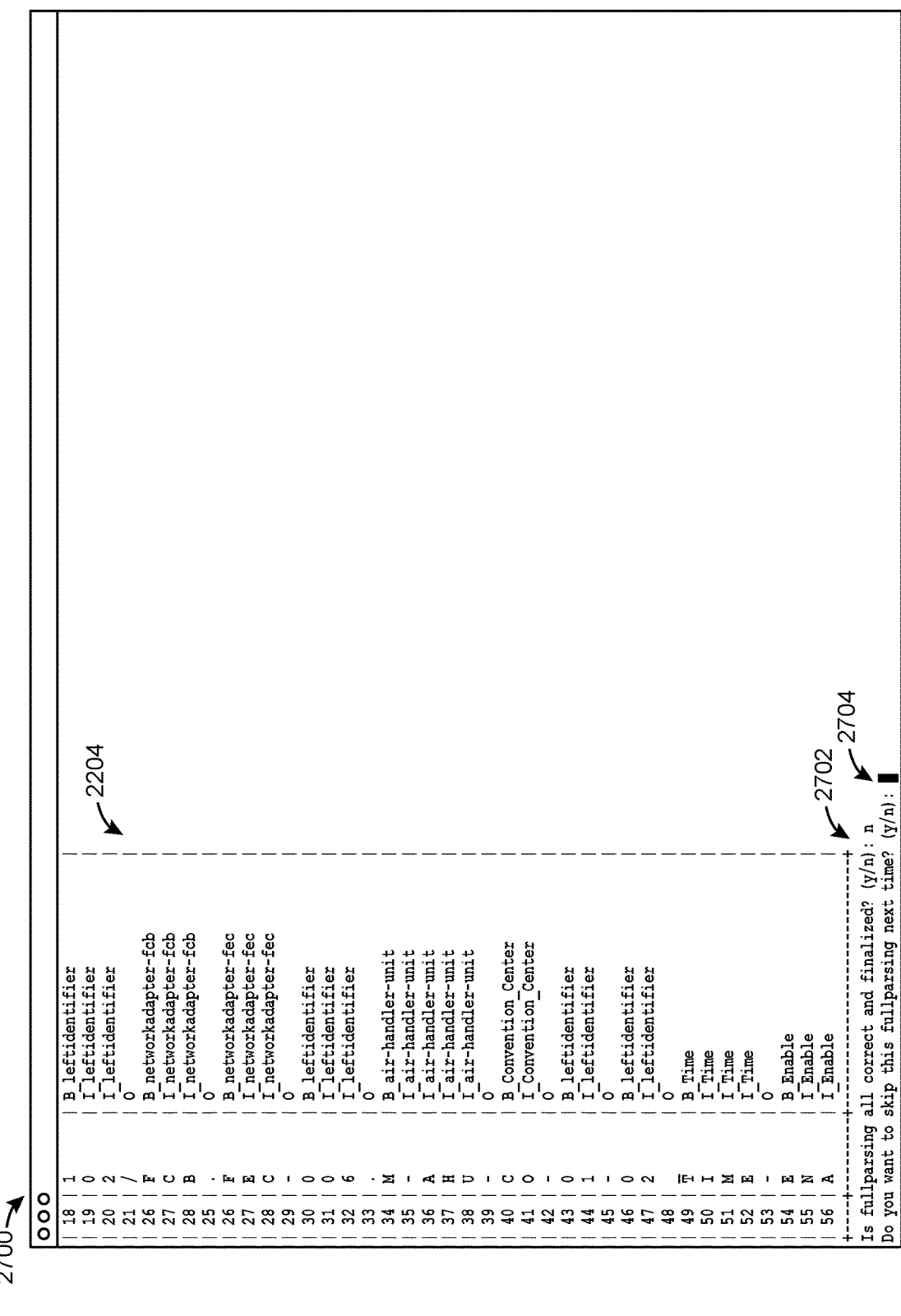
FIG. 27 is another user interface generated by the mapping system of FIG. 3 where the user interface prompts the user to finalize a classification of the string, according to an exemplary embodiment.

Referring now to FIG. 27, the interface 2700 is shown where the string is fully classified into tags and prompts 2702 and 2704 are provided to finalize the mapping and skip the mapping in the future. The user can indicate, via the prompt 2702, whether the mapping is correct and can be finalized. If the user wishes to modify or correct the mapping, the user may choose to not finalize the mapping illustrated in the table 2204. Even if the user chooses to not finalize the mapping, the user can select whether or not the mapping system 300 should fully map the string in the future, or strings sharing common sub-strings via the prompt 2704.

Referring now to FIG. 28, the interface 2800 is shown where the tags, in the order they were identified, are shown in the tag list 2802 and suggested tag-sets 2804 are provided for user review, according to an exemplary embodiment. The mapping system 300 can be configured to determine one or multiple tags that are likely associated with the tags of the tag list 2802 based on either the type of tags in the tag list 2802 and/or the order in which the tags appear in the tag list 2802.

Referring now to FIG. 29, the interface 2900 including a prompt 2902 for selecting one suggested tag-set of the suggested tag-sets 2804 is shown, according to an exemplary embodiment. The user can enter the desired tag-set which the string classified into the tags of the tag list 2802 represents. In response to receiving the desired tag-set, the mapping system 300 can assign the string the tag-set received from the user.

Figure 30:
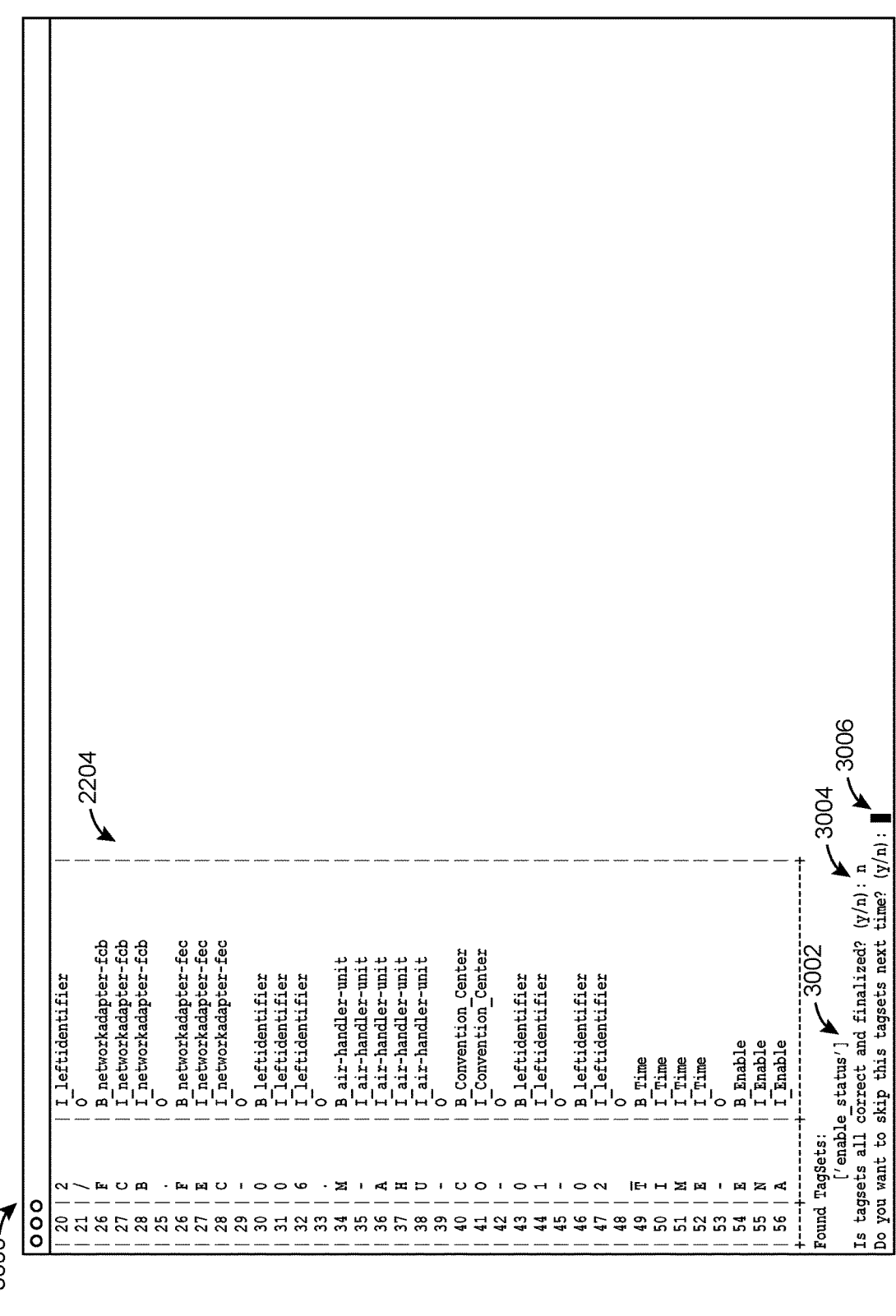
FIG. 30 is another user interface generated by the mapping system of FIG. 3 where the user interface prompts the user to finalize the selected tag-set, according to an exemplary embodiment.

Referring now to FIG. 30, the interface 3000 including prompts 3004 and 3006 to finalize the tag-set and skip assigning the tag-set in the future is shown, according to an exemplary embodiment. Furthermore, the interface 3000 includes an indication of the assigned tag-set 3002. The user can indicate, via the prompt 3004, whether the assignment of the tag-set is correct and can be finalized. If the user wishes to modify or correct the tag-set assignment, the user may choose to not finalize the tag-set assignment. Even if the user chooses to not finalize the mapping, the user can select whether or not the mapping system 300 should fully map the tags to the tag-set in the future, or strings sharing common tags via the prompt 3006.

Figure 31:
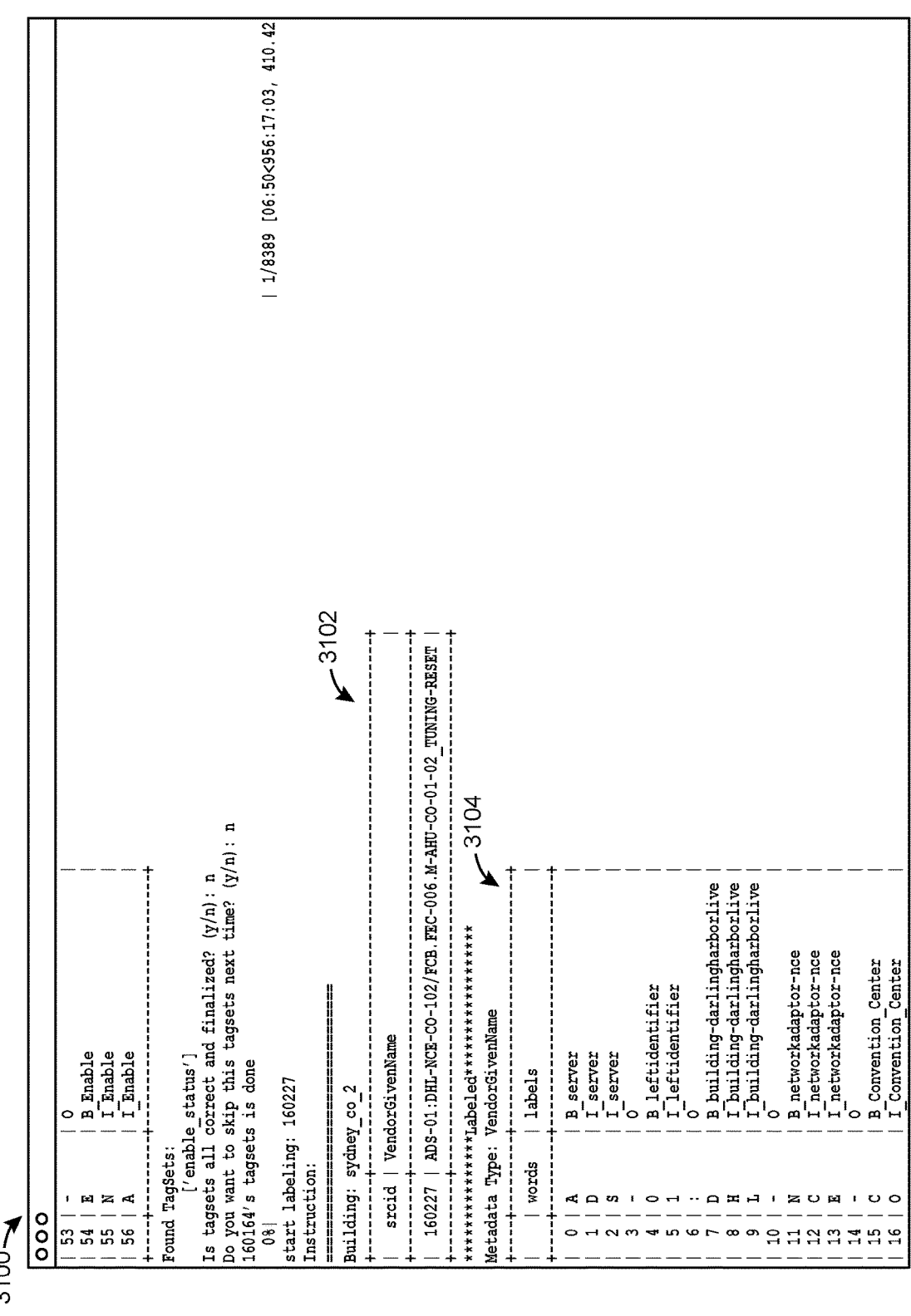
FIG. 31 is another user interface generated by the mapping system of FIG. 3 where the user interface provides a result of automated classification of a second string based on the user input provided while classifying the string, according to an exemplary embodiment.
Figure 32:
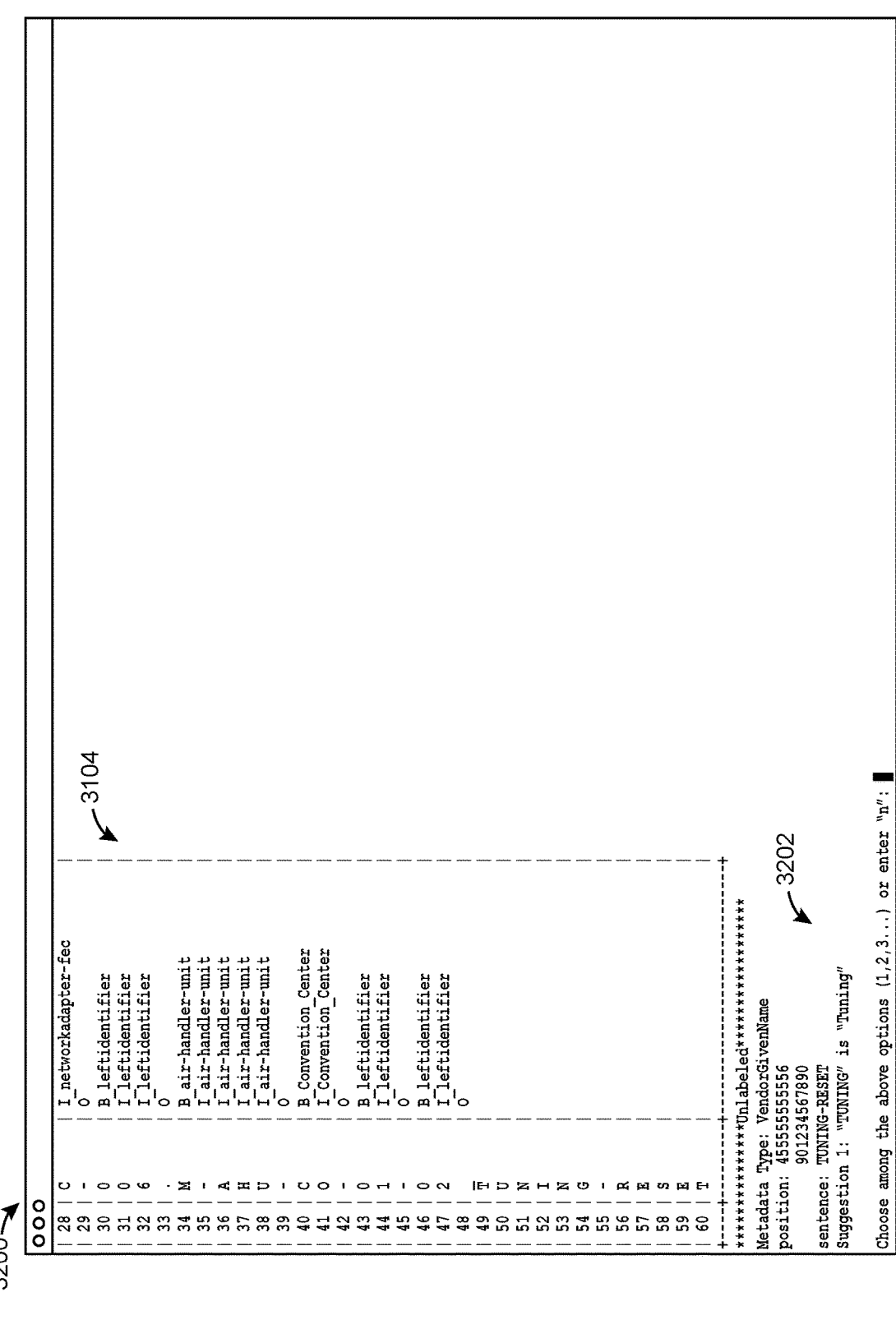
FIG. 32 is another user interface generated by the mapping system of FIG. 3 where the user interface prompts the user to select tags for unknown characters of the second string, according to an exemplary embodiment.

Referring now to FIG. 31, the interface 3100 including an element 3102 for another string to be mapped by the mapping system 300 is shown, according to an exemplary embodiment. The string of the element 3102 may share a significant amount of common sub-strings with the string of the element 2202. In this case, rather than parsing the second string, the mapping system 300 can apply the tag assignment determined for the first string to the second string where the sub-strings are the same as illustrated in table 3104. This reduces the amount of characters to be assigned in the second string. Referring now to FIG. 32, the interface 3200 is shown including a prompt to assign a tag to a remaining sub-string, according to an exemplary embodiment. The remaining characters can be assigned tags by the mapping system 300 and the interface 3200 can display the prompt 3202 to select a suggestion associated with the remaining sub-strings.

In some embodiments, the same character groups of different strings represent different tags. However, after assigning the characters of a first string the tag, the mapping system 300 may automatically assign the same characters in the second string the second tag. In some embodiments, via the interface 3100, a user can define unique tags for each string, even though the characters are the same, the user can manually indicate that the characters in the first string represent a first tag and that the characters in the second string represent a second tag. Furthermore, in some embodiments, a user may determine, after labeling a large set of strings, that one character set was not appropriately assigned a tag. In this regard, the user can globally, across all tags, update the tag representing the character set.

Figures 33, 34:
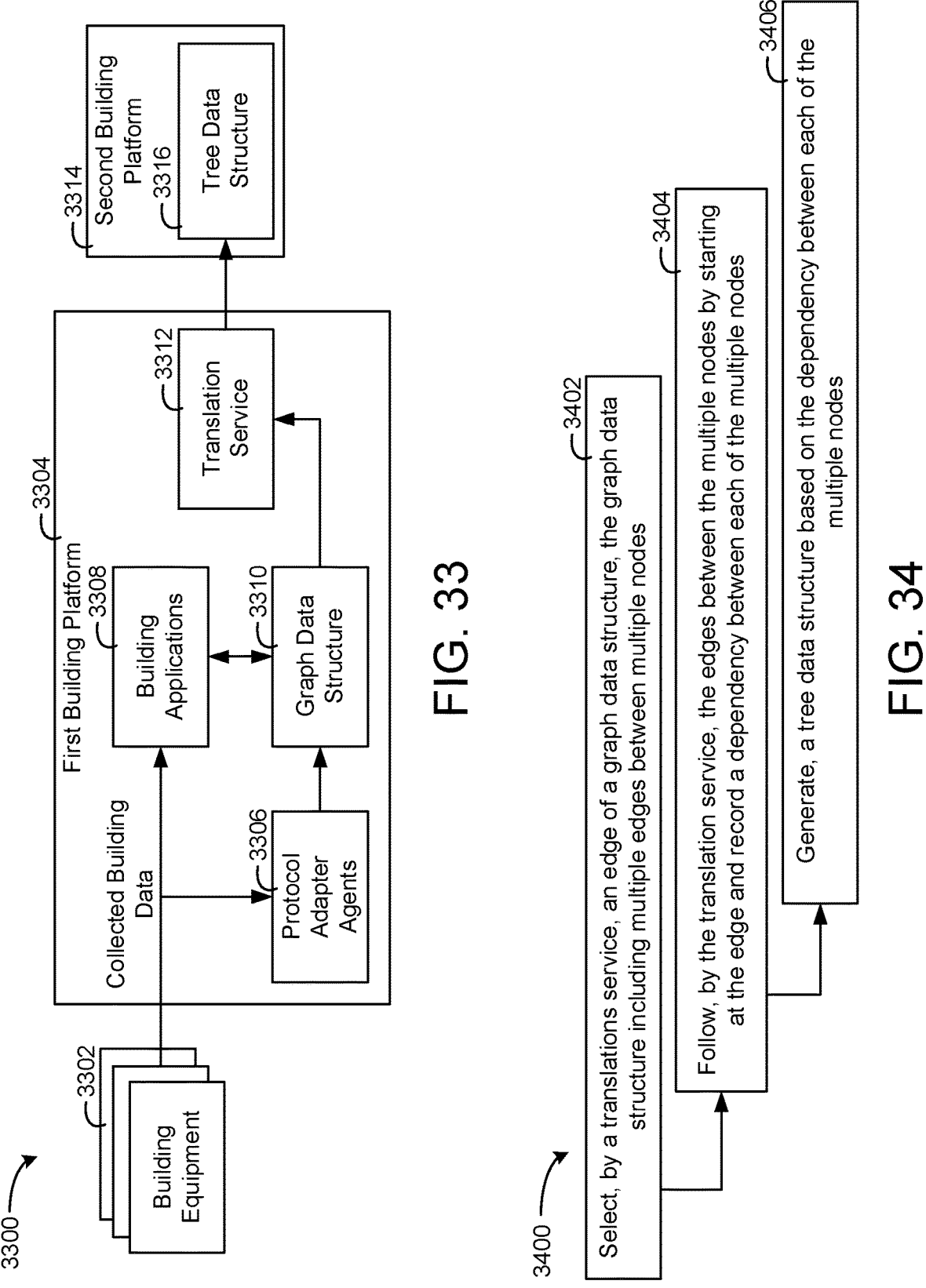
FIG. 33 is a block diagram of a system collecting building data from the building systems illustrated in FIG. 1, generating a graph data structure for the collected data, and projecting the graph data structure into a tree data structure, according to an exemplary embodiment.
FIG. 34 is a flow diagram of a process that can be performed by the system of FIG. 31 to translate the graph data structure into the tree data structure, according to an exemplary embodiment.

Referring now to FIG. 33 is a system 3300 including a first building platform 3304 collecting building data from building systems 3302, generating a graph data structure 3310 for the collected data, and projecting the graph data structure into a tree data structure 3316 for a second building platform 3314, according to an exemplary embodiment. The system 3300 can include building systems, e.g., the building systems as illustrated in FIG. 1. The building systems can be operated by one or more agents, the protocol adapter agents 3306, and the data of the building systems can be stored in a knowledge graph, i.e., the graph data structure 3310. The protocol adapter agents 3306 can be configured to receive the building data in various different formats and translate or map the data into the graph data structure 3310. The protocol adapter agents 3306 can include some and/or all of the functionality of the mapping system 300.

In some embodiments, the first building platform 3304 receives the data from the building systems 3302 and generates the graph data structure 3310 via the protocol adapter agents 3306. For example, the data collected from the building systems can be in a METASYS format and the mapping system 300 can map the data into a BRICK format. Furthermore, the graph data structure 3310 can be projected into the tree data structure 3316 via a translation service 3312 of the first building platform 3304. In some embodiments, applications, e.g., the building applications 3308 of the first building platform 3304 are configured to operate based on the graph data structure 3310 schema. However, applications of another building platform, e.g., the second building platform 3314, may be configured to operate on a different data schema, a tree data structure 3316 with a particular schema.

Referring now to FIG. 34, a process 3400 for translating the graph data structure 3310 into the tree data structure 3316, according to an exemplary embodiment. The first building platform 3304 can be configured to perform the process 3400. One or more components of the first building platform 3304, e.g., the translation service 3312 can be configured to perform some and/or all of the steps of the process 3400.

Figure 35:
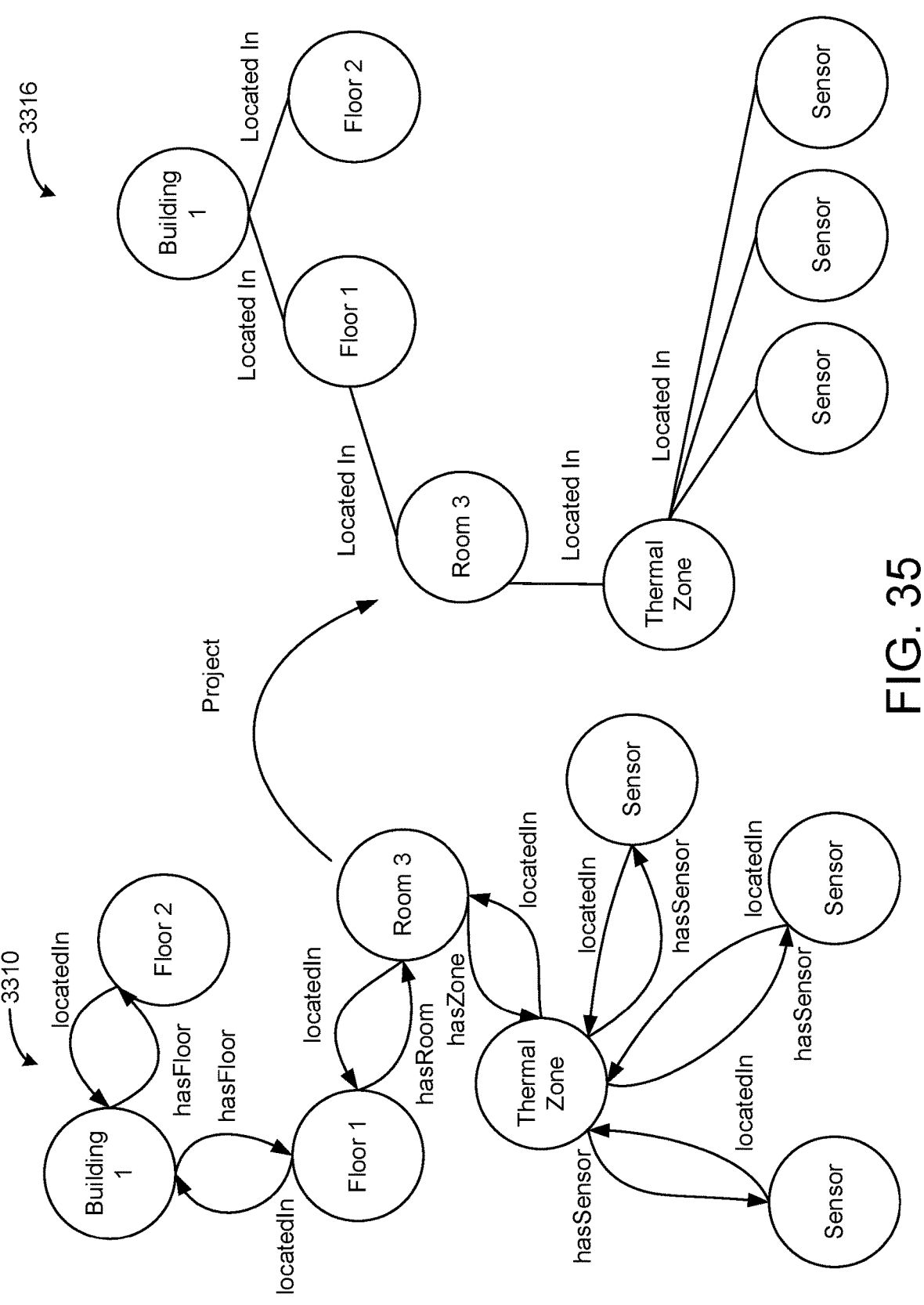
FIG. 35 is a diagram of the graph data structure illustrated in FIG. 31 being projected into the tree data structure illustrated in FIG. 31, according to an exemplary embodiment.

In step 3402, the translation service 3312 can select an edge of the graph data structure where the graph data structure is a graph with multiple nodes and edges, e.g., as shown in FIG. 35. The translation service 3312 can select the edge arbitrarily, e.g., pseudo-randomly select an edge of the graph data structure 3310.

In step 3404, the translation service 3312 can follow the edges of the graph data structure, starting at the selected edge of the step 3402 and record dependencies between the nodes as each node is reached. In step 3406, based on the recorded node dependencies, the translation service 3312 can generate the tree data structure 3316. The tree data structure 3316 is shown in greater detail in FIG. 35 where each node of the graph data structure 3310 is represented as a leaf of the tree and the dependencies leaves are shown in a hierarchical form.

Referring now to FIG. 35 is a diagram of the graph data structure of FIG. 33 detail being projected into the tree data structure of FIG. 33 is shown, according to an exemplary embodiment. In some embodiments, the translation service 3312 performs the projection shown in FIG. 35. The translation service 3312 can be configured to select an edge of the graph data structure 3310, e.g., a relationship locatedIn, hasFloor, hasRoom, hasZone, hasSensor, etc. In some embodiments, the edge is selected pseudo-randomly. The translation service 3312 can follow the edge up and/or down to other entities. The entities and their dependencies can be recorded by the system in the tree data structure 3316. The translation service 3312 can continue to follow the relationships up and down to project the graph data structure 3310 into the tree data structure 3316.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building schema mapping system, the building schema mapping system comprising one or more memory devices configured to store instructions, that, when executed by one or more processors, cause the one or more processors to:
   receive a plurality of strings in a first schema, each string representing at least one of a point, building equipment, or a building space;
   extract a plurality of relationships from the plurality of strings by applying a plurality of extraction rules that define the plurality of relationships to the plurality of strings, each relationship of the plurality of relationships indicating a particular relationship between a first string of the plurality of strings and a second string of the plurality of strings;
   generate, based on the plurality of strings, a tree structure comprising a plurality of levels representing a plurality of sub-strings of the plurality of strings, a plurality of top levels of the plurality of levels representing common sub-strings across two or more of the plurality of strings, one or more bottom levels of the plurality of levels representing one or more unique sub-strings of the plurality of strings, wherein a common sub-string of the common sub-strings is represented in the tree structure by a single top level of the plurality of top levels;
   label the plurality of sub-strings of the plurality of levels of the tree structure by assigning a tag-set to a sub-string of the plurality of sub-strings based on tags identified for the sub-string, the tag-set comprising a group of tags describing an entity indicated by the sub-string; and
   generate a graph data structure of a second schema based on the plurality of relationships and a label of each of the plurality of strings, wherein one label is based on the tag-set of the sub-string.

2. The building schema mapping system of claim 1, wherein the instructions cause the one or more processors to:
   receive a naming convention from an external system, the naming convention indicating a mapping between a particular character or a particular character group and a tag of a predefined set of tags;
   generate or update a dictionary, the dictionary comprising the mapping between the particular character or the particular character group and the tag of the predefined set of tags; and
   label each of the plurality of strings based on characters of each of the plurality of strings with the dictionary by matching the characters of each of the plurality of strings to dictionary characters of the predefined set of tags.

3. The building schema mapping system of claim 1, wherein the instructions cause the one or more processors to:
   assign an index value to each character of each of the plurality of strings;

determine a beginning index values, one or more middle index values, and an ending index value for one or more groups of characters of each of the plurality of strings, the one or more groups of characters associated with a tag of a set of predefined tags; and assign a particular beginning index value and one or more particular middle index values to the tag.

4. The building schema mapping system of claim 1, wherein the plurality of strings are at least one of sub-string sections of a single string or are each a separate string.

5. The building schema mapping system of claim 1, wherein the instructions cause the one or more processors to label each of the plurality of strings based on characters of each of the plurality of strings by:

assigning groups of characters of each of the plurality of strings a particular tag of a predefined set of tags; and assigning each of the plurality of strings a particular tag-set of a predefined set of tag-sets based on the particular tag assigned to the groups of characters of each of the plurality of strings.

6. The building schema mapping system of claim 5, wherein the instructions cause the one or more processors to:

generate a type relationship for each of the plurality of strings, the type relationship relating each of the plurality of strings to the tag-set assigned to each of the plurality of strings; and generate the graph data structure further based on the type relationship of each of the plurality of strings and the tag-set assigned to each of the plurality of strings.

7. The building schema mapping system of claim 1, wherein the instructions cause the one or more processors to generate the tree structure by:

identifying a root sub-string common across all of the plurality of strings and one or more first leaf sub-strings common across two or more of the plurality of strings, and one or more second leaf sub-strings unique to each of the plurality of strings; and generating the tree structure with the root sub-string, the one or more first leaf sub-strings, and the one or more second leaf sub-strings, wherein the tree structure comprises a plurality of branches across the root sub-string, the one or more first leaf sub-strings, and the one or more second leaf sub-strings, wherein each branch of the plurality of branches represents one string of the plurality of strings.

8. The building schema mapping system of claim 7, wherein the instructions cause the one or more processors to label each of the plurality of strings based on the tree structure by labeling leaf characters of the root sub-string, the one or more first leaf sub-strings, and the one or more second leaf sub-strings by labeling from the root sub-string to the one or more second leaf sub-strings according to a hierarchy of the tree structure.

9. The building schema mapping system of claim 1, wherein the instructions cause the one or more processors to:

assign, for one string of the plurality of strings, each of a plurality of character groups a tag;

identify one or more unknown character groups of the one string;

generate a user interface and cause the user interface to include an indication of the one or more unknown character groups; and receive an input from a user via the user interface, the input indicating a manually assigned tag to each of the one or more unknown character groups.

10. The building schema mapping system of claim 9, wherein the instructions cause the user interface to include one or more suggested tags, wherein the input received from the user is a selection of one of the one or more suggested tags or is a manually defined tag.

11. The building schema mapping system of claim 1, wherein the instructions cause the one or more processors to:

assign, for one string of the plurality of strings, a plurality of tags, wherein each of a plurality of character groups is assigned one tag;

generate a user interface and cause the user interface to include an indication of the plurality of tags; and receive an input from a user via the user interface, the input indicating an assigned tag-set to the one string.

12. The building schema mapping system of claim 11, wherein the instructions cause the user interface to include one or more suggested tag-sets, wherein the input received from the user is a selection of one of the one or more suggested tag-sets or is a manually defined tag-set.

13. The building schema mapping system of claim 1, wherein the instructions cause the one or more processors to:

label the plurality of strings by identifying an amount of characters of each of the plurality of strings and comparing the amount of characters to a threshold.

14. The building schema mapping system of claim 1, wherein the instructions cause the one or more processors to:

label the plurality of strings by assigning a plurality of tags to the string based on characters of the string; and assign the tag-set to the string based on the plurality of tags.

15. A method of building schema mapping, the method comprising:

receiving, by a processing circuit, a plurality of strings in a first schema, each string representing at least one of a point, building equipment, or a building space;

extracting, by the processing circuit, a plurality of relationships from the plurality of strings by applying a plurality of extraction rules that define the plurality of relationships to the plurality of strings, each relationship of the plurality of relationships indicating a particular relationship between a first string of the plurality of strings and a second string of the plurality of strings;

generating, by the processing circuit based on the plurality of strings, a tree structure comprising a plurality of levels representing a plurality of sub-strings of the plurality of strings, a plurality of top levels of the plurality of levels representing common sub-strings across two or more of the plurality of strings, one or more bottom levels of the plurality of levels representing one or more unique sub-strings of the plurality of strings, wherein a common sub-string of the common sub-strings is represented in the tree structure by a single top level of the plurality of top levels;

labeling, by the processing circuit, the plurality of sub-strings of the plurality of strings according to the plurality of levels of the tree structure by assigning a tag-set to a sub-string of the plurality of sub-strings based on tags identified for the sub-string, the tag-set comprising a group of tags describing an entity indicated by the sub-string; and generating, by the processing circuit, a graph data structure of a second schema based on the plurality of relationships and a label of each of the plurality of strings, wherein one label is based on the tag-set of the sub-string.

16. The method of claim 15, further comprising:

receiving, by the processing circuit, a naming convention from an external system, the naming convention indicating a mapping between a particular character or a particular character group and a tag of a predefined set of tags;

generating or updating, by the processing circuit, a dictionary, the dictionary comprising the mapping between the particular character or the particular character group and the tag of the predefined set of tags; and labeling, by the processing circuit, each of the plurality of strings based on characters of each of the plurality of strings with the dictionary by matching the characters of each of the plurality of strings to dictionary characters of the predefined set of tags.

17. The method of claim 15, further comprising:

assigning, by the processing circuit, an index value to each character of each of the plurality of strings;

determining, by the processing circuit, a beginning index values, one or more middle index values, and an ending index value for one or more groups of characters of each of the plurality of strings, the one or more groups of characters associated with a tag of a set of predefined tags; and assigning, by the processing circuit, a particular beginning index value and one or more particular middle index values the tag.

18. The method of claim 15, wherein the plurality of strings are at least one of sub-string sections of a single string or are each a separate string.

19. The method of claim 15, wherein labeling, by the processing circuit, each of the plurality of strings based on characters of each of the plurality of strings comprises:

assigning groups of characters of each of the plurality of strings a particular tag of a predefined set of tags; and assigning each of the plurality of strings a particular tag-set of a predefined set of tag-sets based on the particular tag assigned to the groups of characters of each of the plurality of strings.

20. The method of claim 19, further comprising:

generating, by the processing circuit, a type relationship for each of the plurality of strings, the type relationship relating each of the plurality of strings to the tag-set assigned to each of the plurality of strings; and generating, by the processing circuit, the graph data structure further based on the type relationship of each of the plurality of strings and the tag-set assigned to each of the plurality of strings.

21. A building system, the building system comprising:

a building management system, the building management system comprising one or more memory devices configured to store instructions, that, when executed by one or more processors, cause the one or more processors to operate one or more pieces of building equipment based on a plurality of strings of a first schema; and a building schema mapping system comprising one or more memory devices and one or more processors, the building schema mapping system configured to:

receive the plurality of strings from the building management system, each string representing at least one of a point, building equipment, or a building space;

extract a plurality of relationships from the plurality of strings by applying a plurality of extraction rules that define the plurality of relationships to the plurality of strings, each relationship of the plurality of relationships indicating a particular relationship between a first string of the plurality of strings and a second string of the plurality of strings;

generate, based on the plurality of strings, a tree structure comprising a plurality of levels representing a plurality of sub-strings of the plurality of strings, a plurality of top levels of the plurality of levels representing common sub-strings across two or more of the plurality of strings, one or more bottom levels of the plurality of levels representing one or more unique sub-strings of the plurality of strings, where a common sub-string of the common sub-strings is represented in the tree structure by a single top level of the plurality of top levels;

label the plurality of sub-strings of the plurality of levels of the tree structure by assigning a tag-set to a sub-string of the plurality of sub-strings based on tags identified for the sub-string, the tag-set comprising a group of tags describing an entity indicated by the sub-string; and generate a graph data structure of a second schema based on the plurality of relationships and a label of each of the plurality of strings, wherein one label is based on the tag-set of the sub-string.

22. The building system of claim 21, wherein the building schema mapping system is configured to label each of the plurality of strings based on characters of each of the plurality of strings by:

assigning groups of characters of each of the plurality of strings a particular tag of a predefined set of tags; and assigning each of the plurality of strings a particular tag-set of a predefined set of tag-sets based on the particular tag assigned to the groups of characters of each of the plurality of strings.

* * * * *